US012587703B2

(12) United States Patent
Kozuka et al.

(10) Patent No.: US 12,587,703 B2
(45) Date of Patent: Mar. 24, 2026

(54) VIDEO DISPLAY SYSTEM, OBSERVATION DEVICE, INFORMATION PROCESSING METHOD, AND RECORDING MEDIUM

(71) Applicant: Panasonic Intellectual Property Management Co., Ltd., Osaka (JP)

(72) Inventors: Masayuki Kozuka, Tokyo (JP); Yoshihiro Mori, Osaka (JP); Junya Suzuki, Kyoto (JP); Yoshiichiro Kashiwagi, Kyoto (JP); Yasutoshi Yamamoto, Osaka (JP); Toshiro Nishio, Osaka (JP)

(73) Assignee: NeoRealX, Inc., Tokyo (JP)

( * ) Notice: Subject to any disclaimer, the term of this patent is extended or adjusted under 35 U.S.C. 154(b) by 113 days.

(21) Appl. No.: 18/286,353

(22) PCT Filed: Apr. 18, 2022

(86) PCT No.: PCT/JP2022/018088
§ 371 (c)(1),
(2) Date: Oct. 10, 2023

(87) PCT Pub. No.: WO2022/220307
PCT Pub. Date: Oct. 20, 2022

(65) Prior Publication Data
US 2024/0196045 A1      Jun. 13, 2024

Related U.S. Application Data

(60) Provisional application No. 63/176,004, filed on Apr. 16, 2021.

(51) Int. Cl.
*H04N 21/431* (2011.01)
*G02B 27/01* (2006.01)
(Continued)

(52) U.S. Cl.
CPC ..... *H04N 21/4316* (2013.01); *G02B 27/0172* (2013.01); *G06F 3/011* (2013.01);
(Continued)

(58) Field of Classification Search
CPC ......... H04N 21/4316; H04N 21/21805; H04N 21/2353; H04N 21/439; H04N 21/472;
(Continued)

(56) References Cited

U.S. PATENT DOCUMENTS 9,794,514 B1    10/2017   Yoakum
9,911,238 B2     3/2018   Doronichev et al.
(Continued)

FOREIGN PATENT DOCUMENTS

CA          3032295 A1    2/2018
EP          3793259 A1    3/2021
(Continued)

OTHER PUBLICATIONS

Japanese Office Action dated Dec. 24, 2024 issued in the corresponding Japanese Patent Application No. 2023-514694.
(Continued)

*Primary Examiner* — John R Schnurr
(74) *Attorney, Agent, or Firm* — Rimon P.C.

(57) ABSTRACT

A video display system for displaying a display video via a display device includes: a VR device including the display device that displays the display video; an observation device proved in a mobile object to give the observation device mobility and including a capturing unit configured to capture video, a data obtaining unit configured to obtain data related to a movement speed of the capturing unit, and a transmission unit configured to transmit, together with the data, the video captured; a reception unit configured to receive video and the data; a video generation unit configured to generate the display video including the video received; and a pre- (Continued)

Example of how map is displayed when accelerating (bottom left to top right hatching)

Example of how map is displayed when flying at constant speed

Example of how map is displayed when decelerating (bottom right to top left hatching)

Example of how map is displayed when turning right while flying at constant speed sentation unit configured to cause the video generation unit to generate and output a graphic corresponding to the movement speed from the data received and superimpose the graphic to present the movement speed of the capturing unit.

13 Claims, 34 Drawing Sheets

(51) Int. Cl.

| | |
|---|---|
| *G06F 3/01* | (2006.01) |
| *G06F 40/58* | (2020.01) |
| *G06T 5/50* | (2006.01) |
| *G06T 7/20* | (2017.01) |
| *G06T 15/00* | (2011.01) |
| *G06T 17/00* | (2006.01) |
| *G09G 5/36* | (2006.01) |
| *H04N 21/218* | (2011.01) |
| *H04N 21/235* | (2011.01) |
| *H04N 21/439* | (2011.01) |
| *H04N 21/472* | (2011.01) |
| *H04N 21/4788* | (2011.01) |
| *H04N 21/81* | (2011.01) |

(52) U.S. Cl.
CPC .............. *G06F 3/013* (2013.01); *G06F 40/58* (2020.01); *G06T 5/50* (2013.01); *G06T 7/20* (2013.01); *G06T 15/00* (2013.01); *G06T 17/00* (2013.01); *G09G 5/36* (2013.01); *H04N 21/21805* (2013.01); *H04N 21/2353* (2013.01); *H04N 21/439* (2013.01); *H04N 21/472* (2013.01); *H04N 21/4788* (2013.01); *H04N 21/8106* (2013.01); *H04N 21/816* (2013.01); *G06T 2207/20221* (2013.01)

(58) Field of Classification Search
CPC ........... H04N 21/4788; H04N 21/8106; H04N 21/816; H04N 7/183; H04N 21/4312; H04N 21/4728; G06F 3/013; G06F 40/58; G06T 5/50; G06T 7/20; G06T 15/00; G06T 17/00; G06T 2207/20221; G06Q 30/0643; G06Q 50/01; G06Q 50/10; G06Q 90/20; G09G 5/377
See application file for complete search history.

(56) References Cited

U.S. PATENT DOCUMENTS

| | | | | |
|---|---|---|---|---|
| 11,459,117 | B1 * | 10/2022 | Shapiro | ..................... G08G 5/54 |
| 2008/0215204 | A1 * | 9/2008 | Roy | ................... H04B 7/18504 |
| | | | | 701/28 |
| 2009/0281684 | A1 * | 11/2009 | Spek | ..................... G01C 23/005 |
| | | | | 701/7 |
| 2013/0038692 | A1 | 2/2013 | Ohtomo et al. | |
| 2016/0117853 | A1 * | 4/2016 | Zhong | ..................... B64U 30/20 |
| | | | | 345/634 |
| 2016/0300392 | A1 | 10/2016 | Jonczyk et al. | |
| 2017/0061231 | A1 | 3/2017 | Higa | |
| 2017/0061813 | A1 * | 3/2017 | Tao | ........................... G09B 9/08 |
| 2017/0142486 | A1 | 5/2017 | Masuda | |
| 2017/0329144 | A1 | 11/2017 | Usami | |
| 2018/0196425 | A1 | 7/2018 | Kobayashi | |
| 2018/0249148 | A1 | 8/2018 | Roulet et al. | |

| | | | | |
|---|---|---|---|---|
| 2019/0047706 | A1 * | 2/2019 | Schwarzbach | ......... B64U 20/80 |
| 2019/0052838 | A1 | 2/2019 | Ashkenazi et al. | |
| 2019/0139430 | A1 | 5/2019 | Ghatage et al. | |
| 2019/0250601 | A1 * | 8/2019 | Donahoe | ............... G05D 1/101 |
| 2019/0266424 | A1 | 8/2019 | Nishimura et al. | |
| 2020/0160740 | A1 | 5/2020 | Nedivi | |
| 2020/0218072 | A1 | 7/2020 | Inatani et al. | |
| 2020/0341714 | A1 | 10/2020 | Yuasa et al. | |
| 2020/0363866 | A1 | 11/2020 | Gerard et al. | |
| 2021/0031109 | A1 * | 2/2021 | Konyndyk | .............. A63F 13/26 |
| 2021/0047037 | A1 * | 2/2021 | Karatayev | ............. A63F 13/211 |
| 2021/0225017 | A1 | 7/2021 | Holzer et al. | |
| 2021/0287553 | A1 * | 9/2021 | Won | ......................... G08G 5/74 |
| 2022/0024588 | A1 | 1/2022 | Wake et al. | |

FOREIGN PATENT DOCUMENTS

| | | | |
|---|---|---|---|
| JP | 2002-169901 | A | 6/2002 |
| JP | 2007-207260 | A | 8/2007 |
| JP | 2012-010418 | A | 1/2012 |
| JP | 2013-038622 | A | 2/2013 |
| JP | 2015-005967 | A | 1/2015 |
| JP | 2016-090773 | A | 5/2016 |
| JP | 2018-112809 | A | 7/2018 |
| JP | 2019-036025 | A | 3/2019 |
| JP | 2019-075075 | A | 5/2019 |
| JP | 2019-149016 | A | 9/2019 |
| JP | 2019-164216 | A | 9/2019 |
| JP | 2019-195169 | A | 11/2019 |
| JP | 2019-197939 | A | 11/2019 |
| JP | 6727388 | B2 | 7/2020 |
| JP | 2020-120388 | A | 8/2020 |
| JP | 2020-176995 | A | 10/2020 |
| JP | 2021-043599 | A | 3/2021 |
| WO | 2015/170461 | A1 | 11/2015 |
| WO | 2016/009864 | A1 | 1/2016 |
| WO | 2017/108668 | A1 | 6/2017 |
| WO | 2019-503612 | A | 2/2019 |
| WO | 2019/150675 | A1 | 8/2019 |
| WO | 2020/116493 | A1 | 6/2020 |

OTHER PUBLICATIONS

Non-Final Office Action dated Jan. 3, 2025 issued in related U.S. Appl. No. 18/286,357.
Extended European Search Report dated Aug. 27, 2024 issued in the corresponding European Patent Application No. 22788231.3.
Extended European Search Report dated Sep. 10, 2024 issued in the corresponding European Patent Application No. 22788228.9.
Extended European Search Report dated Sep. 12, 2024 issued in the corresponding European Patent Application No. 22788230.5.
Extended European Search Report dated Sep. 18, 2024 issued in the corresponding European Patent Application No. 22788229.7.
International Search Report issued on Jul. 5, 2022 in International Patent Application No. PCT/JP2022/018088, with English translation.
International Search Report issued on Jun. 28, 2022 in International Patent Application No. PCT/JP2022/018086, with English translation.
International Search Report issued on Jul. 5, 2022 in International Patent Application No. PCT/JP2022/018087, with English translation.
International Search Report issued on Jun. 28, 2022 in International Patent Application No. PCT/JP2022/018089, with English translation.
Non-Final Office Action dated Feb. 26, 2025 issued in U.S. Appl. No. 18/286,346.

* cited by examiner

FIG. 1
PRIOR ART

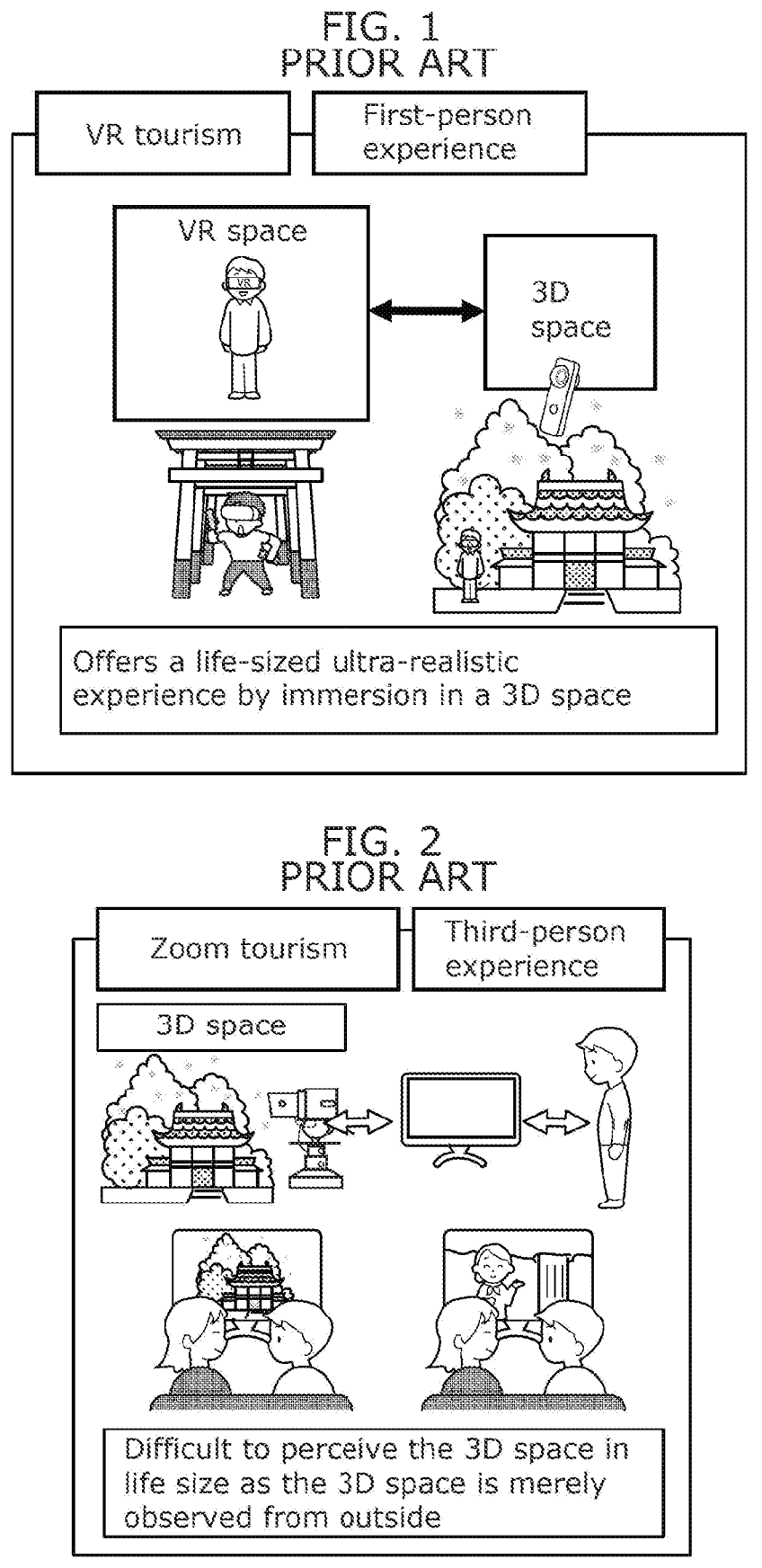

| VR tourism | First-person experience |

VR space 3D space

Offers a life-sized ultra-realistic experience by immersion in a 3D space

FIG. 2
PRIOR ART

| Zoom tourism | Third-person experience |

3D space

Difficult to perceive the 3D space in life size as the 3D space is merely observed from outside

FIG. 5
PRIOR ART

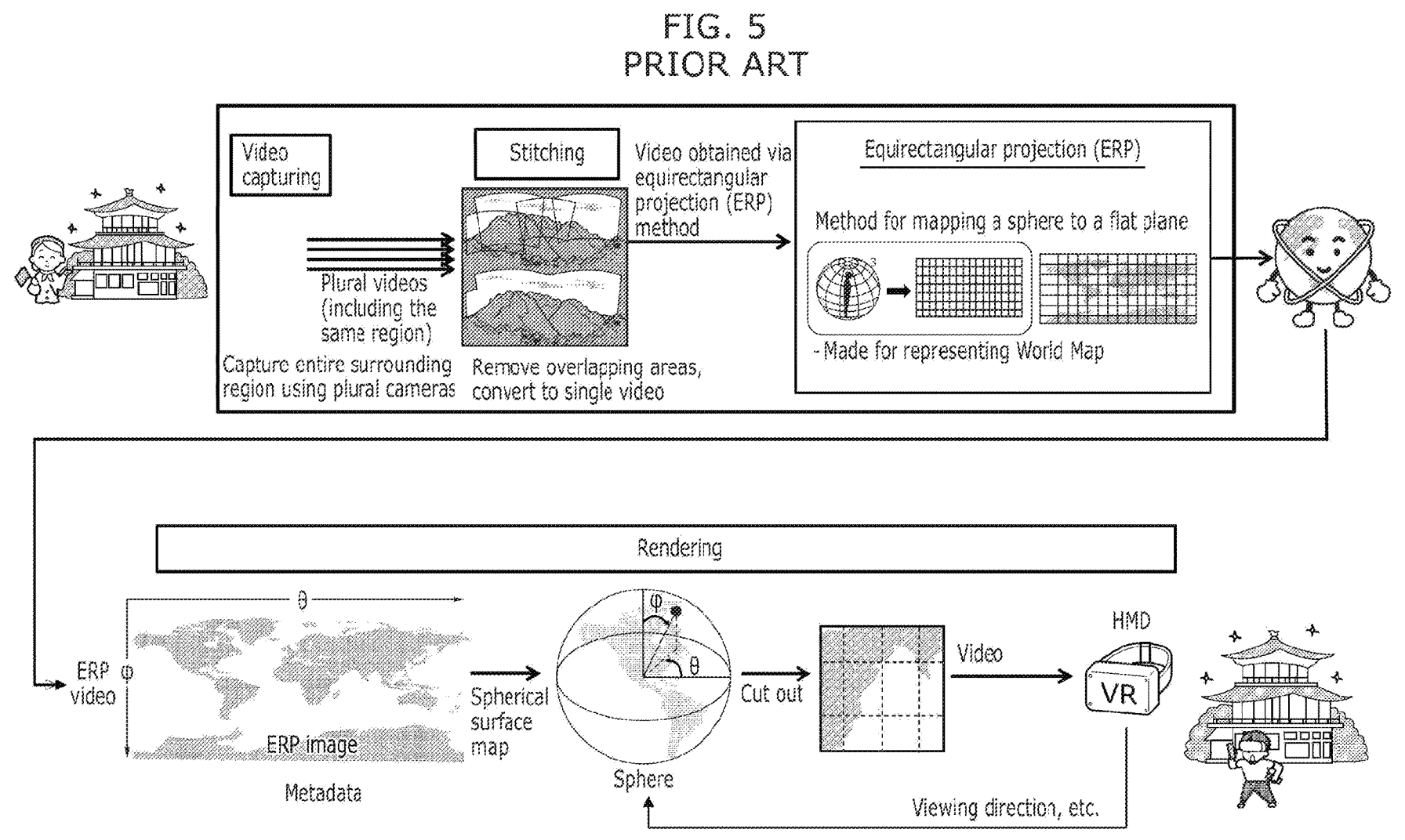

Video capturing

Stitching

Video obtained via equirectangular projection (ERP) method

Plural videos (including the same region)

Capture entire surrounding region using plural cameras

Remove overlapping areas, convert to single video

Equirectangular projection (ERP)

Method for mapping a sphere to a flat plane

- Made for representing World Map

Rendering

ERP video

θ

ERP image

φ

Metadata

Spherical surface map

Sphere

θ

φ

Cut out

Video

HMD

VR

Viewing direction, etc.

FIG. 10
PRIOR ART

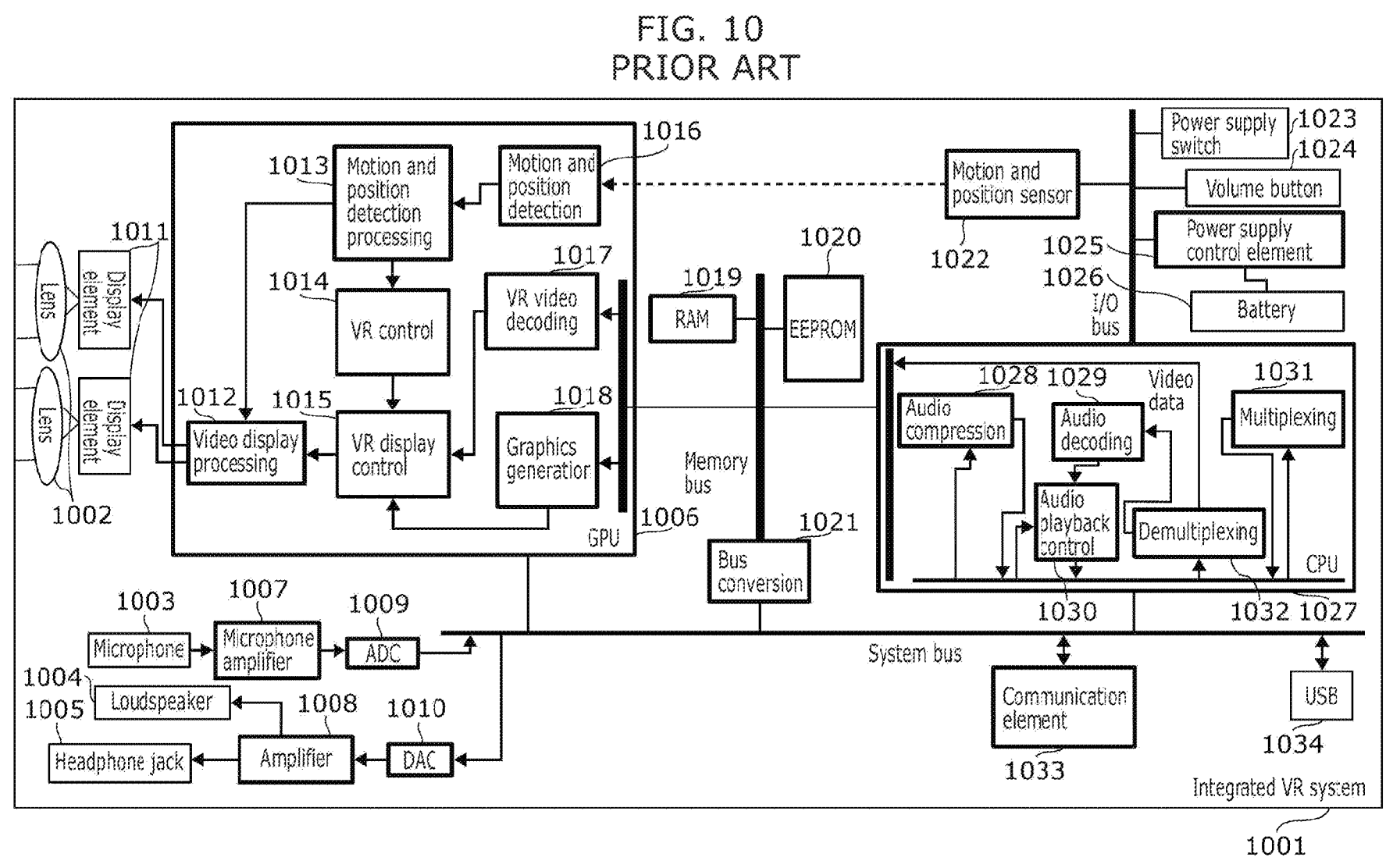

Integrated VR system 1001

Power supply switch 1023
Volume button 1024
Power supply control element 1025
Battery 1026
I/O bus Motion and position sensor 1022

CPU
Multiplexing 1031
Demultiplexing 1032
USB 1034
1027
Video data
Audio decoding 1029
Audio playback control 1030
Audio compression 1028
Communication element 1033
System bus EEPROM 1020
RAM 1019
Bus conversion 1021
Memory bus GPU
Motion and position detection 1016
VR video decoding 1017
Graphics generator 1018
Motion and position detection processing 1013
VR control 1014
VR display control 1015
Video display processing 1012
1006

Display element 1011
Display element
Lens 1002
Lens

ADC 1009
Microphone amplifier 1007
Microphone 1003
DAC 1010
Amplifier 1008
Loudspeaker 1005
Headphone jack
1004

Figure 18:
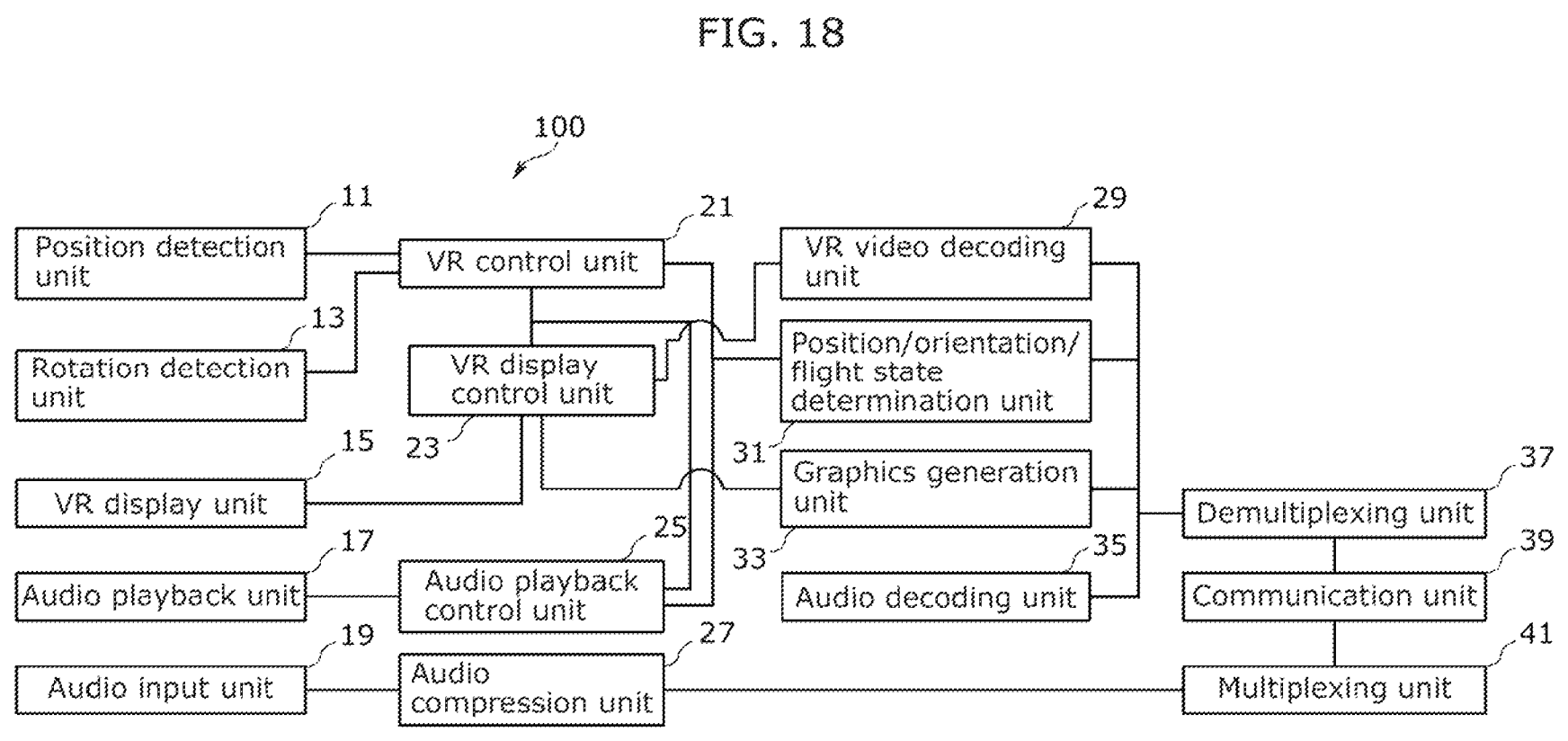

Position detection unit — 11

Rotation detection unit — 13

VR display unit — 15

Audio playback unit — 17

Audio input unit — 19

VR control unit — 21

VR display control unit — 23

Audio playback control unit — 25

Audio compression unit — 27

VR video decoding unit — 29

Position/orientation/ flight state determination unit — 31

Graphics generation unit — 33

Audio decoding unit — 35

Demultiplexing unit — 37

Communication unit — 39

Multiplexing unit — 41

FIG. 21
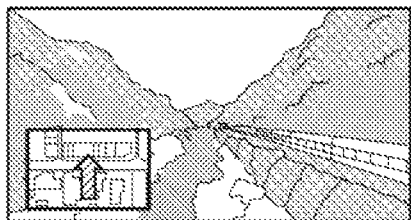
Example of how map is displayed
when accelerating
(bottom left to top right hatching)
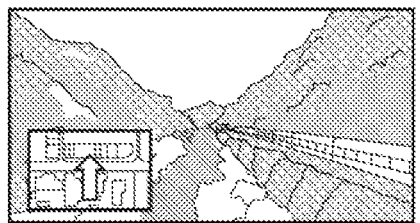
Example of how map is displayed
when flying at constant speed
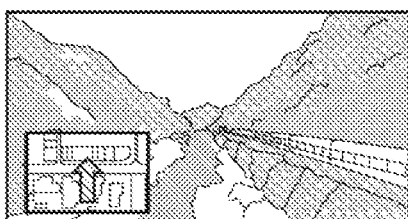
Example of how map is displayed
when decelerating
(bottom right to top left hatching)
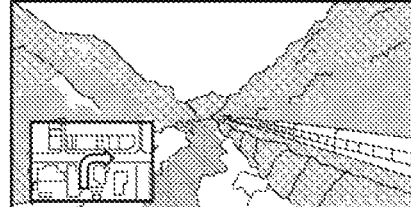
Example of how map is displayed
when turning right while flying at
constant speed

FIG. 22

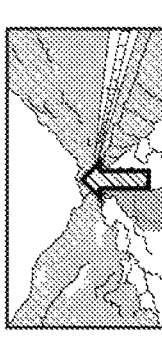

Example of how arrow is displayed when accelerating (bottom left to top right hatching)

Example of how arrow is displayed when decelerating (bottom right to top left hatching)

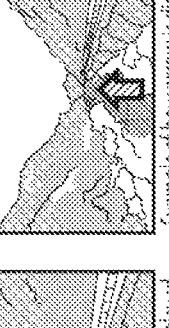

Example of how arrow is displayed when flying at constant speed

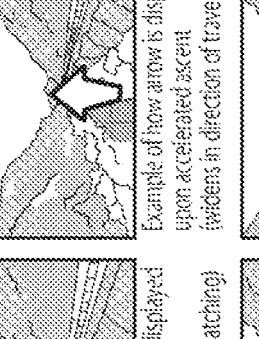

Example of how arrow is displayed upon accelerating

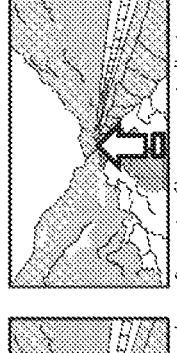

Example of how accelerated ascent (widens in direction of travel)

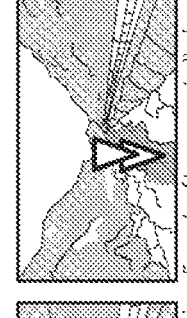

Example of how arrow is displayed when accelerating and ascending (bottom left to top right hatching)

Example of how arrow is displayed when ascending at constant speed

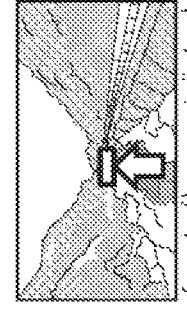

Example of how arrow is displayed upon decelerating

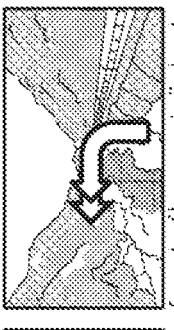

Example of how arrow is displayed when decelerating and ascending (bottom right to top left hatching)

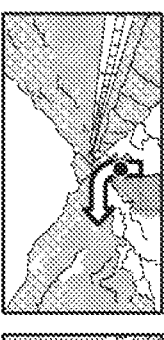

Example of how arrow is displayed upon accelerated descent (bottom left to top right hatching)

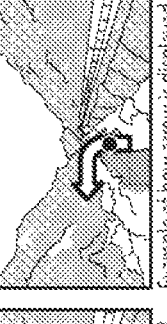

Example of how decelerated descent (bottom right to top left hatching)

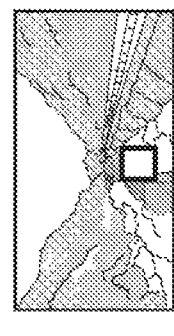

Example of how arrow is displayed when decelerating

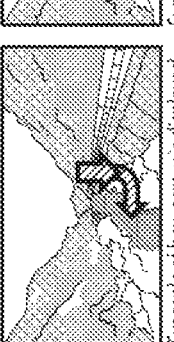

Example of how arrow is displayed when turning left while accelerating

Example of how arrow is displayed when decelerating and descending (bottom right to top left hatching)

Example of how arrow is displayed when turning left while accelerating and descending (bottom right to top left hatching)

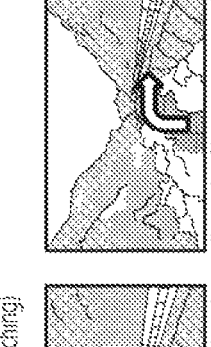

Example of how arrow is displayed when turning left while decelerating (black dot in arrow)

Example of display for when hovering when stopped

Example of how arrow is displayed when turning right

FIG. 23

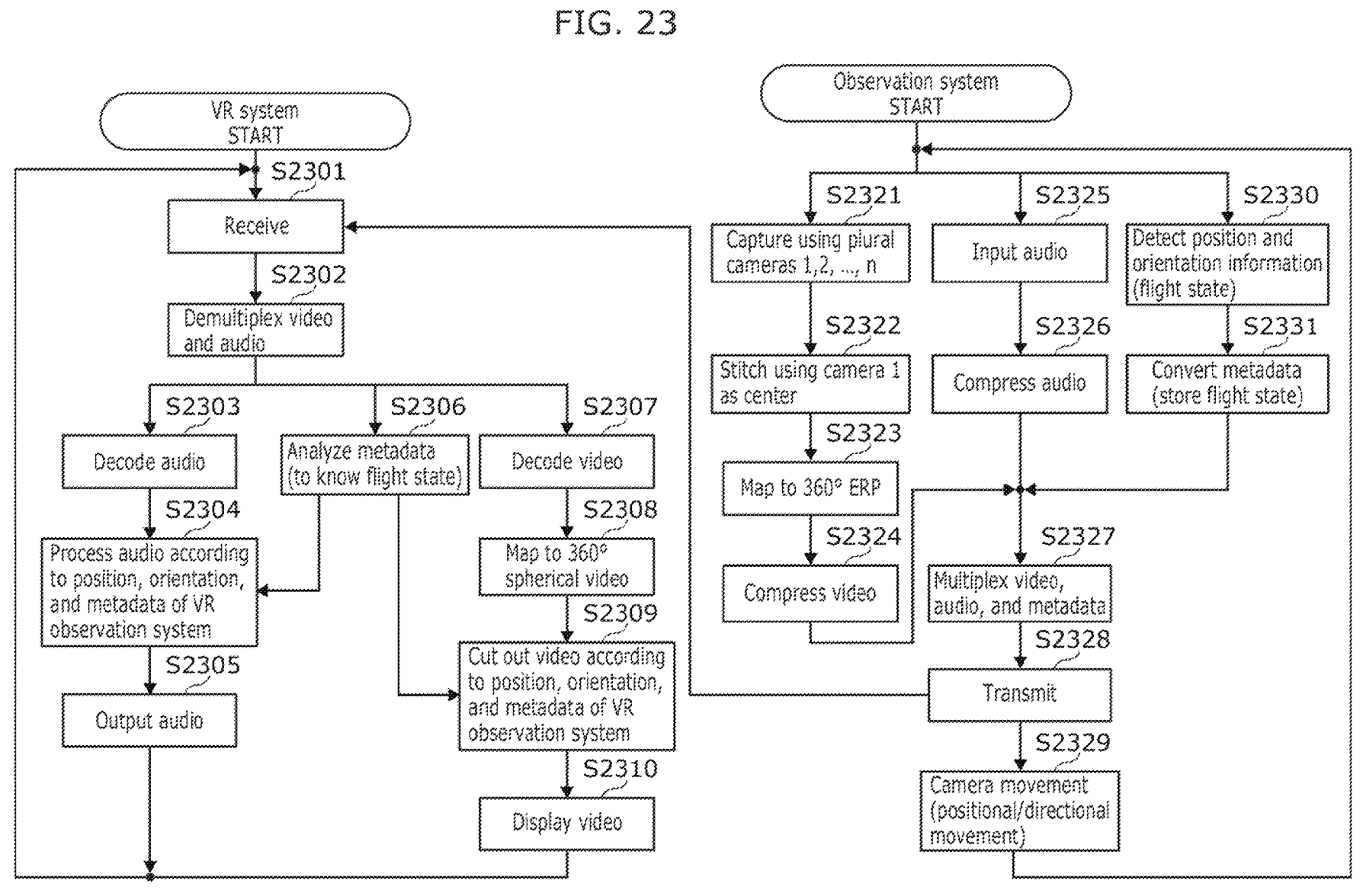

Observation system START

S2321 Capture using plural cameras 1,2, ..., n
S2322 Stitch using camera 1 as center
S2323 Map to 360° ERP
S2324 Compress video S2325 Input audio
S2326 Compress audio S2330 Detect position and orientation information (flight state)
S2331 Convert metadata (store flight state)

S2327 Multiplex video, audio, and metadata
S2328 Transmit
S2329 Camera movement (positional/directional movement)

VR system START

S2301 Receive
S2302 Demultiplex video and audio

S2306 Analyze metadata (to know flight state)

S2307 Decode video
S2308 Map to 360° spherical video
S2309 Cut out video according to position, orientation, and metadata of VR observation system
S2310 Display video S2303 Decode audio
S2304 Process audio according to position, orientation, and metadata of VR observation system
S2305 Output audio

FIG. 25

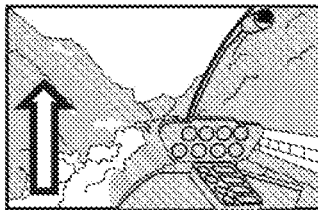

Example of when
accelerating

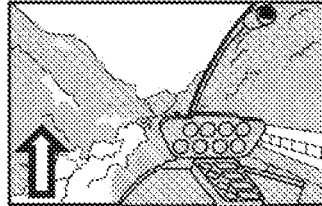

Example of when flying
at constant speed

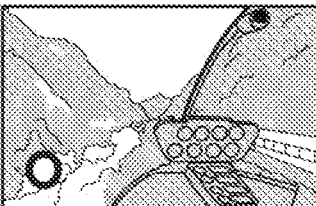

Example of when
hovering

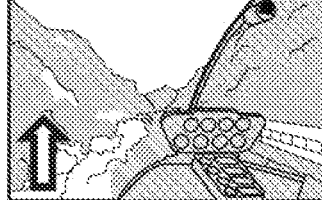

Example of when
decelerating

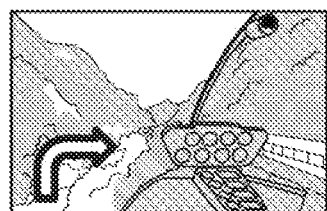

Example of when
turning right

FIG. 26

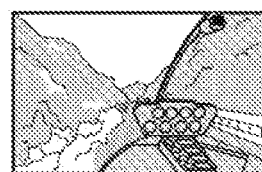

Display example of when accelerating
Display example of when decelerating
Display example of when flying at constant speed
Display example of when hovering

FIG. 27

Display Example 1 of
when turning right
Outside view is tilted

FIG. 28

Display Example 2 of
when turning right
Cockpit is tilted

FIG. 29
Aircraft cockpit
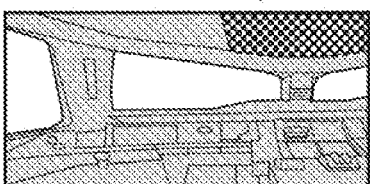
Example of aircraft cockpit
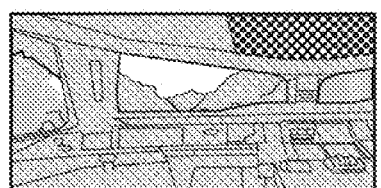
FIG. 30
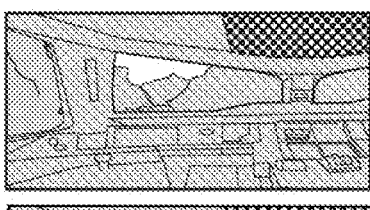
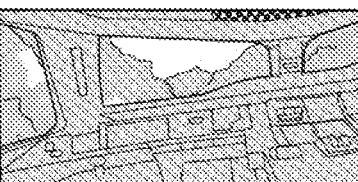
Turning right
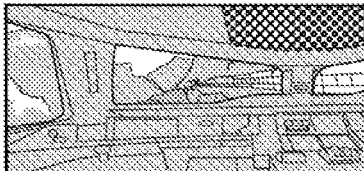
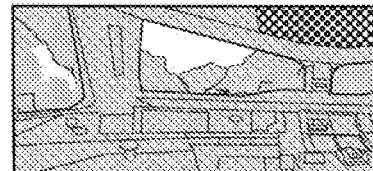
Turning left
Outside view is tilted
cockpit is tilted

FIG. 31

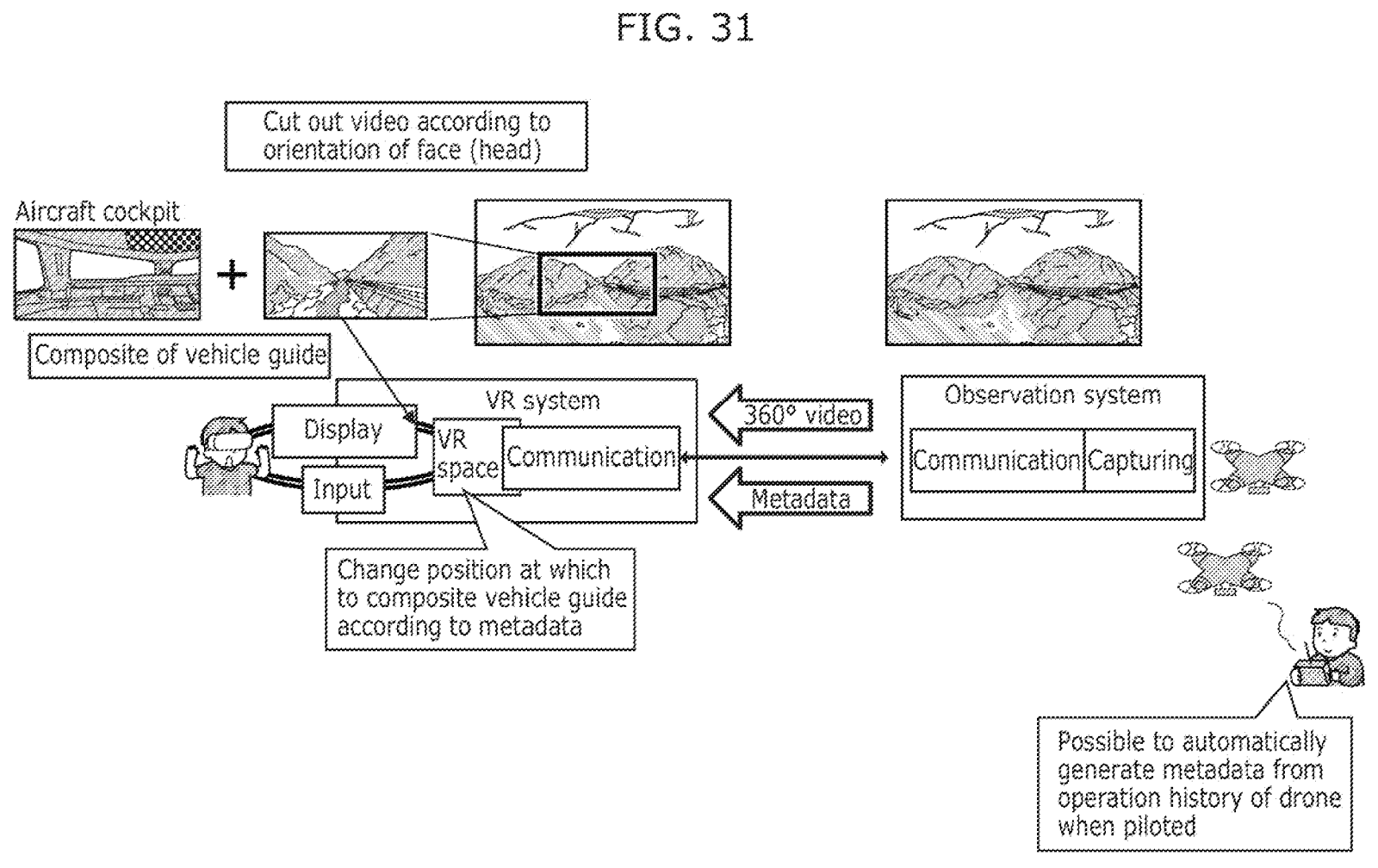

Cut out video according to orientation of face (head)

Aircraft cockpit

Composite of vehicle guide

+

Observation system

Communication | Capturing

360° video

Metadata

Possible to automatically generate metadata from operation history of drone when piloted VR system VR space | Communication Display Input Change position at which to composite vehicle guide according to metadata FIG. 32
Example of aircraft cockpit
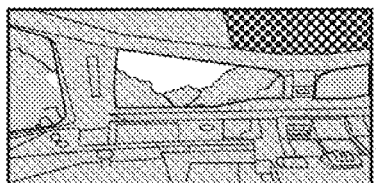
Normal flight
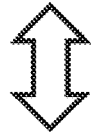
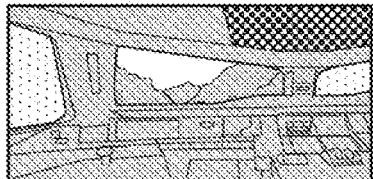
Example of display of cockpit
where portions other than
front view are masked with
semitransparent mask
(in order to prompt focus on
afront view during acceleration,
deceleration, and turning)

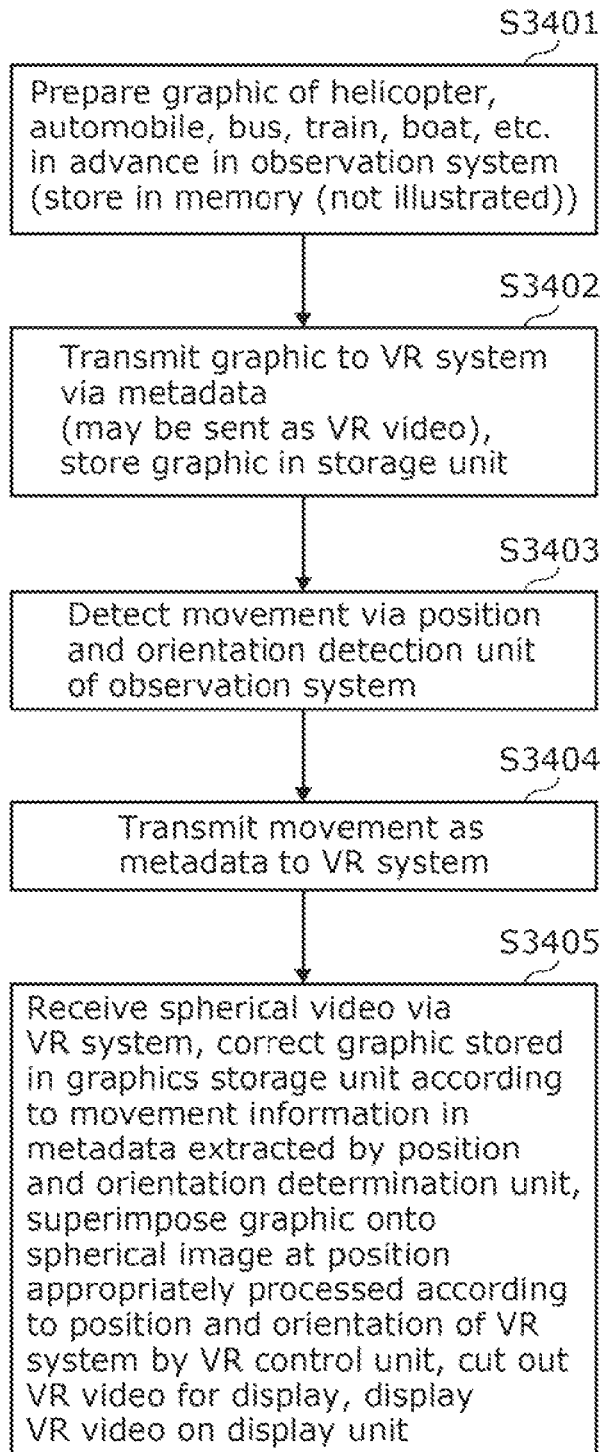

S3401

Prepare graphic of helicopter,
automobile, bus, train, boat, etc.
in advance in observation system
(store in memory (not illustrated))

S3402

Transmit graphic to VR system
via metadata
(may be sent as VR video),
store graphic in storage unit

S3403

Detect movement via position
and orientation detection unit
of observation system

S3404

Transmit movement as
metadata to VR system

S3405

Receive spherical video via
VR system, correct graphic stored
in graphics storage unit according
to movement information in
metadata extracted by position
and orientation determination unit,
superimpose graphic onto
spherical image at position
appropriately processed according
to position and orientation of VR
system by VR control unit, cut out
VR video for display, display
VR video on display unit

| Type | Data configuration | Comments |
|---|---|---|
| Metadata type | | Code indicating for VR use |
| Version number | | Version of metadata in question |
| Function code | 0 or 0101 | Code indicating movement state is included (0101) |
| Reference position | X, Y, Z or latitude, longitude, altitude | If 0 or particular pattern, position at time of reset is used as reference value |
| Camera position | X, Y, Z or latitude, longitude, altitude | Absolute coordinates or relative coordinates from reference-based coordinates |
| Guide position | Horizontal rotation angle, elevation angle, horizontal distance, or X, Y, Z | Relative position from position in front of camera |
| Movement direction, speed | Direction (orientation) of movement, speed | Direction from front of camera or orientation with north as front, speed is absolute value of speed or speed in X, Y and orientation or direction from front of camera |
| Target count | n | No target when 0 |
| Position of target (1) | Horizontal rotation angle, elevation angle, horizontal distance, or X, Y, Z | Relative position from position in front of camera |
| Position of target (2) | Horizontal rotation angle, elevation angle, horizontal distance, or X, Y, Z | Relative position from position in front of camera |
| ⋮ | ⋮ | |
| Position of target (n) | Horizontal rotation angle, elevation angle, horizontal distance, or X, Y, Z | Relative position from position in front of camera |
| Movement state | Bit assignment | Indicates meaning of each bit in other figure |
| Verification code | | Code such as CRC for checking metadata consistency |

FIG. 38

| Bit | Value | Meaning |
|---|---|---|
| 1, 0 | 00: completely stopped, 01: idling or hovering, 10: moving forward, 11: moving backward | Indicates whether stopped or in motion |
| 3, 2 | 00: constant speed, 01: accelerating, 10: decelerating, 11: coming to stop | Accelerating/decelerating state |
| 5, 4 | 00: straight forward, 01: turning right, 10: turning left, 11: null | Turning state |
| 7, 6 | 00: horizontal, 01: ascending, 10: descending, 11: null | Indicates ascending or descending |
| 31-8 | All 0 | Spare |

VIDEO DISPLAY SYSTEM, OBSERVATION DEVICE, INFORMATION PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2022/018088, filed on Apr. 18, 2022, which in turn claims the benefit of U.S. Provisional Patent Application No. 63/176,004, filed on Apr. 16, 2021, the entire disclosures of which Applications are incorporated by reference herein.

TECHNICAL FIELD

The present disclosure relates to a video display system, an observation device, an information processing method, and a recording medium.

BACKGROUND ART

In recent years, there has been much development of display devices that are worn on the head, commonly known as head-mounted displays. For example, Patent Literature (PTL) 1 discloses a head-mounted display that can present (i.e., display) video of content and video of the outside world. In the head-mounted display disclosed in PTL 1, the luminance of at least one of the video of content or the video of the outside world is adjusted to reduce the discomfort of the user when switching between the video of content and the video of the outside world.

CITATION LIST

Patent Literature

[PTL 1] Japanese Unexamined Patent Application Publication No. 2016-090773

SUMMARY OF INVENTION

Technical Problem

There are applications for display devices such as head-mounted displays that take advantage of their highly immersive nature, such as simulating an experience at a certain location by viewing video from a remote location. In such cases, the display device is required to provide appropriate video.

The present disclosure has been conceived in view of the above, and has an object to provide a video display system and the like that are capable of displaying appropriate video.

Solution to Problem

In order to achieve the above object, a video display system according to one aspect of the present disclosure is for displaying a display video via a display device, and includes: a VR device including the display device that displays the display video; an observation device provided in a mobile object to give the observation device mobility, the observation device including a capturing unit configured to capture video, a data obtaining unit configured to obtain data related to a movement speed of the capturing unit, and a transmission unit configured to transmit, together with the data, the video captured; a reception unit configured to receive video and the data; a video generation unit configured to generate the display video including the video received; and a presentation unit configured to cause the video generation unit to generate and output a graphic corresponding to the movement speed from the data received and superimpose the graphic to present the movement speed of the capturing unit.

An observation device according to one aspect of the present disclosure is used in a video display system for displaying a display video on a display device, and includes: a capturing unit configured to capture a wide-angle video; a data obtainment unit configured to obtain data related to a movement speed of the capturing unit; a metadata obtainment unit configured to obtain metadata that is based on the data obtained and includes a movement state of the capturing unit; and a transmission unit configured to transmit, together with the metadata, the wide-angle video captured.

An information processing method according to one aspect of the present disclosure is for displaying a display video on a display device, and includes: receiving data related to a movement speed of a capturing unit configured to move with a mobile object and capture video; and generating and outputting a graphic for presenting a movement state of the capturing unit to a user of the display device by superimposing the graphic on the video captured, the graphic indicating a movement state of the capturing unit based on the movement speed of the capturing unit indicated in the data received.

General or specific aspects of the present disclosure may be realized as a system, a device, an integrated circuit, a computer program, a computer readable recording medium such as a CD-ROM, or any given combination thereof.

Advantageous Effects of Invention

The present disclosure provides a video display system and the like that are capable of displaying appropriate video.

BRIEF DESCRIPTION OF DRAWINGS

FIG. 1 is a first diagram for illustrating a conventional example.

FIG. 2 is a second diagram for illustrating a conventional example.

FIG. 5 is a fifth diagram for illustrating a conventional example.

FIG. 10 is a tenth diagram for illustrating a conventional example.

FIG. 18 is a more detailed block diagram illustrating the functional configuration of the display device according to an embodiment.

FIG. 21 illustrates the correspondence between the movement state (flight state) of the mobile object and graphics that are generated and superimposed.

FIG. 22 illustrates the correspondence between the movement state (flight state) of the mobile object and graphics that are generated and superimposed.

FIG. 23 illustrates one example of the flow of operations performed by the video display system according to an implementation example.

FIG. 25 illustrates one example of the display video generated by the configuration illustrated in FIG. 24.

FIG. 26 illustrates one example of the display video generated by the configuration illustrated in FIG. 24.

FIG. 27 illustrates one example of the display video generated by the configuration illustrated in FIG. 24.

FIG. 28 illustrates one example of the display video generated by the configuration illustrated in FIG. 24.

FIG. 29 illustrates one example of the display video generated by the configuration illustrated in FIG. 24.

FIG. 30 illustrates one example of the display video generated by the configuration illustrated in FIG. 24.

FIG. 31 is a schematic diagram of an example of the configuration of the video display system according to yet another implementation example.

FIG. 32 illustrates one example of the display video generated by the configuration illustrated in FIG. 31.

FIG. 33 illustrates one example of the functional configuration of the video display system according to an implementation example.

FIG. 34 illustrates one example of the flow of operations for graphics composition according to an implementation example.

FIG. 35 illustrates another example of the functional configuration of the video display system according to an implementation example.

FIG. 37 illustrates an example of the metadata structure according to an implementation example.

FIG. 38 illustrates an example of the metadata structure according to an implementation example.

FIG. 39 is for illustrating an example of a configuration of the video display system according to an implementation example realized using the cloud.

FIG. 40 is for illustrating an example of a configuration of the video display system according to an implementation example realized using the cloud.

FIG. 41 is for illustrating an example of a configuration of the video display system according to an implementation example realized using the cloud.

DESCRIPTION OF EMBODIMENTS

Knowledge Forming the Basis of Disclosure

Figure 3:
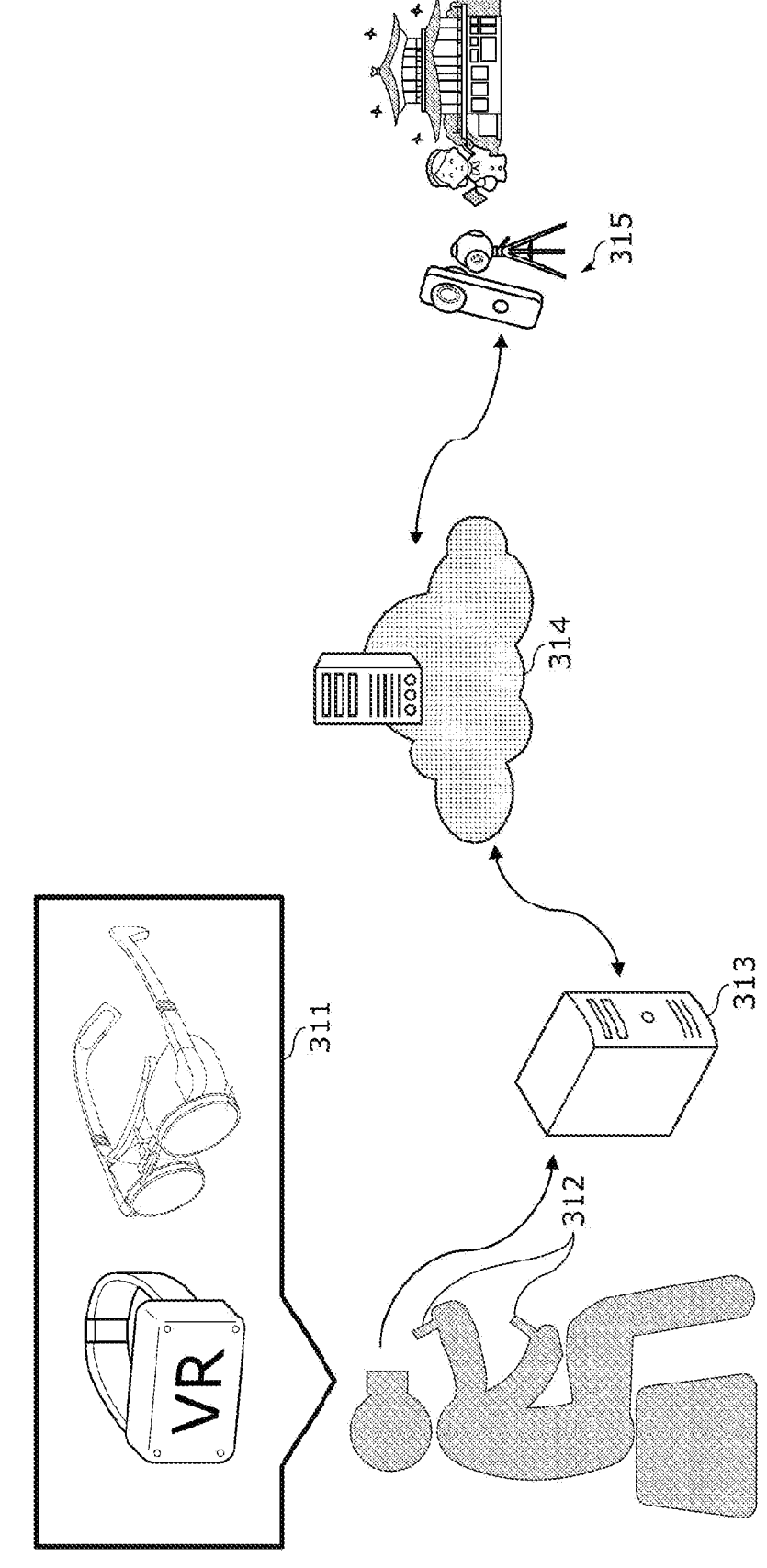
FIG. 3 is a third diagram for illustrating a conventional example.

In recent years, display devices have been developed that enable a user to wear the display unit on their heads, placed in front of their eyes, and thus view displayed images on a screen that appears to be large. Such a display device is known as a head-mounted display (HMD), and allows images to optically appear as a large screen. Some HMDs also allow the video being viewed to appear three-dimensionally by displaying video with a disparity shift corresponding to the user's right and left eyes. Recent improvements in communication quality have made it possible to view video captured by remotely located observation devices in real time with a delay of only a few to tens of milliseconds, enabling the viewer to experience the scene as if they were there without having to visiting the site. Utilizing this technology, virtual tourism experiences such as sightseeing tours, exhibition tours, inspection tours, factory tours, and visits to art and other types of museums, zoos, and aquariums (hereinafter referred to as "pseudo tourism" or "VR (virtual reality) tourism") have also come about.

Cameras capable of capturing 360-degree (full circle in the horizontal plane) video (also referred to as an omnidirectional camera) are used as observation devices in VR tourism. Video captured by such an observation device has a wide viewing angle, and the display device used by the user is capable of cutting out a portion of the video in any given direction and displaying the cut out portion. For example, if the display device includes a function for detecting the direction in which the user is facing, the display device can cut out and display a portion of the 3D video space in accordance with the user's orientation, making it possible to provide a viewing experience that meets the needs of many users from a video captured by a single camera.

Here, when the user is watching some video in a given direction and the observation device moves, there user may experience some unintended movement in the video. For example, if the observation device moves such that the 3D video space moves to the 12 o'clock orientation while the user is facing 2 o'clock in the 3D video space, the video will suddenly move to the 10 o'clock orientation from the user's perspective. Such movement causes sensory incongruency between the virtual space and the real space, and is one factor that causes user discomfort. This phenomenon, also known as VR sickness, makes it difficult to watch videos for long periods of time.

In recent years, it has become possible to provide a VR experience that gives the user a sense of flying by using a drone, which is a small flying object, equipped with a camera. In such applications, the effects of VR sickness described above become more pronounced, and countermeasures are required.

In view of the above, in order to inhibit such VR sickness, the present disclosure has an object to provide a video display system that can present to the user the direction in which the video moves when the video moves. Although the description in the present disclosure presents an example in which 360-degree wide-angle video is captured by the observation device, a wide-angle video may be, for example, a video captured over 270 degrees, 180 degrees, or 150 degrees, or some other given angular range. The wide-angle video may be at least wider than the angle at which the user views the video displayed on their display device. Although the present disclosure describes a video display system that assumes video movement occurring in both the horizontal plane and an intersecting plane that intersects the horizontal plane, including vertical components, the present disclosure can also be applied to video movement occurring in only the horizontal plane or only in an intersecting plane that intersects the horizontal plane.

Hereinafter, conventional video display systems and the like will be described in further detail with reference to the drawings. FIG. 1 is a first diagram for illustrating a conventional example. As illustrated in FIG. 1, a service called VR tourism (first-person experience) has conventionally been offered. With VR tourism, if a local space is properly reproduced in VR, it is possible to experience tourism as if one were in that location. Examples of services with 360° degree camera photography include FirstAirlines (https://firstairlines.jp/index.html) and Travel Aid (https://www.to-kyotravelpartners.jp/kaigotabisuke-2/). Examples of services with 3D computer graphics (CG) include Google Earth VR and Boulevard (https://www.bivrd.com/).

FIG. 2 is a second diagram for illustrating a conventional example. As illustrated in FIG. 2, in addition to VR tourism, other services for viewing such videos from a third-person perspective by displaying videos captured at the site on a display device such as a television (also called third-person experiences) are also offered. A third-person experience offers features such as user-specific services, such as guides by experts, that can be monetized if they fit the individual's interests.

FIG. 3 is a third diagram for illustrating a conventional example. As illustrated in FIG. 3, when developing VR tourism, the basic configuration requires VR system main unit 311, controller 312, computer/smartphone 313, network/cloud 314, and observation system 315. Conventionally, VR system main units 311 were solely HMD units, which are heavy and cover the face considerably, but smaller units that are more like glasses are becoming more widespread as they are easier to use for long periods of time. There are two types of VR system main units 311: the all-in-one type in which VR system main unit 311 performs all the necessary functions, and the tethered type in which some functions are left to, for example, computer/smartphone 313. Controller 312 is used for, for example, menu selection and to move through the VR space. In some cases, computer/smartphone 313 may include only communication functionality, and in other cases may be a part of the VR system.

Network/cloud 314 connects observation system 315 and VR system 311, and may implement some functions of observation system 315 or VR system 311 on a cloud-based computer system. Observation system 315 utilizes a 360° camera with wireless capability or a 360°, 180°, or wide-angle camera connected wirelessly or over a wire to computer/smartphone 313. Through these devices, users can view the guide and the buildings and scenery to be visited in the VR space.

Although VR tourism utilizing a 360° camera is used as an example here, VR tourism may utilize anything that allows participants using VR glasses to change their viewpoints, such as a 180° camera. Moreover, although some examples include capturing video and providing a guide of actual scenery, sightseeing can also be realized by using a virtual camera in a virtual space constructed using computer graphics instead of actual scenery, by having guides enter such a virtual space using, for example, VR glasses, and by playing videos in the virtual space. Accordingly, the present invention can be applied to such applications. A typical example of the above is VR travel to areas and spaces that are not easily accessible to the average traveler, such as the moon.

Figure 4:
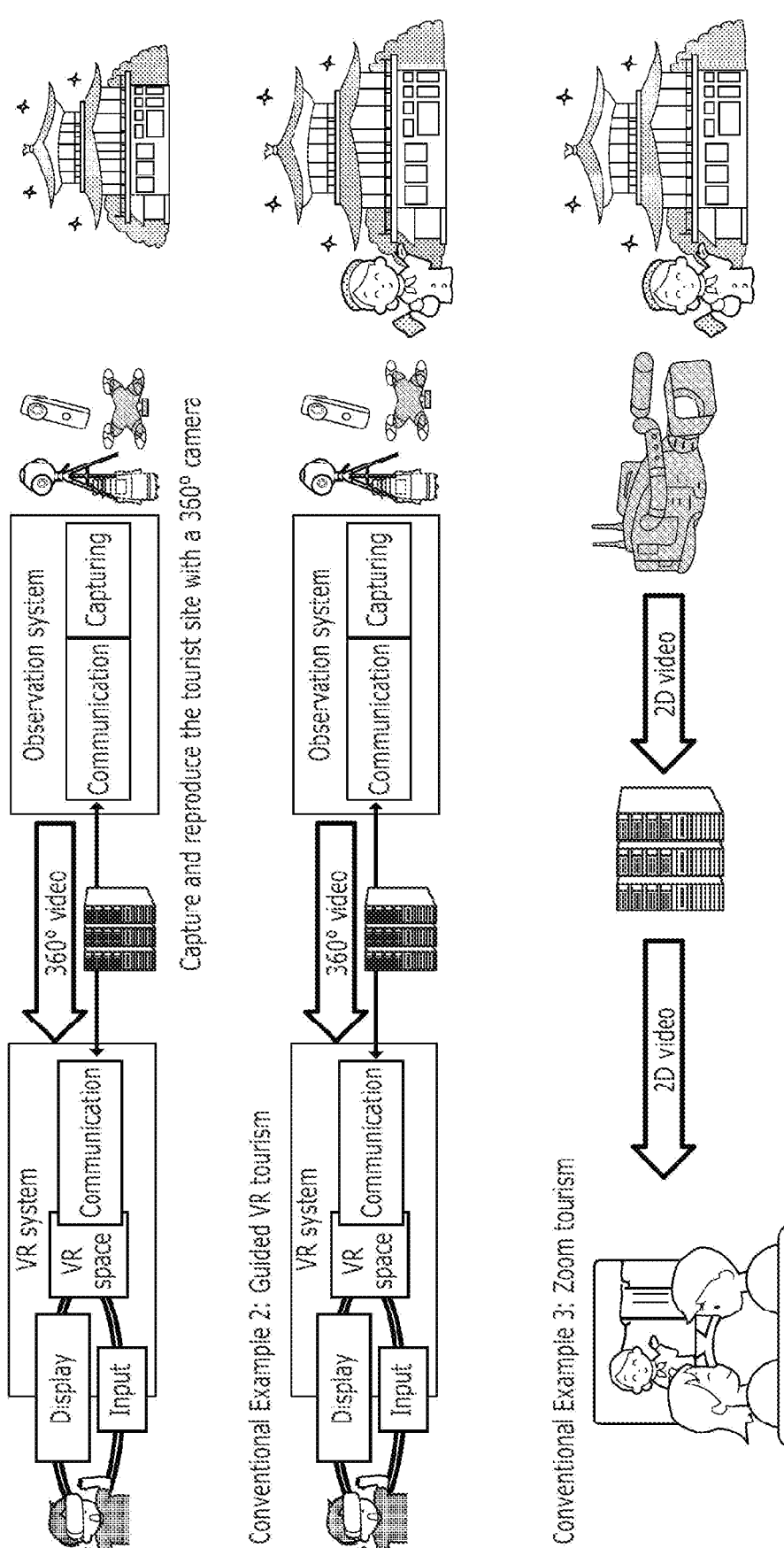
FIG. 4 is a fourth diagram for illustrating a conventional example.

FIG. 4 is a fourth diagram for illustrating a conventional example. FIG. 4 illustrates a schematic configuration of a VR tourism service utilizing 360° camera photography (upper row: without guide (hereinafter referred to as Conventional Example 1), middle row: with guide (hereinafter referred to as Conventional Example 2)) and a conventional example of a Zoom (registered trademark) sightseeing service, which is one example of a third-person experience (lower row (hereinafter referred to as Conventional Example 3)). In the present invention, audio, audio data, and audio information include not only spoken conversation but also audio signals including music and possibly ultrasonic waves outside the audible bandwidth. In VR tourism services, the observation system (tourism destination) side can send out pre-recorded videos, and the VR system side can operate a 360° camera, robot, or drone to view VR videos on the VR system side. As illustrated in the middle row, it is also possible to have a guide or camera operator on the observation system side and experience the VR video from a 360° camera or the like as VR using the VR system. As illustrated in the lower row, in the third-person experience, 2D video is sent in 2D from the observation system side through an audio visual remote conversation service that a plurality of people participate in such as Zoom, allowing visitors to view and experience video of tourism destinations from a remote location.

FIG. 5 is a fifth diagram for illustrating a conventional example. Next, the overall system configuration for Conventional Example 2 will be described. Conventional Example 1 differs from Conventional Example 2 in that a pre-recorded VR video is used or operations are performed from the VR system side, and the differences between the two will also be explained. The observation system according to Conventional Example 2 includes a camera for capturing VR video such as a 360° camera, and a communication device for sending the captured information to a remote location.

The 360° camera for capturing VR video combines (stitches) videos from a plurality of cameras that capture video in different directions into a single video, maps it onto a flat surface using, for example, the equirectangular projection (ERP) method, compresses it appropriately as an ERP image, and sends it along with audio data captured by, for example, a microphone from the communication device to the VR system at the remote location. The 360° camera may be equipped on a robot or a drone, for example. The 360° camera or the robot or drone equipped with the 360° camera is operated by the photographer or guide. In Conventional Example 1, the 360° camera or the robot or drone equipped with the 360° camera may be operated on the VR system side, or the pre-recorded video or the like may be received on the VR system side.

On the VR system side, contrary to the observation system, the received flat video (ERP image) is converted into a spherical video, a portion of the spherical video is cut out according to the observer's orientation and position and then displayed on the VR display device. In Conventional Example 3, the received video is 2D, so it is displayed as 2D, and in most cases, a 2D display device such as a tablet, smartphone, or TV will be used. The above also applies to cases in which pre-recorded video is received in Conventional Example 1.

In cases in which the 360° camera or the robot or drone equipped with the 360° camera is operated on the VR system side, there are instances where the observation system operates in conjunction with the orientation and position from the VR system side or operates according to key presses made via a mouse, a tablet, a joystick, and/or a keyboard, or by menus and icons being selected on a screen. Here, appropriate control data needs to be sent from the VR system side to the observation system and the situation on the observation system side, i.e., the orientation and position on the observation system side needs to be sent to the VR system.

Figure 6:
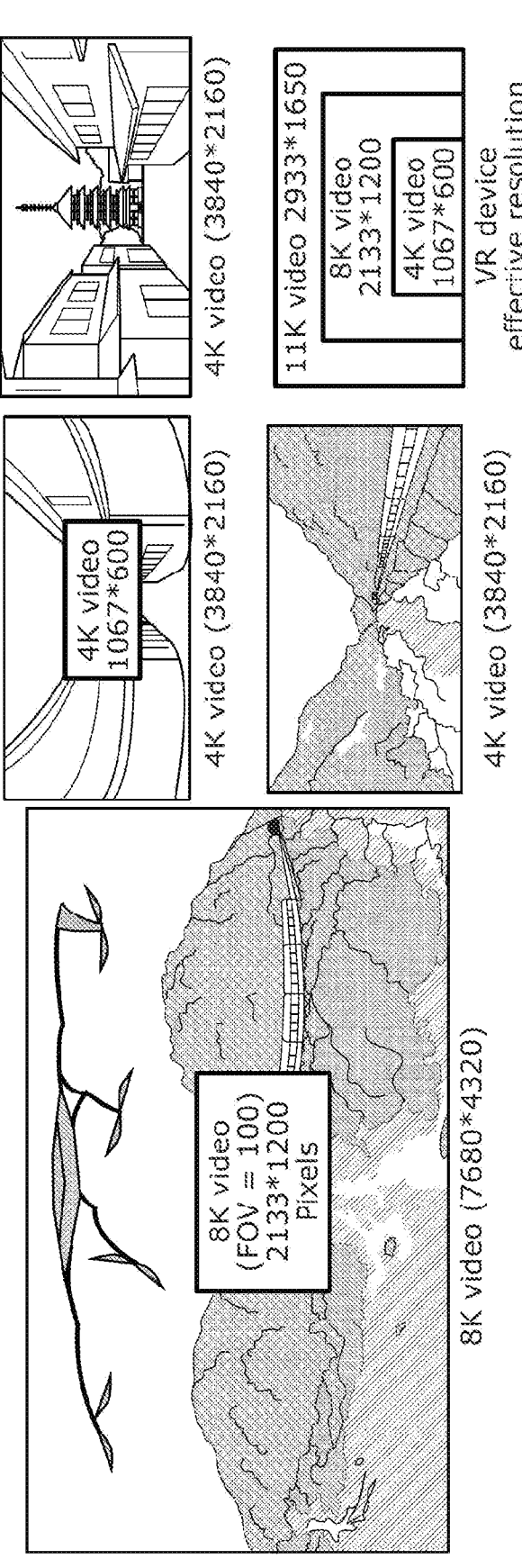
FIG. 6 is a sixth diagram for illustrating a conventional example.

FIG. 6 is a sixth diagram for illustrating a conventional example. The resolution of a 360° video when viewed on a VR system will be described while comparing and contrasting 360° video and regular video illustrated in FIG. 6. When a 360° 4K video is viewed on VR equipment with a viewing angle (FOV) of 100 degrees, the resolution of the video cut out for VR display is only 1067×600 (about twice that of SD video). Since a VR system using a 2K×2K resolution panel for one eye displays video on a square panel, the vertical direction is further stretched by a factor of two, resulting in a very low resolution video.

The resolution of the VR display for 8K video is 2133× 1200, which is 1.23 times the full HD (1920×1080) surface area in terms of data volume, but the vertical direction is stretched by a factor of 2, so the resolution of the video is approximately full HD. For 11K video (10560×5940), the VR resolution is 2933×1650, which is equivalent to the VR system.

In order to provide a high-resolution, highly realistic VR tourism experience, it is necessary to capture at least 8K, preferably 11K. Capturing 8K and 11K requires larger equipment, higher video transfer rates, and greater storage capacity. This makes both capturing and streaming expensive.

Therefore, it is essential to make the system easy to understand and use, to avoid VR sickness, and to lower the unit cost per user to make it more available to a large number of users. Effective use of VR recorded content will also be important for viable business.

Figure 7:
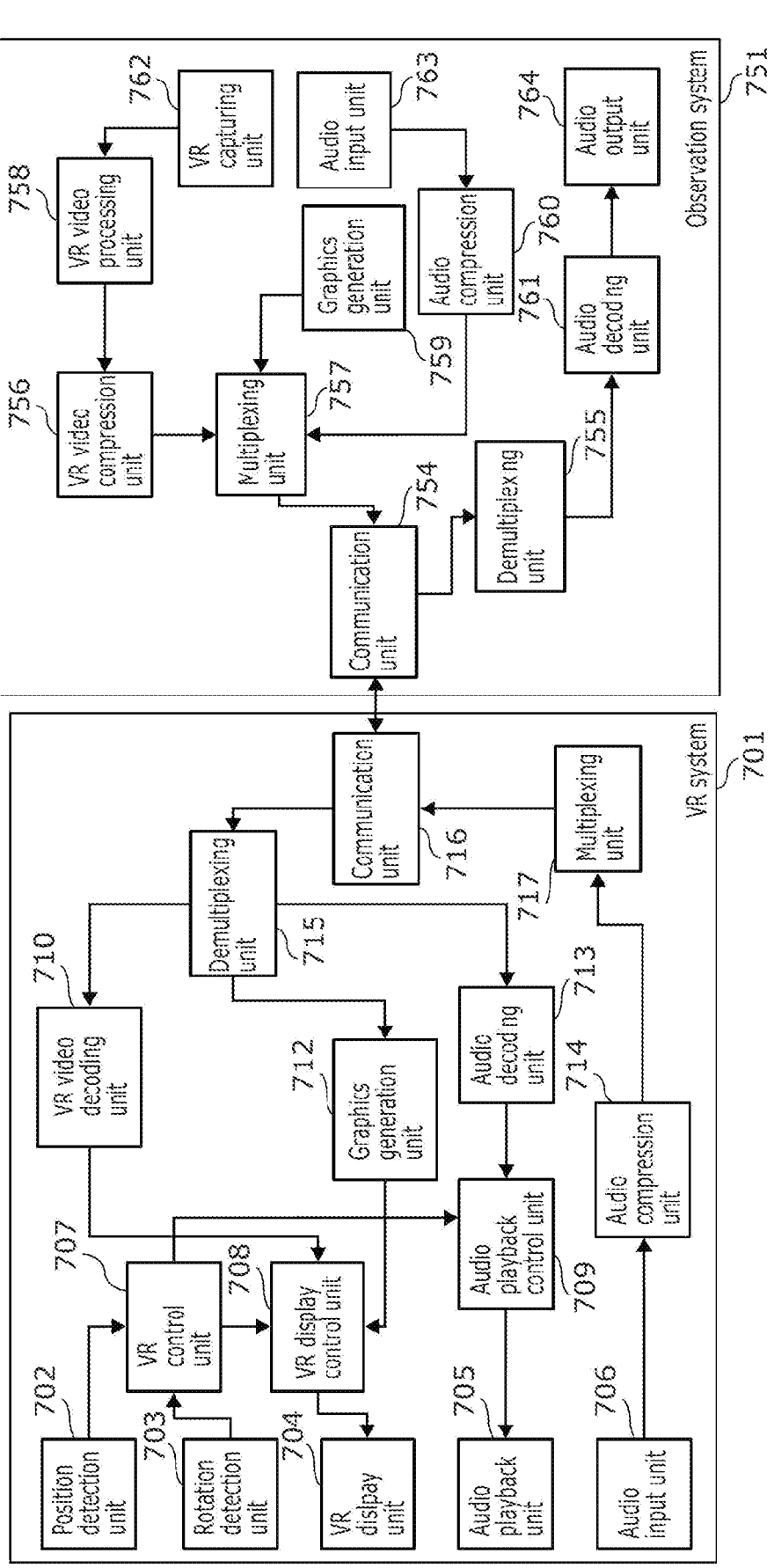
FIG. 7 is a seventh diagram for illustrating a conventional example.

FIG. 7 is a seventh diagram for illustrating a conventional example. Next, the main functions of Conventional Examples 1 and 2 will be described. Observation system 751 of Conventional Examples 1 and 2 includes: VR capturing unit 762 (VR capturing camera) for capturing VR video; VR video processing unit 758 that processes the video captured by VR capturing unit 762 to make images suitable for transmission; VR video compression unit 756 that compresses the VR video processed by VR video processing unit 758 to a data rate and video signal format suitable for transmission; audio input unit 763 including a microphone for receiving audio from the guide and surrounding area; audio compression unit 760 that compresses the audio signal input via audio input unit 763 to a data rate and audio signal format suitable for transmission; graphics generation unit 759 that generates auxiliary information as graphics; multiplexing unit 757 that converts the video signal compressed by VR video compression unit 756, the audio signal compressed by audio compression unit 760, and the graphics information compressed by graphics generation unit 759 into signals suitable for transmission; communication unit 754 for transmitting communication observation signals multiplexed by multiplexing unit 757 to a plurality of VR systems 701 and receiving communication audio signal from the plurality of VR systems 701; demultiplexing unit 755 that extracts compressed audio signals from the communication audio signals received by communication unit 754; audio decoding unit 761 that extracts audio signals from the compressed audio signals from demultiplexing unit 755; and audio output unit 764 for outputting the audio signals decoded by audio decoding unit 761 as sound.

In this example, VR video processing unit 758, VR video compression unit 756, and graphics generation unit 759 are realized in the GPU, while audio compression unit 760, multiplexing unit 757, demultiplexing unit 755, and audio decoding unit 761 are realized in the CPU, but this example is non-limiting; in a simpler configuration, the CPU and the GPU may be realized as a single processor with their original functional configuration and operation.

VR capturing unit 762 is, for example, a 360° camera, and more specifically includes a plurality of cameras that capture images in different directions. The outputs of the cameras are combined (stitched) in the VR video processing unit to create a single video, which is mapped onto a flat surface using, for example, the equirectangular projection (ERP) method, and the result is output as an ERP image.

In contrast to observation system 751, VR system 701 according to Conventional Examples 1 and 2 includes: communication unit 716 that receives communication observation signals transmitted from observation system 751 or transmits, to observation system 751 as communication audio information, audio input via VR system 701; demultiplexing unit 715 that demultiplexes and outputs the compressed VR video (ERP image), graphics information, and compressed audio information from the communication observation signal from communication unit 716; VR video decoding unit 710 that decodes the compressed VR video (ERP image) from demultiplexing unit 715; VR display control unit 708 that converts ERP images from VR video decoding unit 710 into spherical video, cuts out a portion according to control information from VR control unit 707 to obtain video displayable on VR display unit 704, and outputs graphics information from graphics generation unit 712 that converts graphics information output from demultiplexing unit 715 into graphics to be displayed, along with VR video to be displayed on VR display unit 704; and VR display unit 704 that outputs VR video from VR display control unit 708 for viewing by both eyes. The respective outputs of rotation detection unit 703 that detects the front, back, left, and right tilting of VR display unit 704 or the direction of the whites of the eyes and position detection unit 702 that detects the front, back, left, and right tilting of VR display unit 704 and position in the height direction are transmitted to VR control unit 707, and according to the output of VR control unit 707, the video to be displayed on VR display unit 704 and the audio output by the audio playback control unit and audio playback unit 709 are appropriately controlled. Compressed audio information demultiplexed by demultiplexing unit 715 is decoded in audio decoding unit 713 and transmitted to audio playback control unit 709 as audio information. In audio playback control unit 709, according to the control information from VR control unit 707, the balance in the left, right, front, and back directions is corrected and in some cases frequency characteristics processing, delay processing and creation of alarms for VR system 701 are carried out. Graphics generation unit 712 also generates graphics for displaying system menus and warnings for VR system 701, which are superimposed on the VR images and displayed on VR display unit 704. VR system 701 includes audio input unit 706 for receiving input of audio (speech) by the user of VR system 701, and audio information from audio input unit 706 is compressed by audio compression unit 714 into compressed audio information, transmitted to multiplexing unit 717, and sent to observation system 751 from communication unit 716 as communication audio information.

Figure 8:
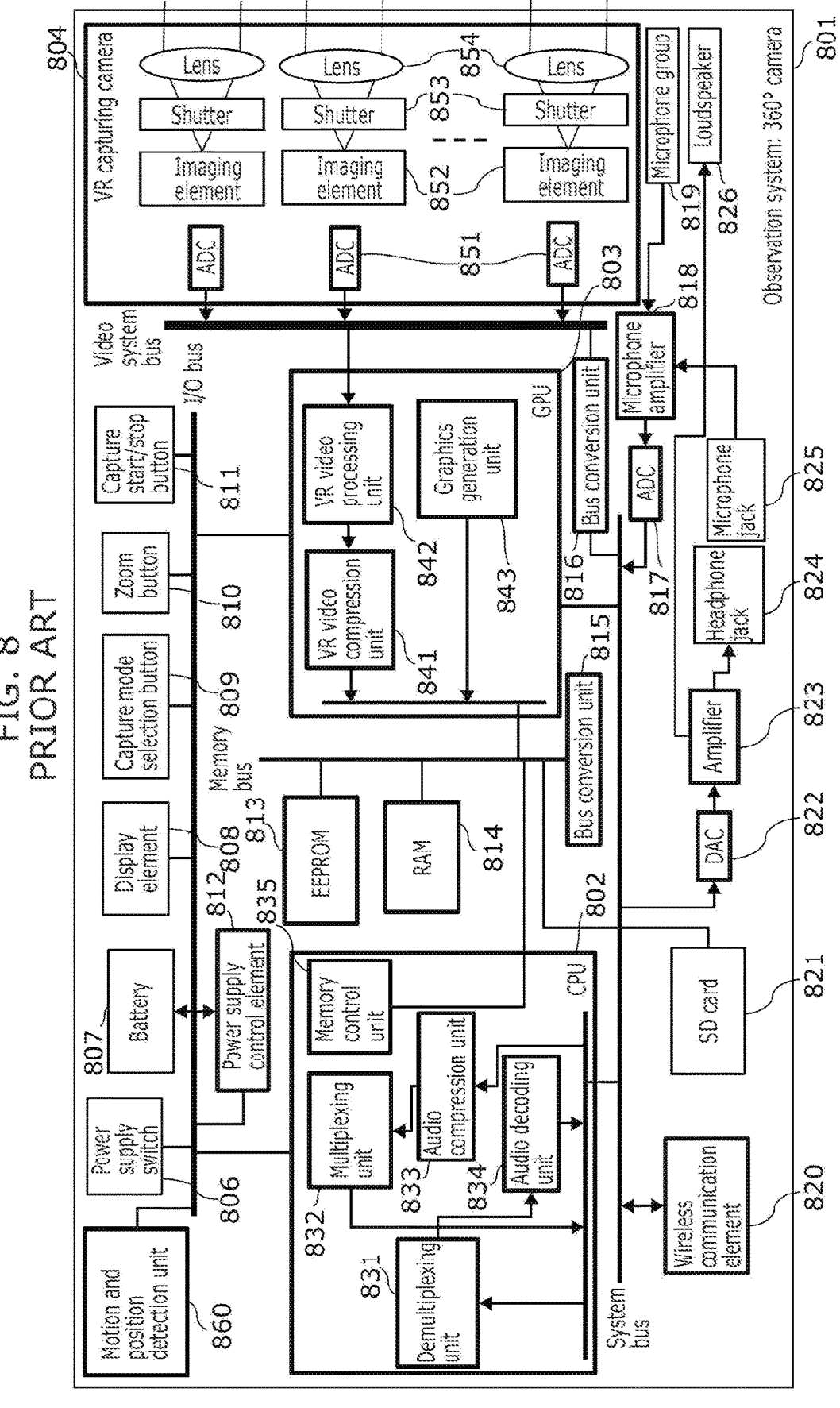
FIG. 8 is an eighth diagram for illustrating a conventional example.

FIG. 8 is an eighth diagram for illustrating a conventional example. Next, a typical realization example of 360° camera 801 will be described as a typical realization example of the observation system according to Conventional Example 2.

A typical example of 360° camera 801 combines two imaging systems each including ultra-wide angle lens 854, shutter 853, and imaging element 852, and captures 360° video all around (in the front, back, up, and down directions). Since two or more imaging systems may be combined to capture higher quality images, in this example, VR capturing camera 804 is illustrated as including two or more imaging systems. The imaging system may consist of a combination of independent cameras, in which case there is generally a high-speed digital video interface after ADC 851 for the video, and with this, the independent cameras are connected to high-speed digital video input connected to the video system bus connected to the graphics processing unit (GPU) 803 or central processing unit (CPU) 802, but the imaging system is described here as an integrated unit.

The main components of 360° camera 801 are: VR capturing camera 804 including the above-described plurality of imaging systems; GPU 803 that mainly processes video data and graphics; CPU 802 that performs general data processing, input/output processing, and overall control of 360° camera 801; Electrical Erasable Programmable ROM (EEPROM) 813 that stores programs for operating CPU 802 and GPU 803; RAM 814 that is used to store data for CPU 802 and GPU 803; SD card (registered trademark) 821, which is removable memory for storing video, audio, and programs; wireless communication element 820 for wireless communication via WiFi (registered trademark) and Bluetooth (registered trademark) for exchanging data with external devices and receiving operations from external devices; buttons and display element 808 for operating and displaying; battery 807; power supply control element 812; an audio input unit including a plurality of microphones (microphone group 819) or microphone jack 825 for inputting audio, microphone amplifier 818, and ADC 817; an audio output unit including loudspeaker 826 or headphone jack 824, amplifier 823, and DAC 822; a video system bus used to connect mainly VR capturing camera 804 and CPU 802 and read digital video data; a memory bus that connects EEPROM 813, RAM 814, SD card 821, GPU 803, and CPU 802 and transmits and receives data to and from the memory; a system bus to which CPU 802, GPU 803, wireless communication element 820, the audio input unit, and the audio output unit are connected and that transmits and receives data to and from and performs controls pertaining thereto; an I/O bus that controls and performs low-speed data transmission with the buttons and display element 808, power supply control element 812, the audio input unit and audio output unit that are not illustrated in the drawing, and VR capturing camera 804; and a number of bus conversion units 815 and 816 for connecting the above buses. Motion and position detection unit 860 is also connected to the I/O bus. Whether a process is performed by GPU 803 or CPU 802 may differ from this example, and the bus configuration may also differ from this example, but even in such cases, there is no difference in the functional configuration and operations that will be described below.

Each VR capturing camera 804 includes: lens 854 for capturing wide-angle video; imaging element 852 that converts light collected by lens 854 into an electrical signal; shutter 853 that is located between lens 854 and imaging element 852 and shuts out light; an iris (not illustrated) that is located in the same position as shutter 853 and controls the intensity of light from lens 854; and ADC 851 that converts the analog electrical signal from imaging element 852 into a digital video signal. Although not illustrated, each VR capturing camera 804 is controlled by CPU 802 via the I/O bus, and CPU 802 is notified of the states of VR capturing cameras 804.

The buttons include power supply switch 806 to turn the power supply on and off, capture start/stop button 811 to start/stop capturing, capture mode selection button 809 to change the mode of capture, which need not be provided, and zoom button 810 to move lens 854 and digitally control the angle of view and zoom in and out.

Power supply control element 812, which may be integrated with battery 807, stabilizes the voltage, manages the battery capacity, and although not illustrated, supplies power to all elements. In addition, power is supplied to the HMD/VR glasses via USB or AV output.

Each of the functions realized by GPU 803 is realized by dedicated hardware and programs, such as image processing hardware and programs, while the functions realized by CPU 802 are generally realized by general-purpose hardware and programs. As one example, GPU 803 is used to implement VR video processing unit 842, VR video compression unit 841, and graphics generation unit 843. As one example, CPU 802 is used to implement memory control unit 835, multiplexing unit 832, audio compression unit 833, audio decoding unit 834, and demultiplexing unit 831.

Figure 9:
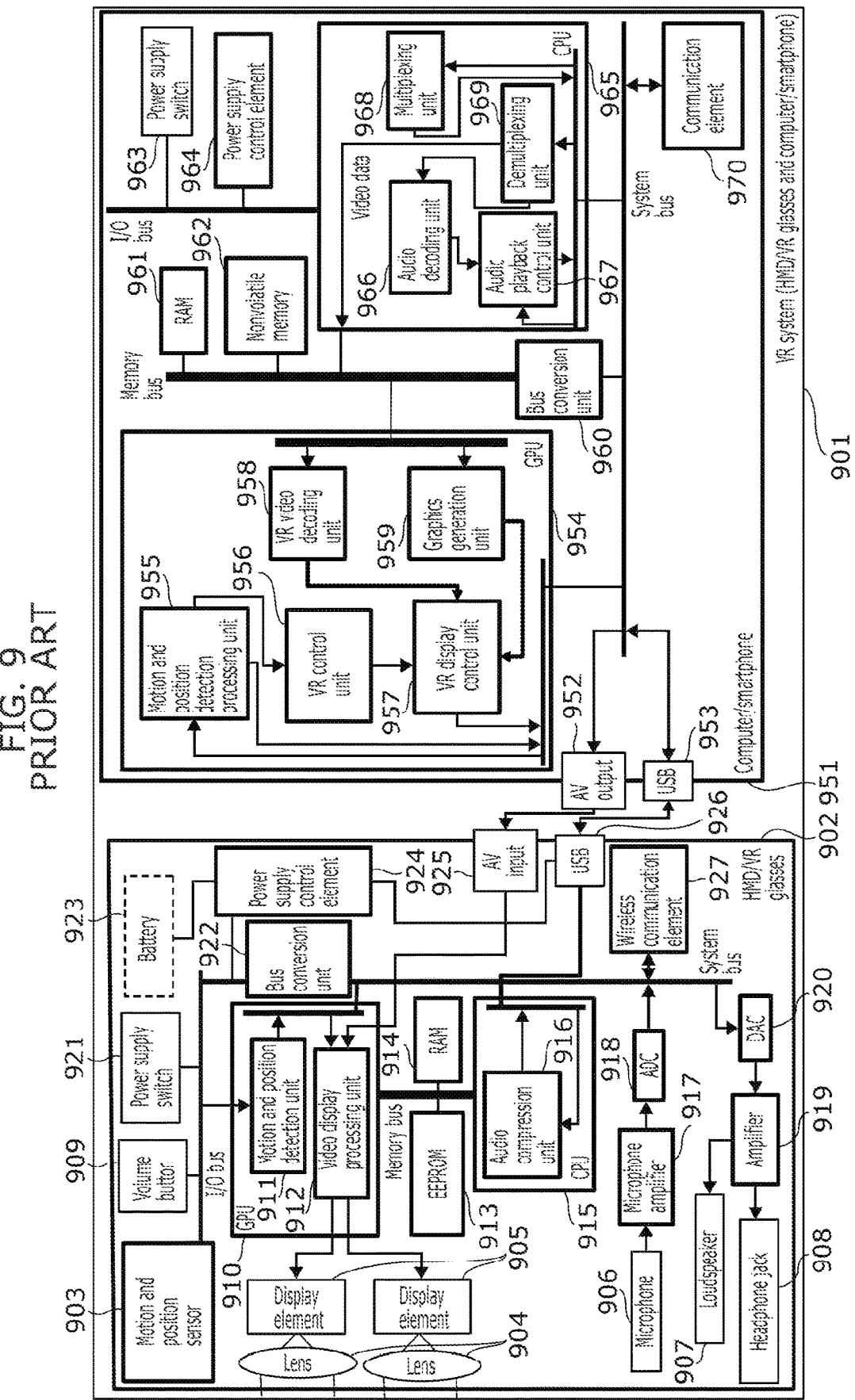
FIG. 9 is a ninth diagram for illustrating a conventional example.

FIG. 9 is a ninth diagram for illustrating a conventional example. With reference to FIG. 9, next, a typical realization example of VR system 901 will be described as a typical realization example of the observation system according to Conventional Example 2. In the present realization example, VR system 901 includes computer or smartphone 951 and HMD or VR glasses 902 connected thereto. In stand-alone implementation examples of HMD or VR Glasses 902, one can assume that CPU and GPU functions of both will be combined into one, as well as the peripheral functions.

The main components of computer/smartphone 951 of VR system 901 include: WiFi or Ethernet (registered trademark) high-speed communication element 970 for connecting to the observation system; GPU 954 that mainly processes video data and graphics; CPU 965 that performs general data processing and controls the entire computer/smartphone 951; nonvolatile memory 962, such as a hard disk or flash memory, for storing computer programs for operating CPU 965 and GPU 954; RAM 961 for storing data for CPU 965 and GPU 954 to operate; power supply control element 964 for supplying a supply of power to power supply switch 963 and various components; AV output 952 for outputting video and audio signals to HMD/VR 902; an interface such as USB 953 for controlling HMD/VR glasses 902 and obtaining data therefrom; a memory bus for connecting RAM 961 and nonvolatile memory 962 and allowing CPU 965 and GPU 954 to access them; a system bus for CPU 965 and GPU 954 to access AV output 952, USB 953, and communication element 970; a bus connector (bus conversion unit 960) for connecting the system bus and the memory bus; a display device (not illustrated); an input device (not illustrated) for receiving operations; and an other general-purpose interface (not illustrated).

Whether a process is performed by GPU 954 or CPU 965 may differ from this example, and the bus configuration may also differ from this example, but even in such cases, there is no difference in the functional configuration and operations that will be described below. As one example, GPU 954 is used to realize motion and position detection processing unit 955, VR control unit 956, VR display control unit 957, VR video decoding unit 958, and graphics generation unit 959. As one example, CPU 965 is used to realize audio decoding unit 966, audio playback control unit 967, multiplexing unit 968, and demultiplexing unit 969.

AV output 952 and USB 953 can be replaced by a high-speed bidirectional interface, such as USB Type-C (registered trademark). In such cases, HMD/VR glasses 902 should be connected using the same interface or with a converter that converts the interface. Generally, when transmitting video via USB 953, appropriate video compression is performed by CPU 965 or GPU 954 to compress the data and transmitted to HMD/VR glasses 902 via USB 953.

The main components of HMD/VR glasses 902 of VR system 901 include: an audio input unit including microphone 906 for inputting audio, microphone amplifier 917, and ADC 918; an audio output unit including loudspeaker 907 or headphone jack 908, amplifier 919, and DAC 920; a VR display unit including a pair of lenses 904 for the user to view VR video and display element 905; motion and position sensor 903 including a motion and position detection unit including a gyrosensor, camera, or ultrasonic microphone and an orientation detection unit; wireless communication element 927 that uses, for example, Bluetooth technology and is for communicating with a controller (not illustrated), volume button 909 for controlling the volume of output from the audio output unit; power supply switch 921 for turning on and off the power supply of the HMD/VR glasses; power supply control element 924 for controlling the supply of power; a memory bus that connects EEPROM 913, RAM 914, the SD card, GPU 910, and CPU 915 and transmits and receives data therebetween, AV input 925 for receiving video and audio signals from CPU 915, GPU 910, wireless communication element 927, and computer/smartphone 951; an interface such as USB 926 for receiving control signals from computer/smartphone 951 and transmitting video signals, audio signals, and motion and position data; CPU 915 that mainly controls audio compression (realized by audio compression unit 916), switching, and power supply, and controls the entire HMD/VR glasses 902; GPU 910 that mainly performs video display processing (realized by video display processing unit 912) for adjusting video to be displayed on the VR display unit and motion and position detection (realized by motion and position detection unit 911) of correcting/formatting motion and position information to be transmitted to computer/smartphone 951 from information from motion and position sensor 903; EEPROM 913 for storing programs and data for operating CPU 915 and GPU 910; RAM 914 for storing data to be used during operation of CPU 915 and GPU 910; a memory bus for connecting CPU 915, GPU 910, RAM 914, and EEPROM 913; a system bus to which CPU 915, GPU 910, USB 926, the audio input unit, the audio output unit, and wireless communication element 927 are connected and controls and transmits data therebetween; an I/O bus for controlling and low-speed transmission between buttons, power supply control element 924, motion and position sensor 903, the audio input unit (not illustrated), the audio output unit (not illustrated), and the VR capturing camera; and a number of bus conversion units 922 that connect the various buses. Whether a process is performed by GPU 910 or CPU 910 may differ from this example, and the bus configuration may also differ from this example, but even in such cases, there is no difference in the functional configuration and operations that will be described below.

Since the video data from AV input 925 is large and fast, it is shown as being taken directly to GPU 910 if the system bus is not fast enough.

The video information captured by the camera of motion and position sensor 903 may be transmitted to the display element as information for enabling the user to check the surroundings of HMD/VR glasses 902 or to computer/smartphone 951 via USB 926 for monitoring whether the user is in a dangerous situation.

Power supply control element 924 receives a supply of power from USB 926 or AV input 925, stabilizes the voltage, manages the battery capacity, and although not illustrated, supplies power to all elements. In some cases, battery 923 may be provided internally or externally, and may be connected to power supply control element 924.

The states of the buttons and cursor on the controller not illustrated in the drawings are obtained by CPU 915 through wireless communication element 927 and used to control button operations, movement, and applications in the VR space. The position and orientation of the controller are detected by a camera or ultrasonic sensor in the motion and position detection unit, and after appropriate processing by the motion and position sensor, they are used for control by CPU 915 and transmitted to computer/smartphone 951 via USB 926 and used for drawing graphics and image processing executed by GPU 910 or by programs executed by CPU 915. Since basic operations are not directly related to the present invention, description thereof will be omitted.

FIG. 10 is a tenth diagram for illustrating a conventional example. Next, a realization example of integrated VR system 1001 that includes HMD/VR glasses with functions for VR within a computer/smartphone.

As illustrated in FIG. 10, the functions of the computer/smartphone and the functions of HMD/VR glasses are integrated, the CPU functions are integrated into a single CPU, and the GPU functions are integrated into a single GPU.

Communication element 1033 typically uses WiFi technology for wireless communication and includes battery 1026 as it does not include a power cable. Communication element 1033 includes a general purpose interface for a computer, such as USB 1034, for charging and initial setup of battery 1026.

Integrated VR system 1001 does not require AV output, AV input, or USB to connect the computer/smartphone and the HMD/VR glasses, enabling high-quality, delay-free transmission of AV information and efficient control. However, the size limitation of the integrated system may make it impossible to use the high-performance CPU 1027 and GPU 1006 due to power, heat, and space limitations, and may result in limited VR functionality.

However, not being connected by cables increases flexibility and broadens the range of applications.

In addition, by realizing some of the functions on a computer in the cloud, for example, it is possible to compensate for the lack of performance and realize highly functional applications.

Similar to the configurations described with reference to FIG. 8 and FIG. 9, integrated VR system 1001 also includes lens 1002, display element 1011, microphone 1003, microphone amplifier 1007, ADC 1009, loudspeaker 1004, headphone Jack 1005, amplifier 1008, DAC 1010, RAM 1019, EEPROM 1020, bus conversion 1021, motion and position sensor 1022, power supply switch 1023, volume button 1024, and power supply control element 1025. Video display processing 1012, motion and position detection processing 1013, VR control 1014, VR display control 1015, motion and position detection 1016, VR video decoding 1017, and graphics generation 1018 are realized using GPU 1006. Audio compression 1028, audio decoding 1029, audio playback control 1030, multiplexing 1031, and demultiplexing 1032 are realized using CPU 1027.

Figure 11:
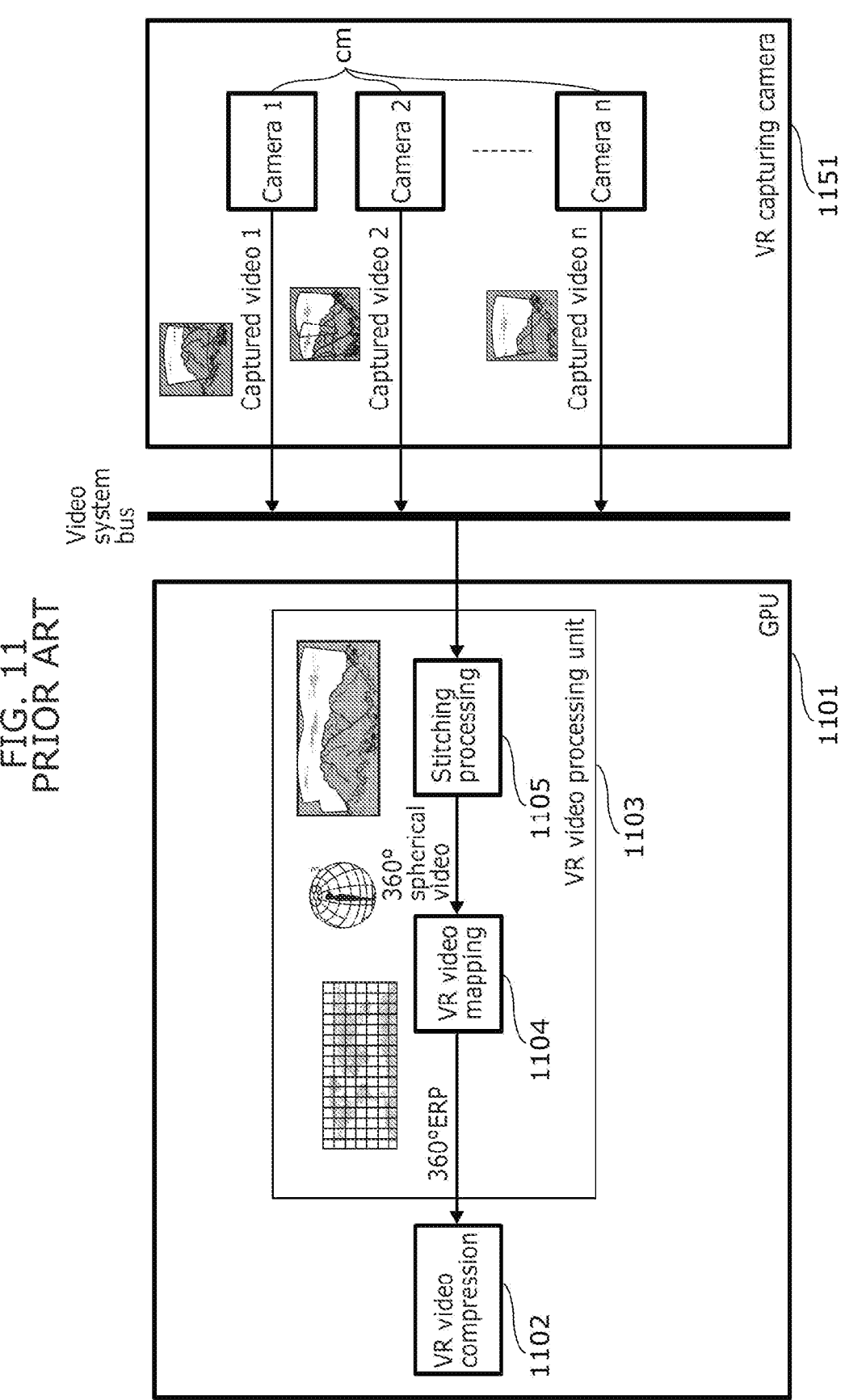
FIG. 11 is an eleventh diagram for illustrating a conventional example.

FIG. 11 is an eleventh diagram for illustrating a conventional example. Next, a more detailed configuration of VR video processing unit 1103, which processes the video captured by VR capturing camera 1151 of the observation systems according to Conventional Examples 1 and 2, will be described based on FIG. 11.

As mentioned above, a VR capturing camera includes a plurality of cameras cm, typically with ultra-wide angle lenses, for capturing 360° omnidirectional video, and the individual rectangular videos with the same pixels captured by each camera cm are input to VR video processing unit 1103, which is realized by a program or dedicated circuit in GPU 1101.

In VR video processing unit 1103, the plurality of videos captured by each camera cm are first input to stitching processing unit 1105, which evaluates the direction of each camera cm and the video captured by each camera cm, and then combines and stitches the videos together to form a continuous spherical video. The spherical video data output from stitching processing unit 1105 is mapped to a flat surface by VR video mapping unit 1104 using, for example, the equirectangular projection (ERP) method, and is output from VR video processing unit 1103 as an ERP image, which is then passed to VR video compression unit 1102.

The connection between the video system bus and the cameras is illustrated in the figure such that each camera is connected to the bus, but it is also possible to combine the signals into a single signal in VR capturing camera 1151, transmit the video captured by each camera in a time-division manner to the video bus, and input the video to VR video processing unit 1103. In a simplified configuration, since there are two cameras cm, it is possible to have GPU 1101 receive the output of each of the two cameras instead of using a bus, and have the VR videos captured in parallel received and processed by VR video processing unit 1103.

Figure 12:
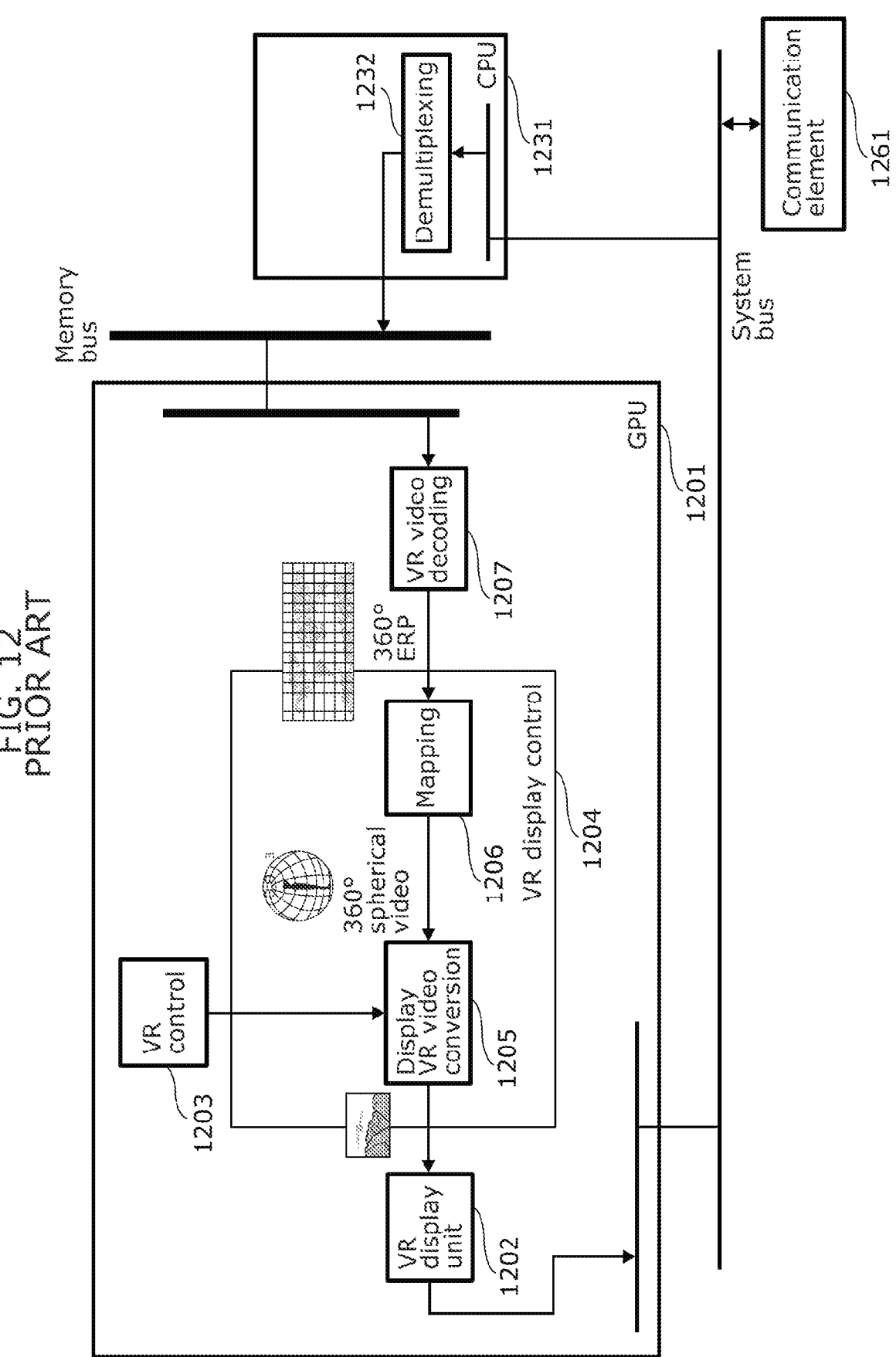
FIG. 12 is a twelfth diagram for illustrating a conventional example.

FIG. 12 is a twelfth diagram for illustrating a conventional example. Next, a more detailed configuration of VR display control unit 1204 of the VR systems according to Conventional Examples 1 and 2 will be described based on FIG. 12.

As mentioned above, VR display control unit 1204 is realized by a program or a dedicated circuit in GPU 1201 of the computer/smartphone and includes mapping unit 1206 and display VR video conversion unit 1205.

Operations performed thereby are as follows. Communication element 1261 receives communication data transmitted from the observation system, the compressed video is demultiplexed by demultiplexing unit 1232 of CPU 1231, GPU 1201 receives the video via the memory bus, and VR video decoding unit 1207 decodes the video, thereby generating a flat video (ERP image). The flat video is converted into a 360° spherical video in mapping unit 1206 of VR display control unit 1204, and then in display VR video conversion 1205, the portion to be displayed on VR display unit 1202 is cut out based on control information output by VR control unit 1203.

More specifically, the center of the ERP image is the entire surface and the origin of the 360° spherical video. The initial video of the VR image displayed on VR display unit

1202 is centered on the origin, and depending on the capability of VR display unit 1202, the image for the right eye is slightly to the right and the image for the left eye is slightly to the left, and the initial setting value is used for the height direction to cut out the videos, and the images are displayed on the display elements for the right and left eyes. From here, the position of the cutout changes depending on whether the VR system rotates to the left or right, looks up or down, etc.

In general, the video from a 360° camera does not change when the VR system is moved, but in the case of CG-generated images, the position changes when the VR system is moved or operated with a controller.

The initial value of the cutout from the 360° spherical video may be from the previous cutout position, but generally, a function is included to restore the initial position.

Figure 13:
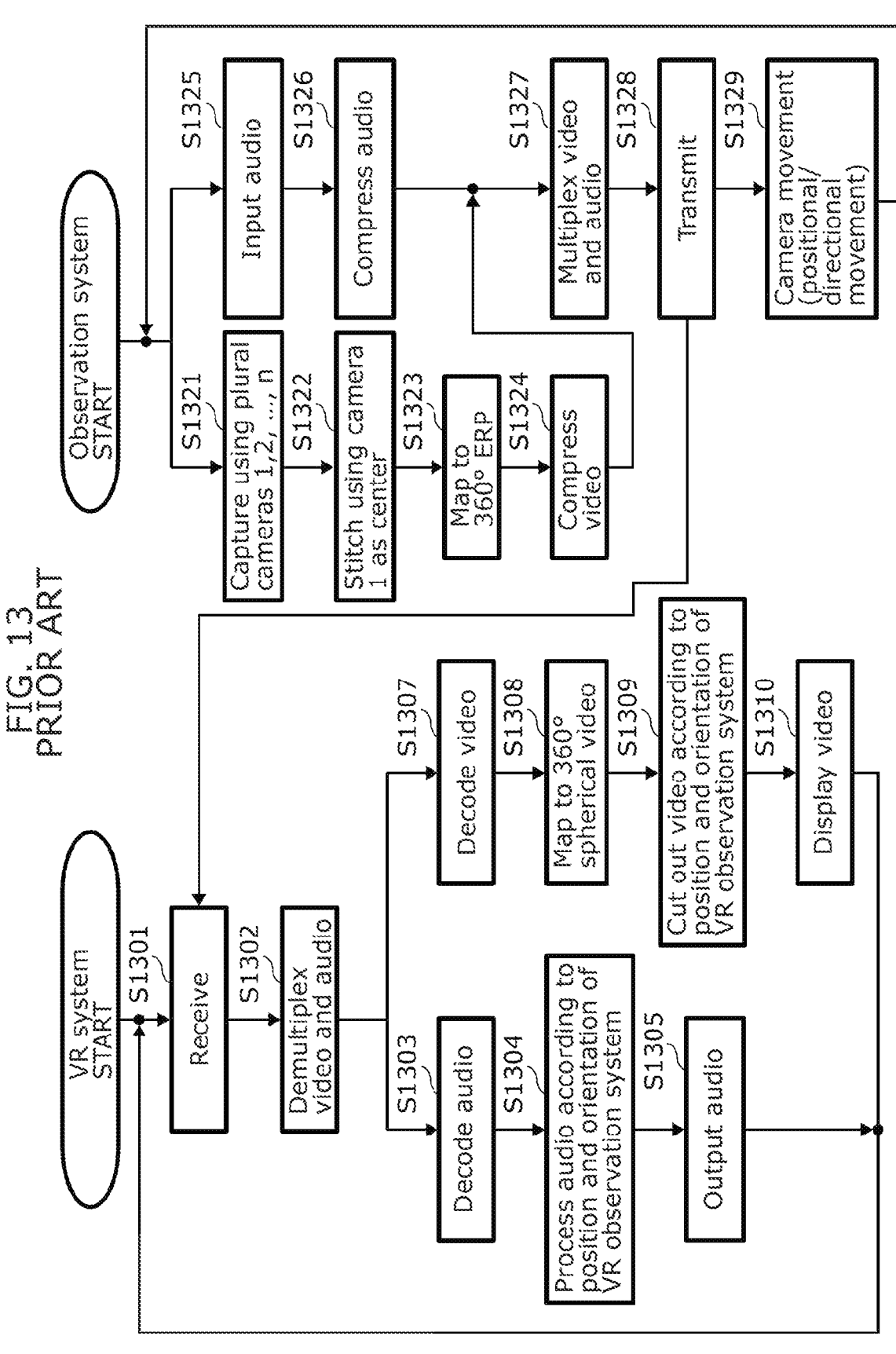
FIG. 13 is a thirteenth diagram for illustrating a conventional example.

FIG. 13 is a thirteenth diagram for illustrating a conventional example. Next, an operation example of Conventional Example 2 will be described based on FIG. 13.

In the observation system, audio is input by the audio input unit (microphone group, microphone jack, microphone amplifier, and ADC) (S1325), and audio compression is performed by the audio compression unit (S1326).

At the same time, video is captured by a plurality of cameras (lenses, shutters, imaging elements, ADCs) in the VR capturing camera (S1321), stitched into a spherical image with camera 1, which is the center camera, as the center in the stitching processing unit of the VR video processing unit (S1322), these are then used to generate an ERP image by the VR image mapping section using the positive distance cylinder The ERP image is then generated by equirectangular projection (ERP) or the like by the VR video mapping unit (S1323), and the ERP image is then appropriately compressed by the VR video compression unit (S1324).

The compressed ERP image and audio information are multiplexed by the multiplexing unit (S1327) into a transmittable format and sent (transmitted) out to the VR system by the wireless communication element (S1328).

Over time, in some cases, the camera moves in a new direction and/or to a new position (S1329), and the audio input and steps from capturing by the plurality of VR capturing cameras to the transmission are repeated.

Although graphics information is omitted here, graphics information may be superimposed on the video before video compression or multiplexed together with video and audio as graphics information.

In the VR system, the computer/smartphone receives the information transmitted from the observation system by the communication element (S1301) and transmits it to the demultiplexing unit. The demultiplexing unit demultiplexes the transmitted compressed video information and compressed audio information (S1302). The compressed audio information demultiplexed by the demultiplexing unit is transmitted to the audio decoding unit for decoding (S1303), thereby generating uncompressed audio information. The audio information is transmitted from the audio decoding unit to the audio playback control unit, where audio processing is performed based on the position and orientation information of the VR observation system transmitted from the VR control unit of the GPU via the system bus (S1304). The audio information that has undergone the audio processing is transmitted to the audio output unit (DAC, amplifier, loudspeaker, and headphone Jack) of the HMD/VR glasses via the system bus by way of AV output or USB, and is output as audio (S1305). Audio processing includes controlling the left-right balance and the volume in the space, changing the frequency characteristics, delay, movement within the space, similar processing for only certain sound sources, and adding sound effects.

The compressed video signal is transmitted to the VR video decoding unit of the GPU via the memory bus with the video data from the demultiplexing unit of the CPU of the computer/smartphone, decoded in the VR video decoding unit (S1307) and input to the VR display control unit as an ERP image. In the VR display control unit, the mapping unit maps the ERP video onto the 360° spherical video (S1308), and in the display VR video conversion unit, the appropriate portion of the video is cut out from the 360° spherical video based on the position and orientation information of the VR system from the VR control unit (S1309) and displayed as VR video by the VR display unit (display element and lenses) (S1310).

Video display and audio output are repeated from reception from the observation system.

Graphics may be demultiplexed at the same time as video and audio demultiplexing and superimposed on the VR video by the VR display control unit, or they may be generated in the VR system and superimposed on the VR video, but explanation thereof will be omitted here.

Overview of Disclosure

An overview of the present disclosure is as follows.

According to one aspect of the present disclosure, a video display system for displaying a display video via a display device includes: a VR device including the display device that displays the display video; an observation device proved in a mobile object to give the observation device mobility and including a capturing unit configured to capture video, a data obtaining unit configured to obtain data related to a movement speed of the capturing unit, and a transmission unit configured to transmit, together with the data, the video captured; a reception unit configured to receive video and the data; a video generation unit configured to generate the display video including the video received; and a presentation unit configured to cause the video generation unit to generate and output a graphic corresponding to the movement speed from the data received and superimpose the graphic to present the movement speed of the capturing unit.

Such a video display system use data to generate a graphic based on the movement speed of the capturing unit. The graphic can then be superimposed to present the movement speed to the user. As a result, it is possible to inhibit problems associated with movement of the capturing unit that is unexpected by the user, such as sudden movement of the capturing unit. Therefore, according to this video display system, it is possible to display appropriate video in terms of inhibiting problems associated with the capturing unit moving in a way that is unexpected by the user.

For example, the data may include information related to a movement state of the mobile object, and on the display video, the graphic may display an arrow indicating the movement state in a manner corresponding to the movement state.

With this, the movement state of the mobile object can be presented by means of an arrow in a manner that is appropriate to the movement state of the mobile object.

For example, the graphic may display, as a mask, an image for covering at least part of the display video other than a part corresponding to a movement direction of the mobile object.

With this, the movement state can be presented to the user by means of a graphic that displays, as a mask, an image for covering at least part of the display video other than a part corresponding to the direction in which the mobile object is moving.

For example, the mobile object may be a flying object.

With this, it is possible to display appropriate video with respect to an observation device that is mobile as a result of being equipped in a flying object.

For example, the graphic may display a mask for covering an area vertically below the flying object.

With this, the movement state can be presented to the user by means of a graphic that displays a mask for covering an area vertically below the flying object.

For example, the data obtaining unit may be configured to obtain the data related to the movement speed of the capturing unit from an operation history of operations made via a control device for controlling movement of the mobile object.

With this, data related to the movement speed of the capturing unit can be automatically obtained from the operation history of operations made via the control device for controlling the movement of the mobile object.

For example, the movement state may be information indicating a change in movement speed of the observation device and a change and a continuance in movement direction of the observation device, and the movement speed may be information including a status of change in speed of the observation device.

With this, information indicating a change in movement speed of the observation device and a change and a continuance in movement direction of the observation device can be used as the movement state, and information including a status of change in speed of the observation device can be used as the movement speed.

For example, the capturing unit may be configured to capture virtual video by capturing video in a virtual image space constructed by computer graphics.

With this, regarding the capturing unit that moves in a virtual image space constructed by computer graphics, it is possible to display video that is appropriate from the viewpoint of inhibiting defects resulting from the capturing unit moving in a way that is unexpected by the user.

For example, the video display system may further include an information processing device connected to the observation device and the VR device over a network and including at least one of the reception unit, the video generation unit, or the presentation unit.

With this, the video display system can be realized by the observation device, the VR device, and the information processing device.

For example, the information processing device may include the reception unit, the video generation unit, the presentation unit, a movement state calculation unit, and a processing device transmission unit. The reception unit may be configured to receive, from the observation device, a wide-angle video as the video and the data. The movement state calculation unit may be configured to calculate a movement state of the observation device based on the wide-angle video and the data. The presentation unit may be configured to generate a graphic indicating the movement state calculated. The video generation unit may be configured to superimpose the graphic onto a portion of the wide-angle video based on the data and the movement state. The processing device transmission unit may be configured to transmit the wide-angle video together with other information.

With this, the video display system can be realized by the observation device, the VR device, and the information processing device.

For example, the information processing device may include the reception unit, the presentation unit, a movement state calculation unit, a metadata composition unit, and a processing device transmission unit. The reception unit may be configured to receive, from the observation device, a wide-angle video as the video and the data. The movement state calculation unit may be configured to calculate a movement state of the observation device based on the wide-angle video and the data. The presentation unit may be configured to generate a graphic based on the movement state calculated by the movement state calculation unit. The metadata composition unit may be configured to generate metadata including the graphic, the data, and the movement state. The processing device transmission unit may be configured to transmit information including the wide-angle video and the metadata.

With this, the video display system can be realized by the observation device, the VR device, and the information processing device.

For example, the information processing device may include: a first reception unit configured to receive, from the observation device, a wide-angle video as the video and the data; a second reception unit configured to receive data related to an orientation of the VR device; a movement state calculation unit configured to calculate a movement state of the observation device based on the wide-angle video and the data; a differential calculation unit configured to calculate a relative movement direction based on a difference between the orientation of the VR device and movement information related to movement of the capturing unit, the relative movement direction being a movement direction of the capturing unit relative to the orientation of the VR device; a presentation unit configured to generate and output a graphic indicating the difference calculated and the movement state of the observation device; a video compositing unit configured to composite the graphic onto the wide-angle video based on the difference and the movement state; and a transmission unit configured to transmit the video composited by the video compositing unit and other information.

With this, the video display system can be realized by the observation device, the VR device, and the information processing device.

For example, the information processing device may be provided in a cloud connected to a wide-area network, and may be connected to the observation device and the VR device over the wide-area network.

With this, the video display system can be realized by the observation device, the VR device, and the cloud-based information processing device connected to the observation device and the VR device over a wide-area network.

An observation device according to one aspect of the present disclosure is used in a video display system for displaying a display video on a display device, and includes: a capturing unit configured to capture a wide-angle video; a data obtainment unit configured to obtain data related to a movement speed of the capturing unit; a metadata obtainment unit configured to obtain metadata that is based on the data obtained and includes a movement state of the capturing unit; and a transmission unit configured to transmit, together with the metadata, the wide-angle video captured.

Such an observation device can be used in the video display system described above to achieve the same advantageous effects as the video display system described above.

An information processing method according to one aspect of the present disclosure is for displaying a display video on a display device, and includes: receiving data related to a movement speed of a capturing unit configured to move with a mobile object and capture video; and generating and outputting a graphic for presenting a movement state of the capturing unit to a user of the display device by superimposing the graphic on the video captured, the graphic indicating a movement state of the capturing unit based on the movement speed of the capturing unit indicated in the data received.

Such an information processing method can achieve the same advantageous effects as the video display system described above.

A non-transitory computer-readable recording medium according to one aspect of the present disclosure has recorded thereon a computer program for causing a computer to execute the information processing method described above.

Such a recording medium can, with the use of a computer, achieve the same advantageous effects as the video display system described above.

Hereinafter, embodiments of the present disclosure will be described with reference to the drawings.

Each embodiment described below shows a general or specific example. The numerical values, shapes, materials, elements, the arrangement and connection of the elements, steps, order of the steps etc., indicated in the following embodiments are mere examples, and therefore do not intend to limit the scope of the claims. Therefore, among elements in the following embodiments, those not recited in any of the independent claims are described as optional elements.

The figures are not necessarily precise illustrations. In the figures, elements that are essentially the same share the same reference signs, and repeated description may be omitted or simplified.

In the present specification, terms indicating relationships between elements, such as "parallel", terms indicating shapes of elements, such as "rectangle", numerical values, and numerical ranges are expressions that include, in addition to their exact meanings, substantially equivalent ranges, including differences such as errors of approximately a few percent, for example.

EMBODIMENTS

[Configuration]

Figure 14:
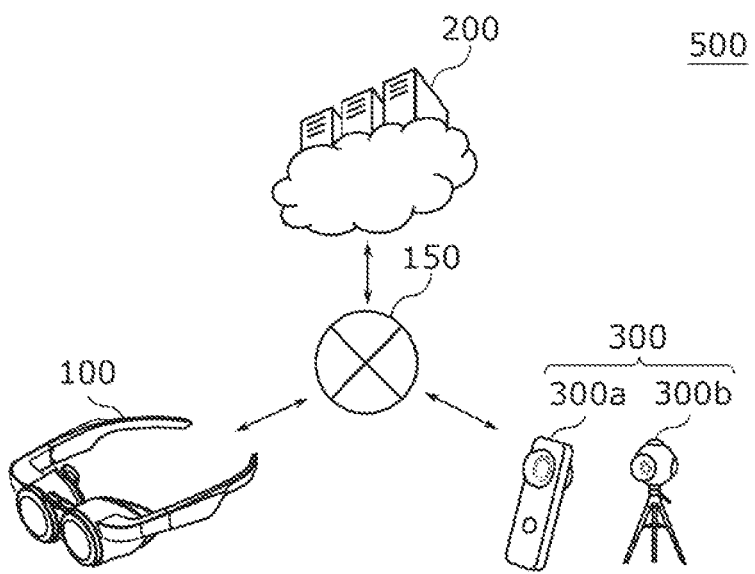
FIG. 14 illustrates the schematic configuration of a video display system according to an embodiment.
Figure 15:
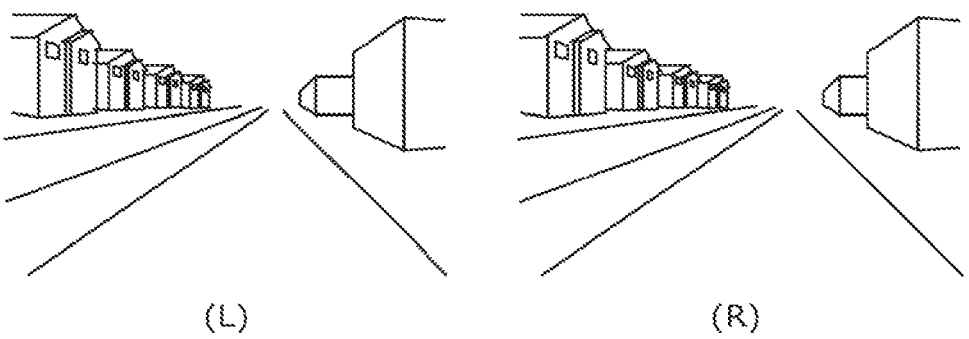
FIG. 15 illustrates one example of video displayed in the video display system according to an embodiment.

First, an overview of the video display system according to an embodiment will be described with reference to FIG. 14 and FIG. 15. FIG. 14 illustrates the schematic configuration of the video display system according to an embodiment. FIG. 15 illustrates one example of video displayed in the video display system according to an embodiment.

As illustrated in FIG. 14, video display system 500 according to the present embodiment is realized by observation device 300, server device 200 connected via network 150, and display device 100 connected via network 150.

Observation device 300 is an omnidirectional camera capable of capturing video of 360 degrees around it. Observation device 300 may be, for example, capturing device 300a that is hand-held, or observation device 300b that is fixed on a tripod or the like. In the case of the hand-held capturing device 300a, it is easy to capture images while moving around. However, since observation device 300 is intended to be mounted on a mobile object, it may be in an appropriate form for the mobile object. A mobile object may be any mobile object that can move, such as a flying object, ship, or vehicle. In particular, since the possibility of inducing VR sickness becomes more pronounced when the mobile object is moving at a speed that is difficult for a person to foresee, we assume a mobile object with a speed that is at least greater than a person's walking speed or a person's running speed, or, more correctly, an acceleration that indicates a degree of instantaneous speed increase that is greater than that of a person. Hereafter, the observation device will be denoted simply as observation device 300 without differentiating between the types (observation device 300a and observation device 300b). Observation device 300 includes an optical element such as a fisheye lens and can capture a wide-angle area, for example 180 degrees, with a single sensor array. A plurality of combinations of optical elements and sensor arrays arranged to complement each other in different wide-angle areas can be used to capture 360 degree wide-angle video. The images captured in each of the plurality of sensor arrays are stitched together by identifying the elements that correspond to each other. This results in a single image that can be mutually transformed between flat and spherical surfaces, for example, an equirectangular projection. By continuously generating such images in the time domain, a video (moving image) that changes in the time domain is generated. Note that the interior of the spherical video is also referred to as the 3D video space.

In the present embodiment, two 3D video spaces with a displacement corresponding to human binocular disparity are generated. These two 3D video spaces may be generated from single 3D video space by, for example, simulation, or they may be generated by two cameras that are displaced by a disparity shift. In the present embodiment, a VR video that allows the user to view any direction in the 3D video space from inside this 3D video space can be displayed.

Network 150 is a communication network for communicably connecting observation device 300, server device 200, and display device 100 with each other. Here, a communication network such as the Internet is used as network 150, but network 150 is not limited to this example. Each of the connection between observation device 300 and network 150, the connection between server device 200 and network 150, and the connection between display device 100 and network 150 may be accomplished via wireless communication or wired communication.

Server device 200 is a device for performing information processing and the like, and is realized using, for example, a processor and memory. Server device 200 may be realized by an edge computer or by a cloud computer. One server device 200 may be provided per video display system 500, or one server device 200 may be provided per a plurality of video display systems 500. Stated differently, server device 200 may perform various processes in a plurality of video display systems 500 in parallel. Note that server device 200 is not an essential component of video display system 500.

For example, a video display system that includes only observation device 300 and display device 100 can be realized by allocating each functional unit of server device 200 (described below) to observation device 300 and display device 100. In particular, if display device 100 is realized using an information processing terminal such as a smartphone that also serves as a display panel, the functional units of server device 200 can be easily realized using, for example, the processor of the information processing terminal. Alternatively, by giving functions of observation device 300 and display device 100 to server device 200, some of the functions of observation device 300 or display device 100 can be reduced and existing observation devices and display devices can be used. Stated differently, a video display system can be easily implemented by consolidating various functions in server device 200. Each functional unit of server device 200 will be described below with reference to, for example, FIG. 16.

Display device 100 is a glasses HMD that supports two lens tubes that are separated from each other by having the temple portions extending from each of the left and right sides engaged with the external ears, thereby holding the two lens tubes in positions corresponding to the user's right and left eyes. The lens tubes of display device 100 have built-in display panels, which project video with a disparity shift to the user's left and right eyes, respectively, as illustrated in FIG. 15, for example. In FIG. 15, (L) shows an image for the left eye corresponding to one frame of the video, and (R) shows an image for the right eye corresponding to the same frame of the video. Display device 100 does not need to be a terminal dedicated to displaying such video. It is possible to realize the display device according to the present disclosure using a display panel included in a smartphone, tablet device, or PC, for example.

Figure 16:
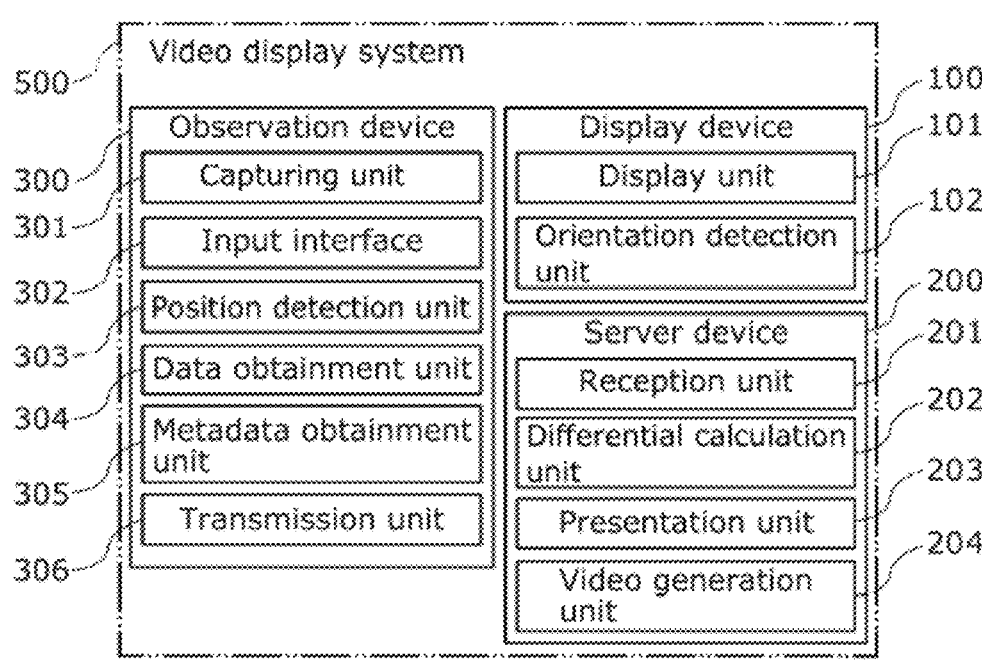
FIG. 16 is a block diagram illustrating the functional configuration of the video display system according to an embodiment.

Hereinafter, video display system 500 according to the present embodiment will be described in greater detail with reference to FIG. 16. FIG. 16 is a block diagram illustrating the functional configuration of the video display system according to an embodiment. As illustrated in FIG. 16 and as described with reference to FIG. 14, video display system 500 includes display device 100, server device 200, and observation device 300.

Display device 100 includes display unit 101 and orientation estimation unit 102. Display unit 101 is a functional unit that outputs an optical signal according to image information using, for example, a backlight and LCD panel, an organic EL panel, or micro LEDs. Display unit 101 controls the output optical signal so that the image is formed on the retina of the user's eye through optical elements such as a lens and an optical panel. Forming the image on the user's retina allows the user to see the image. Display unit 101 outputs the image continuously in the time domain to allow the viewer to see a series of images, i.e., a video. In this way, display unit 101 displays the video to the user of display device 100.

Orientation estimation unit 102 is a functional unit for estimating the orientation of display device 100. Orientation estimation unit 102 is realized by various sensors, such as acceleration sensors, gyro sensors, etc., built into display device 100 at appropriate locations. Orientation estimation unit 102 estimates the orientation of display device 100 by estimating in which direction and by how much the orientation has changed in relation to a reference direction preset in display device 100. As explained earlier, display device 100 is supported by the user's head (external ear and root of the nose) and thus moves with the user's head.

Then, by estimating the orientation of display device 100, the viewing area corresponding to that orientation can be cut out from the wide-angle video and displayed. Stated differently, the orientation of display device 100 as estimated by orientation estimation unit 102 can be used to display the viewing area to be viewed in the 3D video space, assuming that the viewing area is in the direction in which the user's head is facing. Note that the orientation of display device 100 estimated here corresponds to the normal direction of the display panel of display device 100. The display panel is positioned to face the user's eyes, so the user's eyes are usually located in the normal direction of the display panel.

The orientation of display device 100 is therefore consistent with the direction connecting the user's eyes and the display panel.

However, the direction of display device 100 and the direction of the user's line of sight may shift due to the user's eye movements. In such cases, if display device 100 includes a sensor that detects the user's line of sight (i.e., an eye tracker), the detected user's line of sight may be used as the direction of display device 100. Stated differently, the eye tracker is another example of the orientation estimation unit.

In addition to the above, display device 100 includes a power supply, various input switches, a circuit for driving the display panel, wired and wireless communication modules for input and output, audio signal processing circuits such as a signal converter and an amplifier, and a microphone and a loudspeaker for audio input and output.

Server device 200 includes reception unit 201, presentation unit 203, and video generation unit 204. Reception unit 201 is a processing unit that receives (obtains) various signals from observation device 300 (to be described later). Reception unit 201 receives the wide-angle video captured at observation device 300. Reception unit 201 also receives metadata obtained at observation device 300. Reception unit 201 also receives information related to the orientation of display device 100 estimated at display device 100.

Presentation unit 203 is a processing unit that presents the movement speed of capturing unit 300 to the user of display device 100. Although an example in which presentation unit 203 causes video generation unit 204 to make the above presentation by including content indicating the movement speed in the display video generated in video generation unit 204, the presentation of the movement speed is not limited to the example of including it in the display video. For example, the movement speed may be presented as audio corresponding to the movement speed in a 3D sound field, and may be presented by vibrating a device such as a vibrating device held by the user in both hands in a manner corresponding to the movement speed. Operations performed by presentation unit 203 will be described in greater detail later.

Video generation unit 204 cuts out, from the received wide-angle video, a portion corresponding to the viewing area corresponding to the orientation of display device 100 as estimated by orientation estimation unit 102, and further, if necessary, generates a display video that includes content indicating the movement direction in addition to the movement speed of capturing unit 300. Operations performed by video generation unit 204 will be described in greater detail later along with the operations performed by presentation unit 203. Server device 200 also includes a communication module for transmitting the generated display video to display device 100.

Observation device 300 includes capturing unit 301, input interface 302, position detection unit 303, data obtainment unit 304, metadata obtainment unit 305, and transmission unit 306. Capturing unit 301 is the functional part related to capturing images and is integrated with other functional components of observation device 300. Therefore, moving capturing unit 301 means moving the entire observation device 300. However, observation device 300 is mounted on a mobile object. Therefore, capturing unit 301 captures images as it moves along with the mobile object. Capturing unit 301 may be separate from other functional components of observation device 300 and communicate via wired or wireless communication. In such cases, capturing unit 301 can be moved independently. In this example, it is sufficient if at least capturing unit 301 is provided in the mobile object. Capturing unit 301 includes an optical element, a sensor array, and an image processing circuit. Capturing unit 301, for example, outputs the luminance value of light received by each pixel on the sensor array through the optical element as 2D luminance value data. The image processing circuit performs post-processing such as noise removal for the luminance value data, as well as processing to generate a 3D image space from 2D image data, such as stitching.

Input interface 302 is a functional unit used when inputs are made by the operator operating observation device 300. For example, input interface 302 may be connected to a control device for controlling the movement of the mobile object equipped with capturing unit 301, and may be configured to obtain an operation history of operations made via the control device. This makes it is possible to estimate the movement speed of the mobile object from the operation history. The operator can simply move capturing unit 301 to input the movement speed of capturing unit 301 into the system as it moves. Note that input interface 302 is not an essential component. The present embodiment may be realized so long as only one of input interface 302 or position detection unit 303 (described later) is provided.

Position detection unit 303 is a sensor that detects the movement direction and movement speed of capturing unit 301, i.e., observation device 300. Position detection unit 303 is realized by a distance measurement sensor such as a LiDAR sensor and an odometer, etc., and can detect the current position of observation device 300. By detecting the current position over time, position detection unit 303 can detect the movement direction and movement speed of observation device 300.

Data obtainment unit 304 is a functional unit that obtains, from, for example, input interface 302 and position detection unit 303, data including information on the movement direction and movement speed of capturing unit 301, i.e., the movement speed of observation device 300. Data obtainment unit 304 is connected to at least one of input interface 302 or position detection unit 303, and obtains the movement direction and movement speed of observation device 300 as physical quantities from these functional units.

Metadata obtainment unit 305 is a functional unit that obtains metadata by converting the data related to the movement direction and movement speed of observation device 300 obtained in data obtainment unit 304 into metadata to be added to the captured video data. In addition to the data related to the movement direction and movement speed of observation device 300, the obtained metadata may include various other data to be used within video display system 500. Stated differently, metadata obtainment unit 305 is one example of a metadata composition unit that composes metadata by combining a plurality of pieces of data into a single unit of data that can be read from a single unit of information.

Transmission unit 306 is a communication module that transmits the captured video (wide-angle video) and the obtained metadata. Transmission unit 306 communicates with reception unit 201 of server device 200 to transmit the captured video and obtained metadata to be received by reception unit 201. With this, information related to the movement direction and movement speed of capturing unit 301, which is included in the metadata, is obtained.

Figure 17:
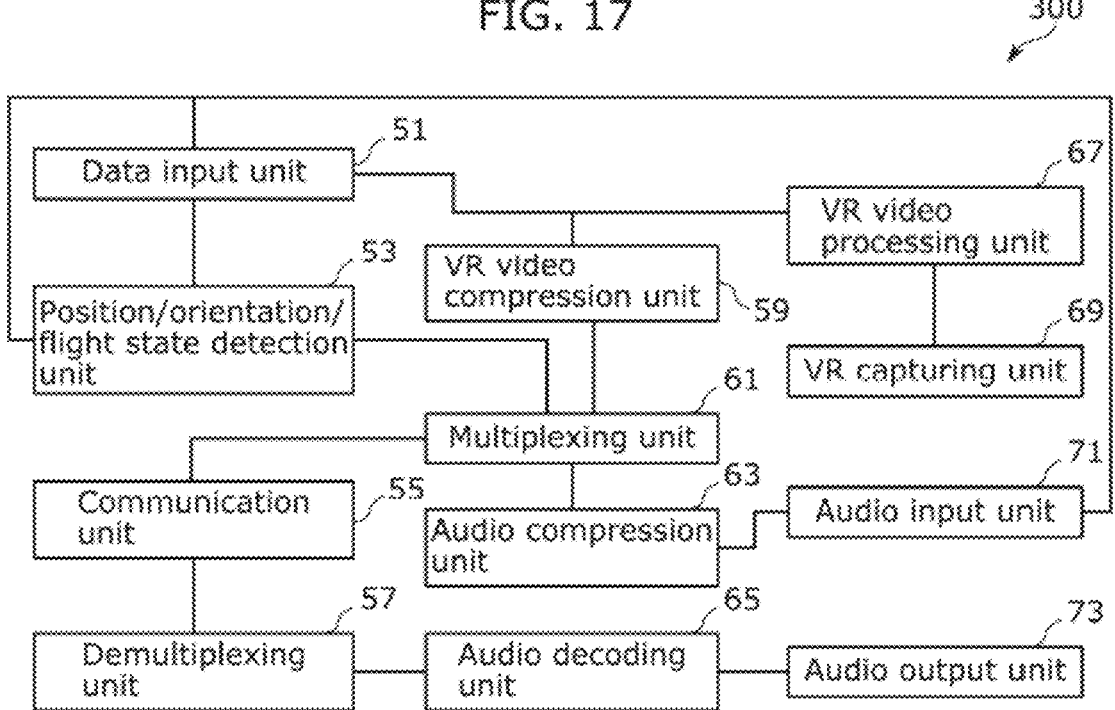
FIG. 17 is a flowchart illustrating operations performed by the video display system according to an embodiment.

FIG. 17 is a more detailed block diagram illustrating the functional configuration of the observation device according to an embodiment. FIG. 18 is a more detailed block diagram illustrating the functional configuration of the display device according to an embodiment. FIG. 17 and FIG. 18 illustrate the functional configuration around observation device 300 and display device 100 in greater detail. Some of the functions illustrated in these figures may be realized by server device 200.

Data input unit 51 corresponds to input interface 302 and position input unit 303, where the position and direction of the gazing target is input by switches, tablets, smartphones, etc., that are physically operated by the operator of observation device 300 or the guide.

Data input unit 51 may also obtain cue information from video obtained from VR video processing unit 67 or audio information obtained from audio input unit 71. Audio input unit 71 is another example of the input interface. VR video processing unit 67 is connected to VR capturing unit 69, which corresponds to the capturing unit.

The data obtained from data input unit 51 is transmitted to position/orientation/flight state detection unit 53, where it is processed together with the position, orientation, and flight state of observation device 300, and in some cases, the status is stored and formed into suitable data and transmitted as metadata to multiplexing unit 61, where it is then transmitted to the display device 100 via server device 200 by communication unit 55 after being multiplexed with video, audio, and graphics. In addition to the above, observation device 300 includes demultiplexing unit 57, VR video compression unit 59, audio compression unit 63, audio decoding unit 65, and audio output unit 73.

In display device 100, communication unit 39 receives the communication information from observation device 300, and demultiplexing unit 37 demultiplexes the metadata and transmits it to position/orientation/flight state determination unit 31. In position/orientation/flight state determination unit 31, data is taken from the metadata, ran through predetermined processing, transmitted to graphics generation unit 33 for displaying the movement speed as a graphic, superimposed on the VR video in VR display unit 15, transmitted to VR control unit 21, the VR video is appropriately processed by VR display control unit 23 along with the state of position and orientation of display device 100, and displayed by VR display unit 15, or guide audio for guidance is generated by audio playback control unit 25, or playback audio is appropriately processed.

As a specific example, to achieve a configuration in which an arrow indicating the direction in which the flying object is moving is displayed and the video is controlled so that the arrow is displayed in a manner corresponding to the movement speed of the flying object, the shape of the arrow can be changed to give the impression of acceleration, such as a flaring arrow. For example, control is performed so that as the speed of the mobile object increases, the image in areas other than in the movement direction is masked so that only the image in the movement direction is clear. In this way, a graphic to be displayed on display device 100 is generated in accordance with the magnitude of the movement speed that is included in the data. In addition to the above, display device 100 includes position detection unit 11, rotation detection unit 13, audio playback unit 17, audio input unit 19, VR control unit 21, audio compression unit 27, audio decoding unit 35, and multiplexing unit 41. The elements illustrated in FIG. 16 are realized by including each of the above elements illustrated in FIG. 17 and FIG. 18 in one or more combinations.

[Operations]

Figure 19:
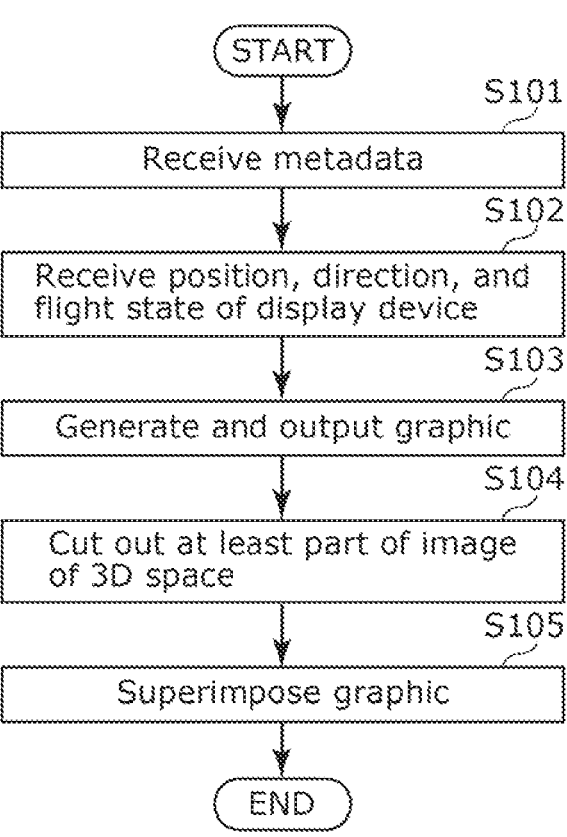
FIG. 19 is a flowchart illustrating operations performed by the video display system according to an embodiment.

Next, operations performed by video display system 500 configured as described above will be described with reference to FIG. 19. FIG. 19 is a flowchart illustrating operations performed by the video display system according to an embodiment.

When the operations of video display system 500 are started, video is captured by capturing unit 301, and input interface 302, position detection unit 303, data obtainment unit 304, and metadata obtainment unit 305 operate to obtain metadata including data related to the movement direction and movement speed of capturing unit 301. The metadata is received together with the captured video by server device 200 via transmission unit 306 and reception unit 201 (S101).

Orientation estimation unit 102 of display device 100 continuously estimates the orientation of display device 100. Display device 100 transmits the orientation of display device 100 estimated by the orientation estimation unit to server device 200. As a result, server device 200 receives the estimated orientation of display device 100 (S102). Note that the order of steps S101 and S102 may be interchanged. Server device 200 generates a graphic according to the movement direction and movement speed of capturing unit 301 from the data related to the movement direction and movement speed (S103). From step S103, server device 200 starts operations for presenting the movement speed to the user of display device 100. Presentation unit 203 generates a graphic corresponding to this movement speed, and video generation unit 204 cuts out the viewing area corresponding to the orientation of display device 100 from the wide-angle video (S104) and superimposes the graphic generated by presentation unit 203 on the cut-out portion of the video to generate the display video (S105). Detailed examples of the graphic will be given below, but the arrows described above and masks, etc., are selected or combined as appropriate and used. When a mask is used as the graphic, yet another portion of the video after it has been cut out will be covered up by this mask. As a result, areas not covered by the mask are emphasized, creating a visual effect. For example, the movement direction can be expressed as if it is going in an unmasked direction, or the movement speed can be expressed by the magnitude of the masked area.

Since the mask is generated as a graphic and superimposed on the display video, users can be provided with a variety of visual effects as it is possible to make significant changes on the video. In particular, when the user views video from the flying object, there is a space vertically below the flying object that corresponds to the height of the flying object to the ground. Some users may be frightened by the view they see from information across such a high space. Therefore, one of the masks may be a mask that imitates the cockpit of a flying vehicle and covers the area vertically below the flying object to make the experience less frightening to the user. This example is also effective in enhancing the realism of the VR experience because the remaining video other than the area covered by the mask can function as a view from the window area in the cockpit. The term "cover" here also includes covering the target area with an image in a semi-transparent state such that the target area partially appears through.

In this way, the user can be made aware of the movement speed and in some cases the movement direction, so that even if the video subsequently moves, the user is less likely to have a discrepancy in their perception of the movement. Thus, with video display system 500, it possible to display appropriate videos on display device 100 in terms of inhibiting VR sickness and other symptoms.

Implementation Examples

Hereinafter, embodiments will be described in greater detail by way of implementation examples. This implementation example describes a more specific example of a solution to the technical problem of being prone to VR sickness. VR sickness is likely to occur when there is a discrepancy between the information obtained from visual and auditory senses and the acceleration information obtained from the vestibular senses (which cannot detect stimuli in the case of constant velocity motion). Although VR devices (for example, HMDs) can usually reproduce information with respect to the visual and auditory senses and can stimulate the visual and auditory senses, it is difficult to stimulate the vestibular organs to sense acceleration without installing a large-scale motion platform or the like, which is limited to VR devices found in facilities such as theme parks and VR game centers.

If users experience VR sickness while in the VR space during VR tourism, the VR tourism itself becomes a painful experience and users will stop using it. It is therefore important to avoid VR sickness.

Visual guidance similar to that described earlier is needed to prevent VR sickness in aerial video.

Since the vestibular organs respond only to acceleration, they are in the same stimulus-free state when stationary in the air (hovering) and when flying straight ahead at a constant speed, and they detect acceleration when the body tilts due to acceleration, deceleration, or turning.

Therefore, guided display will reduce VR sickness by showing hovering, constant speed flight, acceleration/deceleration, turning, ascending, and descending in a way that can be understood. This measure is effective not only for flying objects but also for observation systems installed on other mobile objects such as ships, trains, and buses. It is also effective for videos from virtual cameras installed on virtual flying objects, including virtual flying objects in a 3D space constructed by computer graphics.

Figure 20:
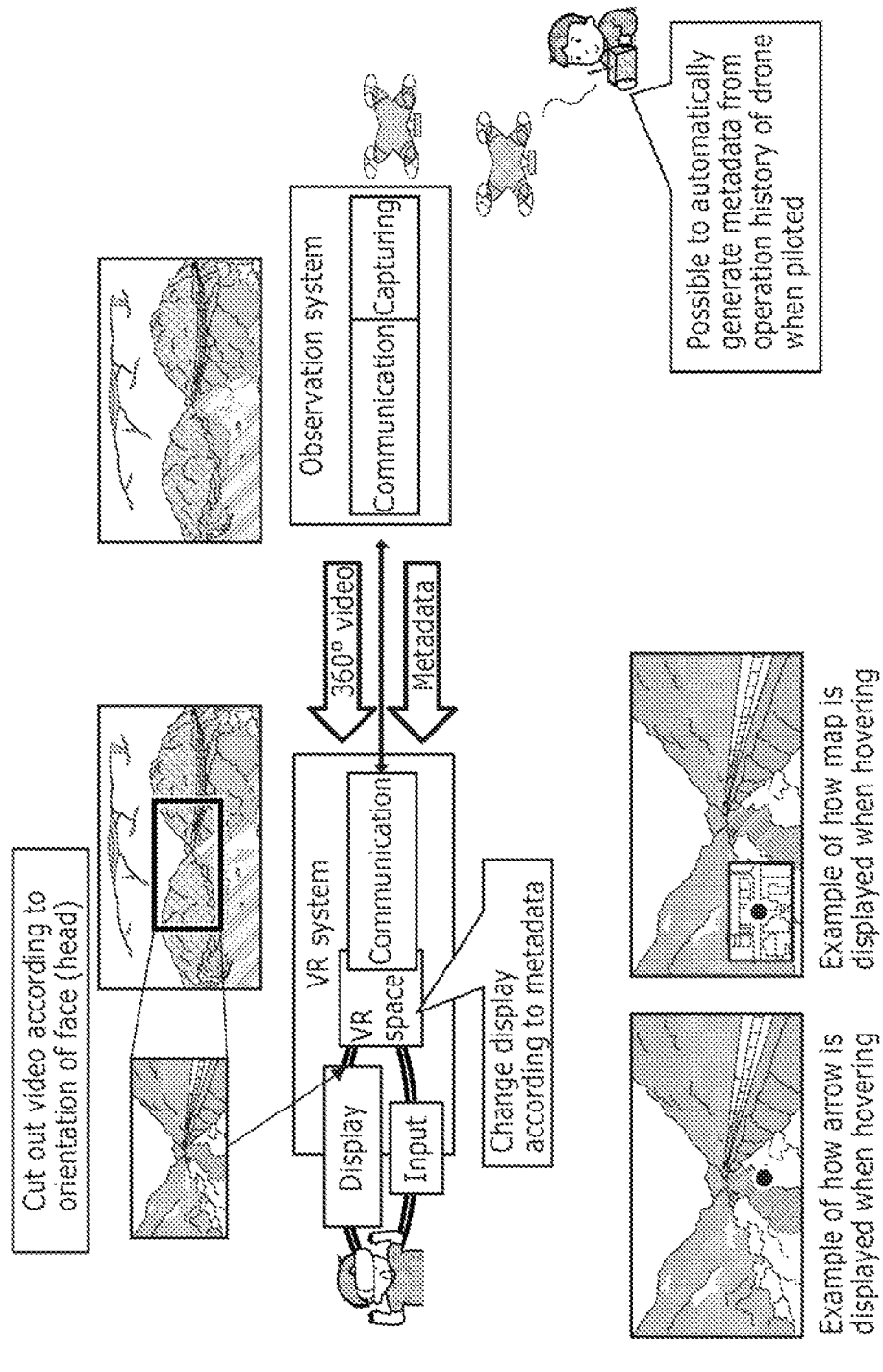
FIG. 20 is a schematic diagram of an example of the configuration of the video display system according to an implementation example.

FIG. 20 is a schematic diagram of an example of the configuration of the video display system according to an implementation example. As illustrated in FIG. 20, in this example, the guide display changes according to the movement speed of the mobile object in the metadata. The metadata, which includes the movement speed, for example, can be generated automatically from the operation history of the drone (one example of a mobile object) when it is piloted. As a result, as illustrated in FIG. 20, if the movement speed is equal to zero due to the drone hovering, for example, a point indicating this can be generated as a graphic and superimposed on the display video. FIG. 21 and FIG. 22 illustrate the correspondence between the movement state (flight state) of the mobile object and graphics that are generated and superimposed. As illustrated in FIG. 21, one example of the display of an arrow for acceleration is an arrow with hatching from the bottom left to the top right, one example of an the display of an arrow for deceleration is an arrow with hatching from the bottom right to the top left, one example of the display of an arrow for constant speed flight is an arrow that follows the direction of travel, and one example of the display of an arrow when turning is an arrow that curves in the direction of the turn. Similarly, as illustrated in, for example, FIG. 22, arrows can be used to indicate hovering, constant speed flight, acceleration/deceleration, ascent/descent, and turning of a mobile object. Moreover, color can be used for differentiation as well. For example, red can be assigned to deceleration, green to acceleration, and blue to constant speed. Patterns, such as hatching, can also be used for differentiation as well. For example, bottom right to top left hatching can be assigned to deceleration, bottom left to top right hatching to acceleration, and no hatching to constant speed.

Arrows may also be assigned to ascend or descend depending on the direction of the arrow, such as an upward arrow for ascending and a downward arrow for descending. These arrows may be displayed in 3D. In other words, an arrow that widens at the top may be assigned to ascending and an arrow that widens at the bottom may be assigned to descending. Furthermore, arrows may be shaped to represent acceleration, deceleration, stopped, hovering, etc. The mode of expression should be determined by the system so that it is as intuitive as possible, and a simple tutorial in advance can further improve the effect of preventing VR sickness.

FIG. 23 illustrates one example of the flow of operations performed by the video display system according to an implementation example. Next, operations according to the implementation example of the present invention will be described.

In the position and orientation information detection step of the observation system according to an implementation example of the present invention, the position and orientation of the observation system are detected by the position and orientation information detection unit realized by a program in the CPU, from signals from the motion and position detection unit (S2330). If there is no change in position or orientation at this time, the observation system is considered to be at a standstill (pre-flight, post-landing, hovering, etc.). If the change in position is constant, i.e., the movement is at a constant speed, the observation system is considered to be in a constant speed movement state (for example, low-speed horizontal flight, low-speed ascent, low-speed descent, etc.). If the change in position increases over time, the observation system is considered to be in an accelerating state, and if the change in position decreases over time, the drone is considered to be in a decelerating state. If the orientation does not change but the position changes, the observation system is considered to be moving a straight line state (horizontal, ascending, descending, etc.), and if the orientation changes, the observation system is considered to be in a turning state (up, down, left, right, etc.).

In the next metadata detection step, the detected position and orientation and flight state (stopped, constant speed, acceleration, deceleration, and turning) are converted into metadata (S2331), and in the next video/audio/metadata multiplexing step, the video, audio, graphics, and metadata are multiplexed by the multiplexing unit (S2327). In the next transmission step, the multiplexed information is sent (transmitted) to the VR system by the wireless communication element (S2328).

Here, the detection of position and orientation may be input from operation information obtained during drone operation. If the video is prerecorded video, or if drone operation information is not available, the video must be analyzed to extract the metadata. In such cases, the video is analyzed by a position and orientation analysis unit, which is realized by a GPU program or dedicated circuit, and the analysis results are sent to the position and orientation detection unit of the CPU via the system bus.

In addition to sending the position and orientation information to the VR system as metadata, the graphics generation unit of the GPU can generate graphics data from the information in the position and orientation detection unit, such as graphics data of an arrow indicating the movement direction, and send the generated graphics data to the VR system.

In some cases, determination of the flight state is not performed in the position and orientation information detection step. In such cases, the metadata converted in the metadata detection step has no parameters indicating the flight state, and the position and orientation determination unit of the VR system (to be described later) determines the flight state of the observation system.

The VR system receives metadata sent from the observation system by the computer/smartphone in the receiving step via the communication element (S2301), and the metadata is demultiplexed in the demultiplexing unit of the CPU in the video/audio/metadata demultiplexing step (S2302) and sent to the position and orientation determination unit of the CPU and the position and orientation determination unit of the GPU via the memory bus. In the metadata analysis step, the position and orientation determination unit of the CPU analyzes the metadata (S2306) and sends the obtained position and orientation information and the flight state to the audio playback control unit of the CPU or to the VR control unit or the graphics generation unit of the GPU via the memory bus. Alternatively, the position and orientation determination unit of the GPU analyzes the metadata and extracts the flight state, which is then sent to the VR control unit or the graphics generation unit of the GPU.

In the video cutout step based on the position and orientation of the VR system and the metadata, audio, video, and graphics processing (for example, step S2304 and step S2309) based on the position and orientation information sent from the observation system are performed in the audio playback control unit, the VR control unit, and the graphics generation unit, respectively.

If the position and orientation information is sent as graphics information to the graphics generation unit, graphics are generated in the graphics generation unit and are superimposed on the VR video with appropriate changes to the direction in the VR display control unit. When graphics are generated on the VR system side, a portion of the video other than in the frontal plane in the movement direction may be masked with a semitransparent graphic, or an arrow indicating the movement direction may be displayed, or a map showing movement may be displayed.

The above processes may be handled by the observation system or a computer system such as a cloud-based computer system that is between the observation system and the VR system.

Steps not described above are omitted here since they can be referenced by way of similar steps in FIG. 13. More specifically, step S2303 corresponds to step S1303, step S2305 corresponds to step S1305, step S2307 corresponds to step S1307, step S2308 corresponds to step S1308, step S2310 corresponds to step S1310 step S2321 corresponds to step S1321, step S2322 corresponds to step S1322, step S2323 corresponds to step S1323, step S2324 corresponds to step S1324, step S2325 corresponds to step S1325, and step S2326 corresponds to step S1326.

Figure 24:
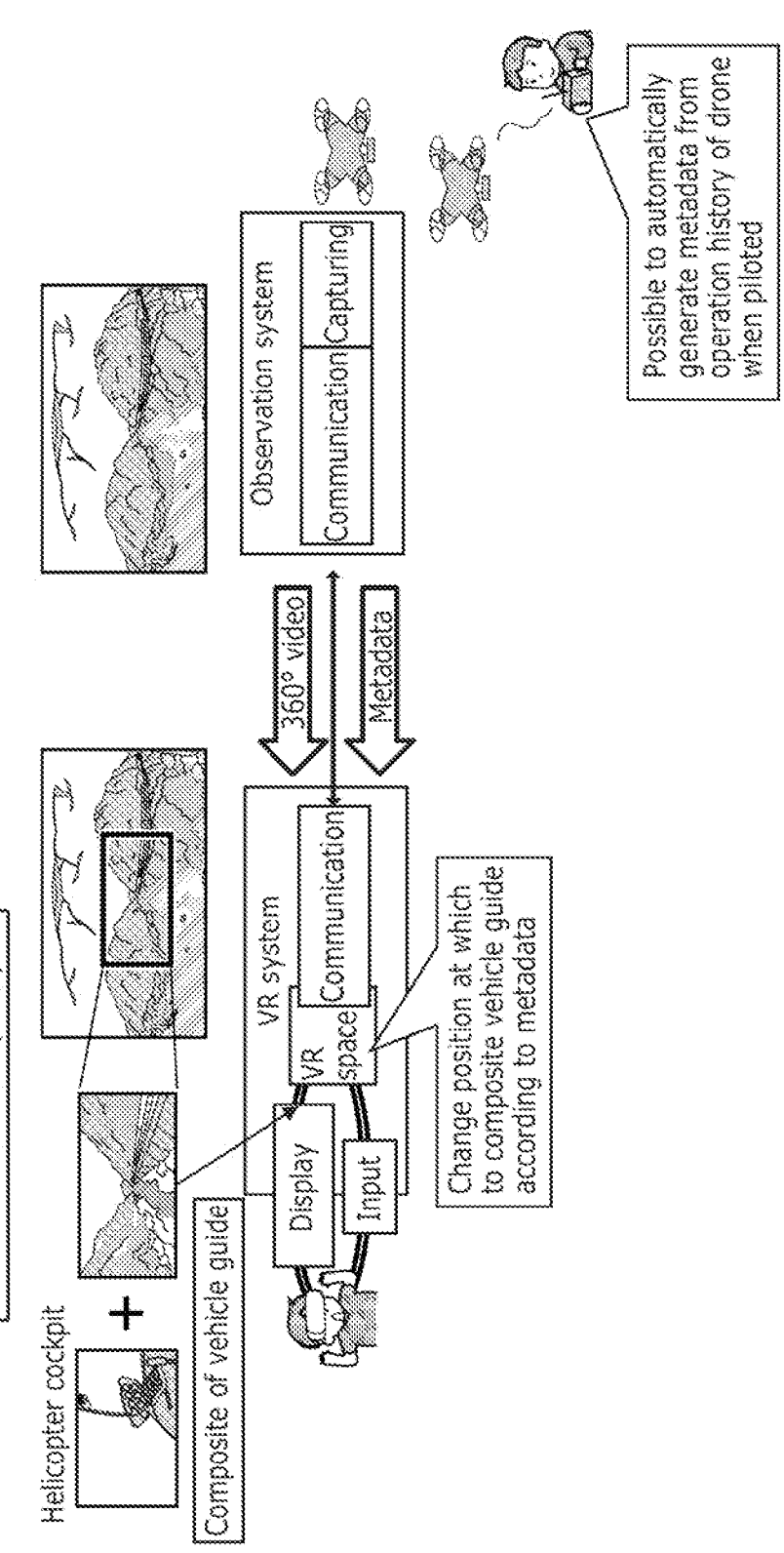
FIG. 24 is a schematic diagram of an example of the configuration of the video display system according to another implementation example.

FIG. 24 is a schematic diagram of an example of the configuration of the video display system according to another implementation example. FIG. 25 through FIG. 30 illustrate examples of the display video generated by the configuration illustrated in FIG. 24. This pertains to a configuration that addresses symptoms such as fear of heights in addition to addressing VR sickness from aerial video. In this case, the above-mentioned sense of fear is reduced by masking the video in the area vertically below the drone with a graphic composition as if one were sitting in the passenger seat of a helicopter, for example.

Methods also include using a guide display to convey the flight state such as hovering, constant speed flight, acceleration/deceleration, turning, etc., as well as guiding by tilting the cockpit itself or the outside scenery (i.e., the 3D image space itself) only when turning.

FIG. 31 is a schematic diagram of an example of the configuration of the video display system according to yet another implementation example. FIG. 32 illustrates one example of the display video generated by the configuration illustrated in FIG. 31.

In this example, in addition to displaying a graphic as well as tilting the cockpit itself or tilting the outside scenery only when turning, a method is employed to reduce VR sickness by making the outside visible through all windows during normal navigation, and by making all windows except the front ones semitransparent during acceleration, deceleration, and turning, thereby inducing the viewer to focus their gaze to the front and reduce VR sickness. In addition to semi-transparency, other image processing may be used, such as reducing the resolution or frame rate except in the frontal plane. Adding a driver and adding movement in the case of a change of direction can also help reduce VR sickness by allowing the user to detect the direction in advance.

Figure 33:
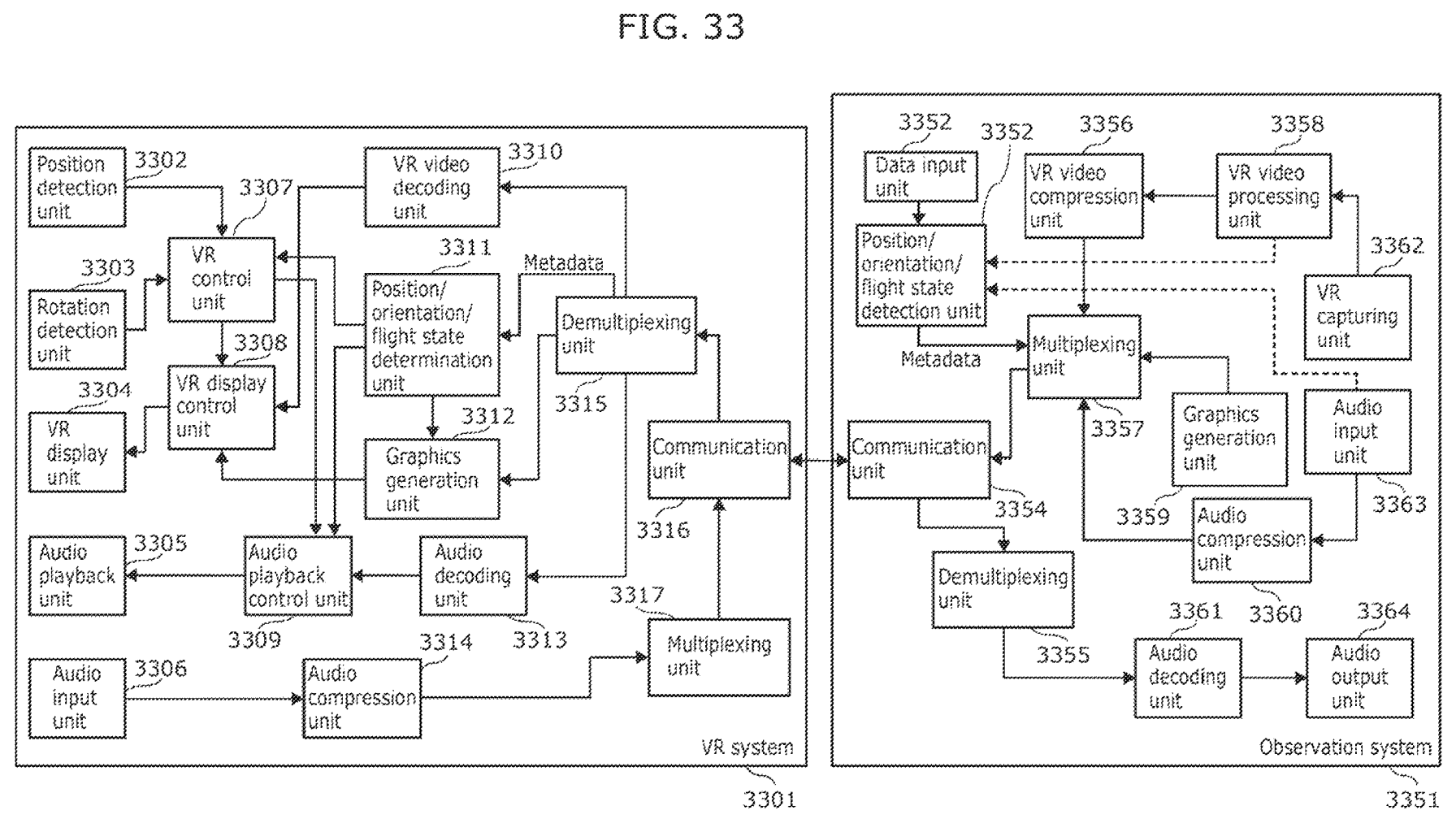

FIG. 33 illustrates one example of the functional configuration of the video display system according to an implementation example. Next, the configuration of the implementation example of the present invention will be described.

A graphic such as an arrow indicating the flight state (movement state) of observation system (observation device) 3351 is sent to VR system 3301 in advance at the time of initialization of the entire system and stored in the graphics storage unit of VR system 3301, or is stored in the graphics storage unit of VR system 3301 in the initial state.

In some cases, as needed, graphics data may be sent as metadata from observation system 3351 or as VR video, which is converted to graphics by VR system 3301 and stored, but this explanation is omitted here.

The position and direction or the flight state of observation system 3351 is detected by position/orientation/flight state detection unit (metadata conversion unit) 3352, and sent to the VR system via communication unit (transmission unit) 3354 as metadata.

Metadata from observation system 3351 from demultiplexing unit 3315 through communication unit (reception unit) 3316 in VR system (display device) 3301 to is transmitted to position/orientation/flight state determination unit (determination unit) 3311, the position, orientation, and movement or flight state of observation system 3351 is retrieved, and transmitted to graphics generation unit (graphics generation unit) 3312.

Next, graphics generation unit 3312 retrieves one of the graphics from the graphics storage unit in accordance with the position, orientation, and movement or flight state of observation system 3351 from position/orientation/flight state determination unit 3311, and sends it to VR display control unit (display control unit) 3308.

VR video, obtained by cutting out the spherical video sent from observation system 3351 and the graphic from graphics generation unit 3312 as appropriate according to the orientation of VR system 3301 and the position and the orientation of observation system 3351 sent as metadata from observation system 3351, is displayed on VR display unit (display unit) 3304 by VR display control unit 3308.

VR display unit 3304 displays a composite including a graphic appropriate to the position, orientation, and movement of observation system 3351.

In this example, since changes are made via the position of the graphics, the position of the VR video, the position and orientation of VR system 3301, and the position and orientation as well as the speed of movement of observation system 3351, there is a great deal of freedom in choices that enable a number of possibilities, such as making more realistic VR video by tilting the graphics with respect to the video when turning, reducing VR sickness by hiding or blurring parts of the VR video with graphics, displaying different graphics across VR systems, and changing the display of graphics depending on whether the user is more or less susceptible to VR sickness across VR systems.

In cases in which graphics are generated by observation system 3351 and sent to all VR systems via metadata, the advantage is that the graphics do not need to be stored in VR system 3301, making VR system 3301 simpler to implement, but they can be optimized in each VR system 3301.

Furthermore, if graphics are superimposed on the VR video in observation system 3351 and transmitted, graphics generation unit 3312 is not needed in VR system 3301, making VR system 3301 even simpler to implement, but with such a configuration, the graphics cannot be changed according to the state of VR system 3301, and can only reflect the status of the observation system.

Note that configurations not described above are omitted here since they can be referenced by way of similar configurations in FIG. 7. Specifically, position detection unit 3302 corresponds to position detection unit 702, rotation detection unit 3303 corresponds to rotation detection unit 703, VR display unit 3304 corresponds to VR display unit 704, audio playback unit 3305 corresponds to audio playback unit 705, audio input unit 3306 corresponds to audio input unit 706, VR control unit 3307 corresponds to VR control unit 707, VR display control unit 3308 corresponds to VR display control unit 708, audio playback control unit 3309 corresponds to audio playback control unit 709, VR video decoding unit 3310 corresponds to VR video decoding unit 710, graphics generation unit 3312 corresponds to graphics generation unit 712, audio decoding unit 3313 corresponds to audio decoding unit 713, audio compression unit 3314 corresponds to audio compression unit 714, demultiplexing unit 3315 corresponds to demultiplexing unit 715, communication unit 3316 corresponds to communication unit 716, multiplexing unit 3317 corresponds to multiplexing unit 717, communication unit 3354 corresponds to communication unit 754, demultiplexing unit 3355 corresponds to demultiplexing unit 755, VR video compression unit 3356 corresponds to VR video compression unit 756, multiplexing unit 3357 corresponds to multiplexing unit 757, VR video processing unit 3358 corresponds to VR video processing unit 758, graphics generation unit 3359 corresponds to graphics generation unit 759, audio compression unit 3360 corresponds to audio compression unit 760, audio decoding unit 3361 corresponds to audio decoding unit 761, VR capturing unit 3362 corresponds to VR capturing unit 762, audio input unit 3363 corresponds to audio input unit 763, and audio output unit 3364 corresponds to audio output unit 764.

FIG. 34 illustrates one example of the flow of operations for graphics composition according to an implementation example. Next, a configuration and operations for overcoming the technical problem will be described.

A graphic corresponding to a mobile object to be simulated by the observation system, such as a helicopter, aircraft, a ship, a bus, etc., is prepared, sent to the VR system in advance, and stored in the graphics storage unit of the VR system (S3401).

Next, graphics data is sent out as metadata or as VR video, converted to a graphic by the VR system, and stored (S3402).

Next, the position and the orientation of the observation system are detected by the position and orientation detection unit (S3403) and sent out to the VR system as metadata (S3404).

The metadata from the observation system is sent from the demultiplexing unit via the communication unit in the VR system to the position and orientation determination unit, where the position, orientation, and movement of the observation system are retrieved and sent to the graphics generation unit.

Next, the graphics generation unit retrieves the graphic sent from the observation system from the graphics storage unit, in some cases modifies the graphic in accordance with the orientation of the VR system (not illustrated), and sends the graphic to the VR display control unit.

VR video, obtained by cutting out the spherical video sent from the observation system and the graphic from the graphics generation unit as appropriate according to the orientation of the VR system and the position and the orientation of the observation system sent as metadata from the observation system, is displayed on the VR display unit by the VR display control unit (S3405).

The VR display unit displays a composite including a graphic appropriate to the position, orientation, and movement of the observation system.

In this example, since changes are made via the position of the graphics, the position of the VR video, the position and orientation of the VR system, and the position and orientation as well as the speed of movement of the observation system, there is a great deal of freedom in choices that enable a number of possibilities, such as making more realistic VR video by tilting the graphics with respect to the video when turning, reducing VR sickness by hiding or blurring parts of the VR video with graphics, displaying different graphics across VR systems, and changing the display of graphics depending on whether the user is more or less susceptible to VR sickness across VR systems.

Figure 35:
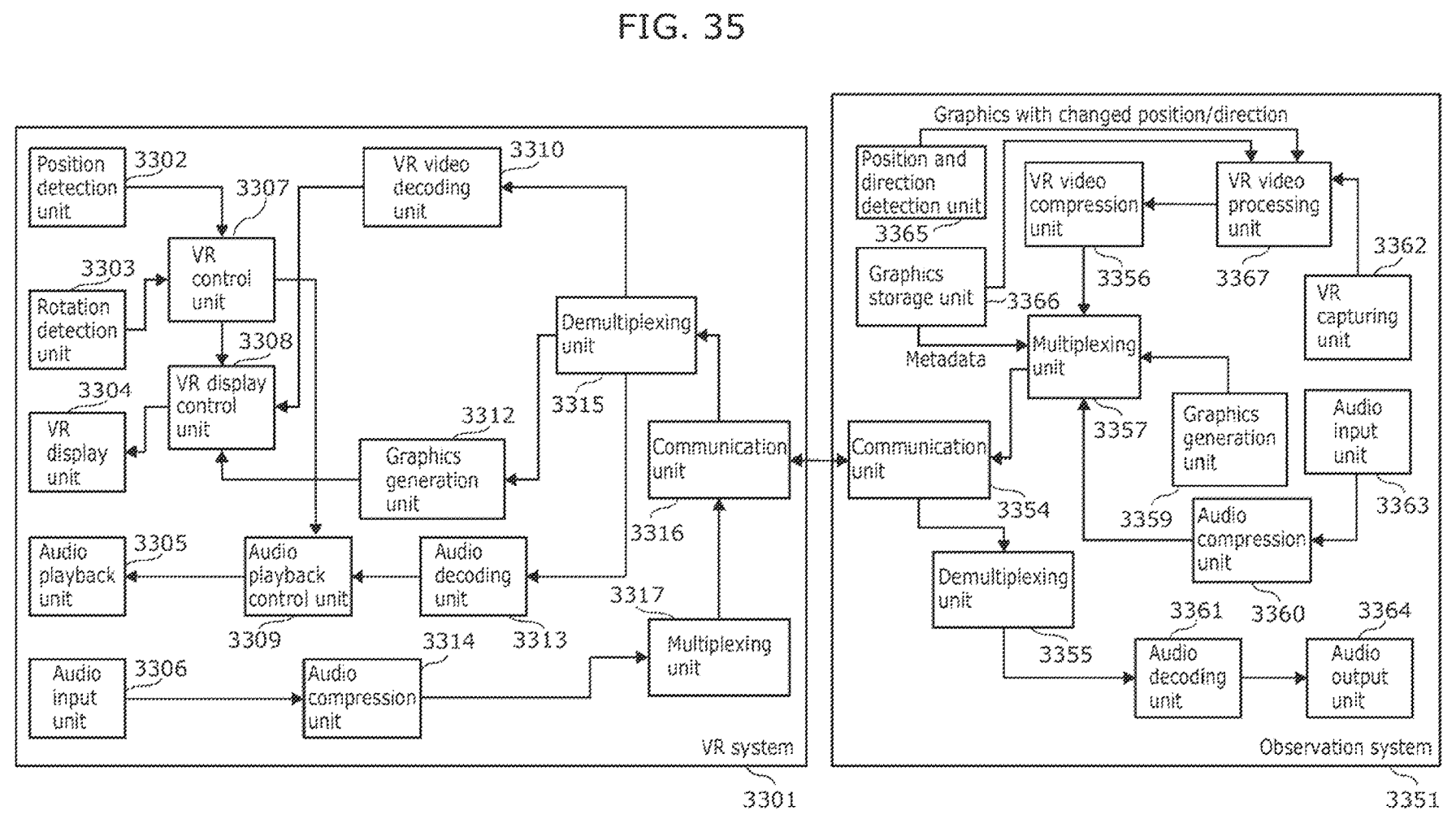
Figure 36:
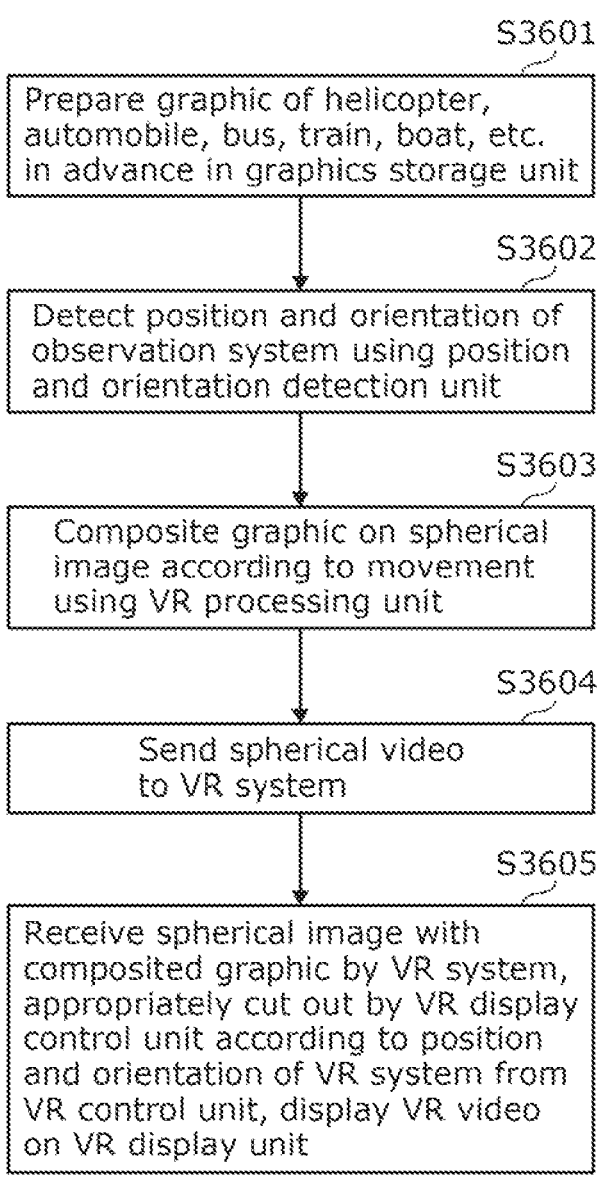
FIG. 36 illustrates one example of the flow of operations for graphics composition according to an implementation example.

FIG. 35 illustrates another example of the functional configuration of the video display system according to an implementation example. Next, the configuration of the implementation example of the present invention will be described. FIG. 36 illustrates one example of the flow of operations for graphics composition according to an implementation example. Next, a configuration and operations for overcoming the technical problem will be described.

In this example, since there is no need to send metadata from the observation system to the VR system, the data input unit is omitted.

A graphic corresponding to a mobile object to be simulated by the observation system, such as a helicopter, aircraft, a ship, a bus, etc., is prepared (S3401), stored in graphics storage unit 3366 (S3402), and sent to the VR processing unit.

Next, the position and the orientation of the observation system are detected by position and orientation detection unit 3365 (S3403) and sent to the VR video processing unit (S3404).

The VR processing unit changes the received graphics data according to the received position and orientation and composites the graphic data onto the spherical video from the VR capturing unit.

Next, the spherical video composited with graphics data is sent to the VR system via the VR video compression unit, multiplexing unit, and communication unit.

The spherical video from the observation system from the communication unit in the VR system is displayed on the VR display unit via the demultiplexing unit, the VR video decoding unit, and the VR display control unit, as usual (S3405).

The VR display unit displays a composite including a graphic appropriate to the position, orientation, and movement of the observation system.

In this example, the position of the VR video and the position of the graphic will be fixed, and the position of the cutout from the spherical video will depend on the position and orientation of the VR system.

Note that configurations not described above are omitted here since they can be referenced by way of similar configurations in FIG. 7. Specifically, position detection unit 3302 corresponds to position detection unit 702, rotation detection unit 3303 corresponds to rotation detection unit 703, VR display unit 3304 corresponds to VR display unit 704, audio playback unit 3305 corresponds to audio playback unit 705, audio input unit 3306 corresponds to audio input unit 706, VR control unit 3307 corresponds to VR control unit 707, VR display control unit 3308 corresponds to VR display control unit 708, audio playback control unit 3309 corresponds to audio playback control unit 709, VR video decoding unit 3310 corresponds to VR video decoding unit 710, graphics generation unit 3312 corresponds to graphics generation unit 712, audio decoding unit 3313 corresponds to audio decoding unit 713, audio compression unit 3314 corresponds to audio compression unit 714, demultiplexing unit 3315 corresponds to demultiplexing unit 715, communication unit 3316 corresponds to communication unit 716, multiplexing unit 3317 corresponds to multiplexing unit 717, communication unit 3354 corresponds to communication unit 754, demultiplexing unit 3355 corresponds to demultiplexing unit 755, VR video compression unit 3356 corresponds to VR video compression unit 756, multiplexing unit 3357 corresponds to multiplexing unit 757, VR video processing unit 3358 corresponds to VR video processing unit 758, graphics generation unit 3359 corresponds to graphics generation unit 759, audio compression unit 3360 corresponds to audio compression unit 760, audio decoding unit 3361 corresponds to audio decoding unit 761, VR capturing unit 3362 corresponds to VR capturing unit 762, audio input unit 3363 corresponds to audio input unit 763, and audio output unit 3364 corresponds to audio output unit 764. FIG. 37 and FIG. 38 illustrate examples of the metadata structure according to an implementation example. Next, an example of metadata structure according to this implementation example will be given.

The metadata type is a default code or string that indicates that the metadata is the metadata according to the present invention. The version number is a number for when the metadata structure is changed. For example, major versions and minor versions are used, such as 0.81 (0081) during the evaluation phase, 0.92 (0092) during demonstration testing, and 1.0 (0100) during release. The concept is to guarantee compatibility across the same major version.

The function code, when 0, indicates that the information in the metadata is invalid; otherwise, it indicates the type of information in the metadata. For example, 0001 indicates that the format is to describe the position, movement direction, and speed of the reference position, camera, guide, and target. 0002 indicates graphics data, 0003 indicates information on the VR system, 0011 is 0001 with cue data sent from the observation system, 0021 comes with cue data and defines the target to be moved, etc.

The reference position is data for the position acting as a reference for the position data, and is predefined as a whole system, including units such as X (distance from east to west), Y (distance from north to south), Z (distance in height), or expressed in terms of latitude/longitude and altitude. A reference position of 0 indicates that the position at reset of the whole system is used as the reference. Whether the position of the camera and the position of the guide are absolute coordinates or relative to a reference position is determined in advance.

The movement direction and speed indicate the movement status of the observation system or guide, and if cue data is available, how it will move in the future.

The target count indicates the tourism destination to be visited in the case of VR tourism. A target count of 0 indicates no target.

The verification code is a code for verifying that the metadata data is not incorrect during transmission, and is, for example, a CRC.

Figure 39:
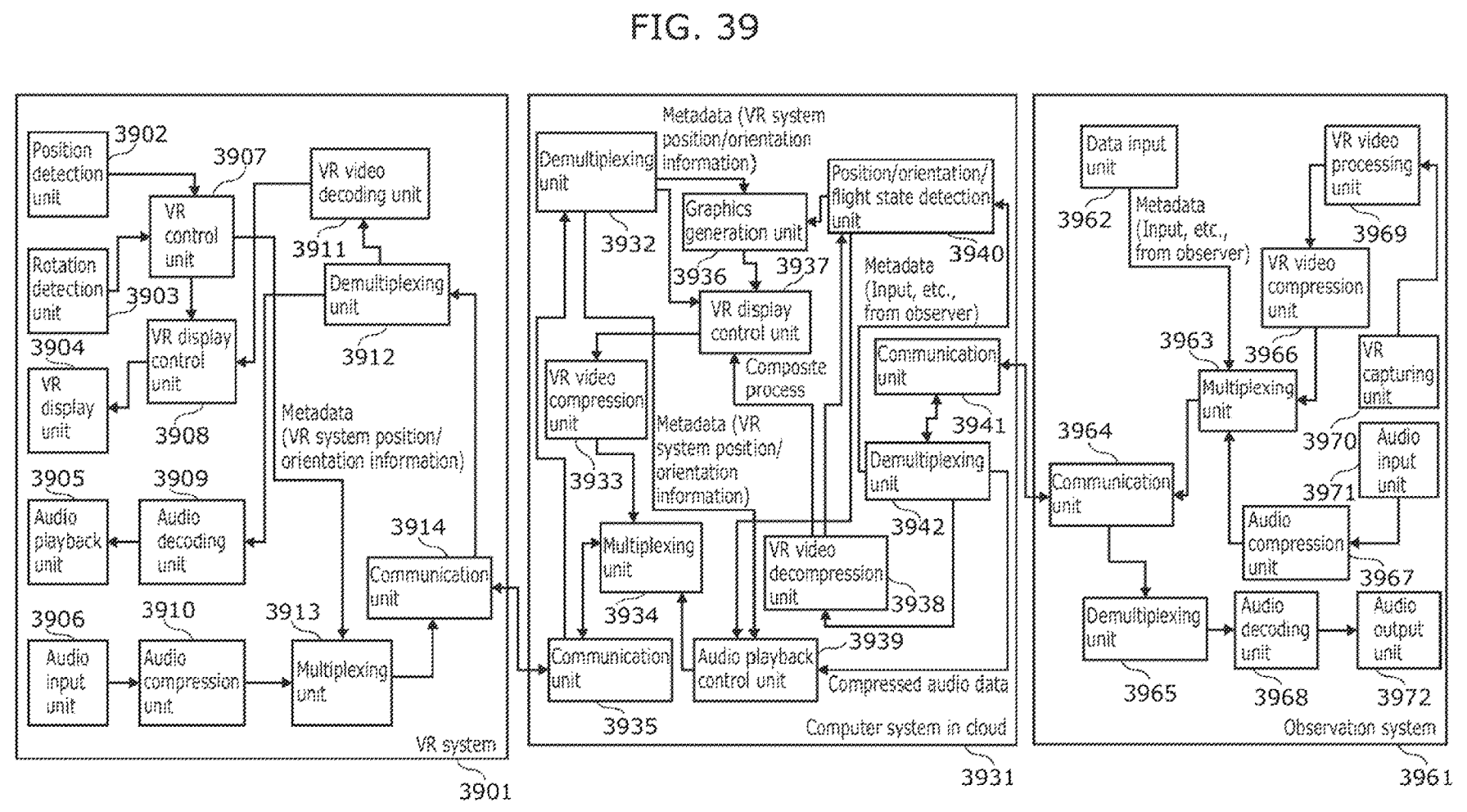

FIG. 39 is for illustrating an example of a configuration of the video display system according to an implementation example realized using the cloud. In the configuration illustrated in FIG. 39, the cloud has the function of controlling graphics, VR video, sound, and controller vibration according to the position, orientation, and flight state of the observation system and the position and orientation of the VR system and providing appropriate information to the user of the VR system, whereby even a VR system with a simple configuration can achieve the advantageous effects of the present invention.

In the configuration illustrated in FIG. 39, by having position/orientation/flight state detection unit 3940 in the cloud (computer system 3931), the position, orientation, and flight state of observation system 3961 on the cloud are read from the data sent from observation system 3961 using metadata demultiplexed by demultiplexing unit 3942, and graphics generation unit 3936 generates video of a helicopter, for example, and arrows accordingly. The position and orientation of observation system 3961 and the position and orientation of VR system 3901 are determined by VR control unit 3907, and VR display control unit 3937 appropriately composites VR video and graphics or processes VR video, and audio playback control unit 3939 changes the audio position or the content of the audio, thereby making it possible to output display and audio appropriate to the position and orientation of VR system 3901. Although not illustrated here, it is possible to inform the user of the VR system of the direction and position by controlling, such as vibrating, a controller of VR system 3901 appropriately.

Note that configurations not described above are omitted here since they can be referenced by way of similar configurations in FIG. 33. Position detection unit 3902, rotation detection unit 3903, VR display unit 3904, audio playback unit 3905, audio input unit 3906, VR control unit 3907, VR display control unit 3908, audio decoding unit 3909, audio compression unit 3910, VR video decoding unit 3911, demultiplexing unit 3912, multiplexing unit 3913, and communication unit 3914 included in VR system 3901, as well as demultiplexing unit 3932, VR video compression unit 3933, multiplexing unit 3934, communication unit 3935, graphics generation unit 3936, VR display control unit 3937, VR video decompression unit 3938, audio playback control unit 3939, position/orientation/flight state storage unit 3940, communication unit 3941, and demultiplexing unit 3942 included in computer system 3931, as well as data input unit 3962, multiplexing unit 3963, communication unit 3964, demultiplexing unit 3965, VR video compression unit 3966, audio compression unit 3967, audio decoding unit 3968, VR video processing unit 3969, VR capturing unit 3970, audio input unit 3971, and audio output unit 3972 included in observation system 3961 respectively correspond one-to-one, many-to-one, one-to-many, or many-to-many to position detection unit 3302, rotation detection unit 3303, VR display unit 3304, audio playback unit 3305, audio input unit 3306, VR control unit 3307, VR display control unit 3308, audio playback control unit 3309, VR video decoding unit 3310, graphics generation unit 3312, audio decoding unit 3313, audio compression unit 3314, demultiplexing unit 3315, communication unit 3316, multiplexing unit 3317, communication unit 3354, demultiplexing unit 3355, VR video compression unit 3356, multiplexing unit 3357, VR video processing unit 3358, graphics generation unit 3359, audio compression unit 3360, audio decoding unit 3361, VR capturing unit 3362, audio input unit 3363, and audio output unit 3364.

The functions included in the cloud are not limited to those illustrated in FIG. 39, and may be selected according to the configuration and functions of connected observation system or VR system so that the overall functions and operations are similar. As an example, if the observation system does not detect the position and orientation of the observation system, but the position and orientation of the observation system is detected on the cloud and sent as graphics superimposed on the video to the VR system, the VR system is restricted in regard to changing the graphics according to the position and orientation of the VR system, but the VR system requires no special functions. In a configuration where the VR system includes a position and orientation control unit and a graphics generation unit that correct graphics according to the position and orientation of the VR system, it is possible to alter the graphics according to the position and orientation of the VR system.

Figure 40:
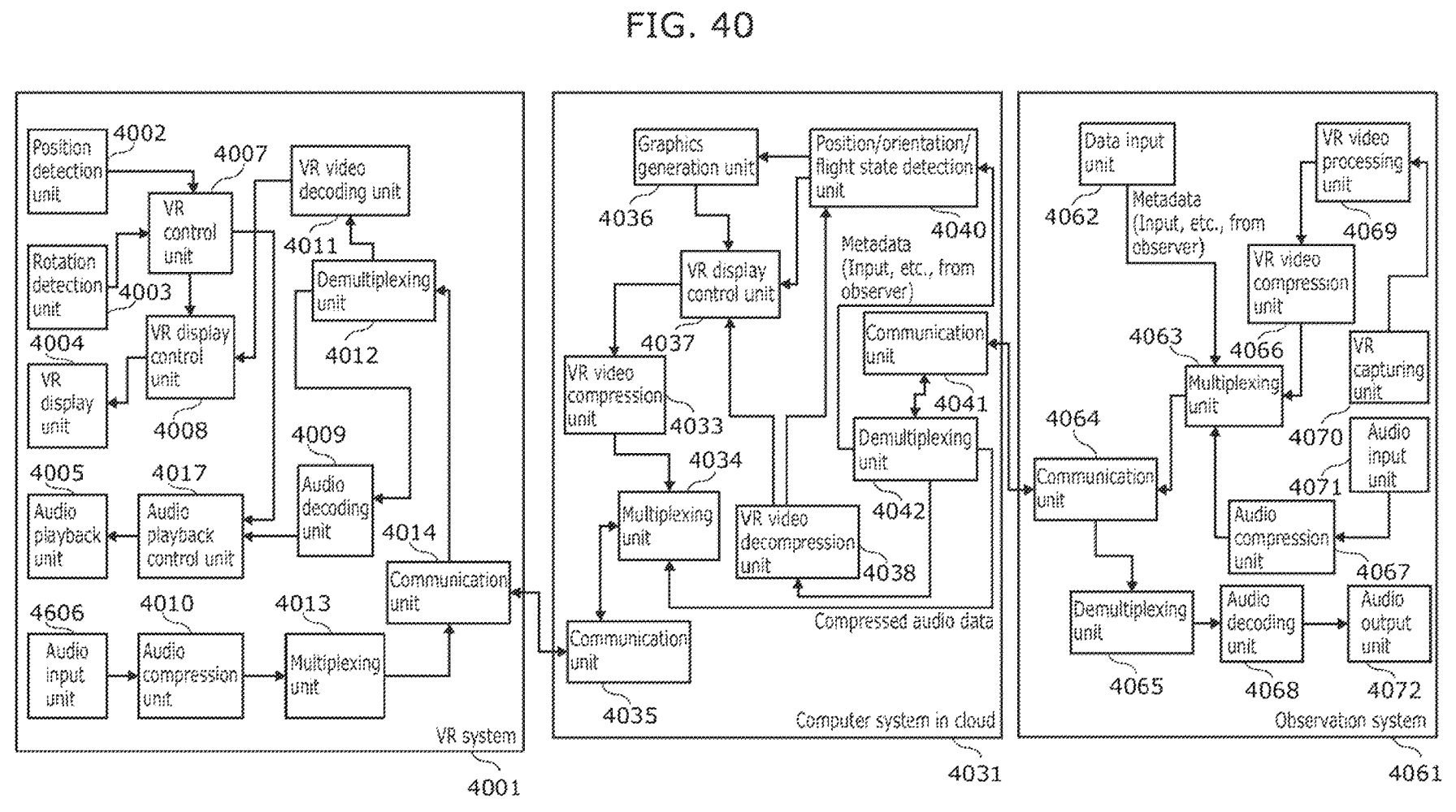

FIG. 40 is for illustrating an example of a configuration of the video display system according to an implementation example realized using the cloud. As illustrated in FIG. 40, the position/orientation/flight state detection unit of the observation system may be realized by a computer system, such as a cloud-based computer system, between the observation system and the VR system. In such cases, the observation system does not send metadata indicating the direction, or the data input by the operator is sent out as metadata. Via the position/orientation/flight state detection unit, which is in the cloud, the position, orientation, or movement of the observation system, guide, or target is detected from the video, audio, or metadata sent from the observation system, and sent to the VR system as metadata. This makes it possible to achieve the advantageous effect of this implementation example using existing 360° cameras.

Furthermore, the position and orientation determination unit on the VR system side and the control of the VR video and audio thereby may be implemented by a computer system, such as a cloud-based computer system, between the VR system and the observation system. In such cases, the same process can be performed in one place, making it easy to provide the same advantageous effect to a plurality of VR systems at the same time, or to provide the advantageous effect of the present invention to existing systems. However, to apply the direction and position of the VR system, it is necessary to send the position and direction of the VR system from the VR system to the cloud side, and it is necessary to provide a processing unit for each VR system on the cloud side.

The configuration in FIG. 40 is an example of a case where the position and orientation of the VR system are not transmitted to the cloud side. In this case, it becomes difficult to display arrows or change the sound according to the position and orientation of the VR system, but the VR display control unit can, according to the output of the position/orientation/flight state detection unit, change the resolution of the VR video, mask the video, change the sound position, etc.

Note that configurations not described above are omitted here since they can be referenced by way of similar configurations in FIG. 33. Position detection unit 4002, rotation detection unit 4003, VR display unit 4004, audio playback unit 4005, audio input unit 4006, VR control unit 4007, VR display control unit 4008, audio decoding unit 4009, audio compression unit 4010, VR video decoding unit 4011, demultiplexing unit 4012, multiplexing unit 4013, audio playback control unit 2017, and communication unit 4014 included in VR system 4001, as well as VR video compression unit 4033, multiplexing unit 4034, communication unit 4035, graphics generation unit 4036, VR display control unit 4037, VR video decompression unit 4038, position/orientation/flight state storage unit 4040, communication unit 4041, and demultiplexing unit 4042 included in computer system 4031, as well as data input unit 4062, multiplexing unit 4063, communication unit 4064, demultiplexing unit 4065, VR video compression unit 4066, audio compression unit 4067, audio decoding unit 4068, VR video processing unit 4069, VR capturing unit 4070, audio input unit 4071, and audio output unit 4072 included in observation system 4061 respectively correspond one-to-one, many-to-one, one-to-many, or many-to-many to position detection unit 3302, rotation detection unit 3303, VR display unit 3304, audio playback unit 3305, audio input unit 3306, VR control unit 3307, VR display control unit 3308, audio playback control unit 3309, VR video decoding unit 3310, graphics generation unit 3312, audio decoding unit 3313, audio compression unit 3314, demultiplexing unit 3315, communication unit 3316, multiplexing unit 3317, communication unit 3354, demultiplexing unit 3355, VR video compression unit 3356, multiplexing unit 3357, VR video processing unit 3358, graphics generation unit 3359, audio compression unit 3360, audio decoding unit 3361, VR capturing unit 3362, audio input unit 3363, and audio output unit 3364.

Figure 41:
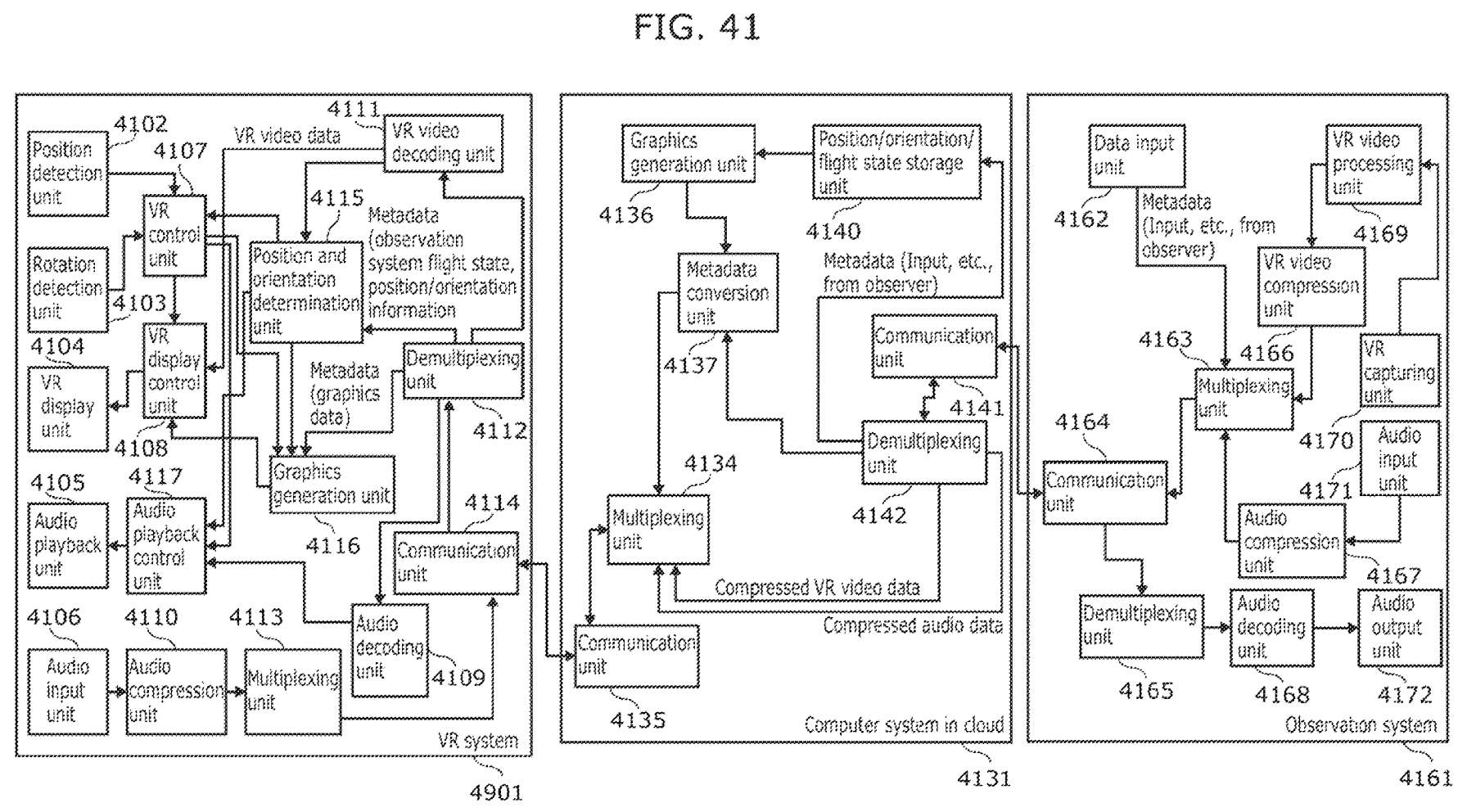

FIG. 41 is for illustrating an example of a configuration of the video display system according to an implementation example realized using the cloud. In the configuration in FIG. 40, it was difficult to display arrows or change sound according to the position and orientation of the VR system, but in the configuration illustrated in FIG. 41, by including a position and orientation determination unit in the VR system, the position and orientation of the observation system are retrieved from metadata demultiplexed by the demultiplexing unit, a video of, for example, a helicopter and arrows are generated by the graphics generation unit based on the retrieved information, the generated video and arrows are converted by the metadata conversion unit into metadata along with the position and orientation information transmitted from the observation system, multiplexed by the multiplexing unit, and transmitted to the VR system.

In the VR system, a graphic is generated from the metadata demultiplexed by the demultiplexing unit, the position and orientation of the observation system and the position and direction of the VR system obtained from the position detection unit and the rotation detection unit are determined by the VR control unit, and the VR display control unit appropriately composites VR video and graphics or processes VR video, and the audio playback control unit changes the audio position or the content of the audio, thereby making it possible to output display and audio appropriate to the position and orientation of the VR system. Although not illustrated here, it is possible to inform the user of the VR system of the direction and position by controlling, such as vibrating, a controller of the VR system appropriately.

Note that configurations not described above are omitted here since they can be referenced by way of similar configurations in FIG. 33. Position detection unit 4102, rotation detection unit 4103, VR display unit 4104, audio playback unit 4105, audio input unit 4106, VR control unit 4107, VR display control unit 4108, audio decoding unit 4109, audio compression unit 4110, VR video decoding unit 4111, demultiplexing unit 4112, multiplexing unit 4113, graphics generation unit 4116, audio playback control unit 4117, and communication unit 4114 included in VR system 4101, as well as multiplexing unit 4134, communication unit 4135, graphics generation unit 4136, VR display control unit 4137, position/orientation/flight state storage unit 4140, communication unit 4141, and demultiplexing unit 4142 included in computer system 4131, as well as data input unit 4162, multiplexing unit 4163, communication unit 4164, demultiplexing unit 4165, VR video compression unit 4166, audio compression unit 4167, audio decoding unit 4168, VR video processing unit 4169, VR capturing unit 4170, audio input unit 4171, and audio output unit 4172 included in observation system 4161 respectively correspond one-to-one, many-to-one, one-to-many, or many-to-many to position detection unit 3302, rotation detection unit 3303, VR display unit 3304, audio playback unit 3305, audio input unit 3306, VR control unit 3307, VR display control unit 3308, audio playback control unit 3309, VR video decoding unit 3310, graphics generation unit 3312, audio decoding unit 3313, audio compression unit 3314, demultiplexing unit 3315, communication unit 3316, multiplexing unit 3317, communication unit 3354, demultiplexing unit 3355, VR video compression unit 3356, multiplexing unit 3357, VR video processing unit 3358, graphics generation unit 3359, audio compression unit 3360, audio decoding unit 3361, VR capturing unit 3362, audio input unit 3363, and audio output unit 3364.

The position and orientation information of the VR system detected by the position detection unit and rotation detection unit of the VR system is multiplexed with other information in the multiplexing unit as metadata, and is sent to the computer system in the cloud by the communication unit. This feature is included in most common VR systems.

OTHER EMBODIMENTS

Although the above description is based on embodiments and the like, the present disclosure is not limited to the above embodiments.

Although the above embodiments and the like give examples of elements included in the video display system, the functions of the elements included in the video display system may be assigned to a plurality of units included in the video display system in any way.

Furthermore, in the above embodiments, each element may be realized by executing a software program suitable or the element. Each element may be realized as a result of a program execution unit of a CPU or processor or the like reading and executing a software program recorded on a recording medium such as a hard disk or semiconductor memory.

Each element may be realized by hardware. For example, each element may be a circuit (or integrated circuit). These circuits may be configured as a single circuit as a whole and, alternatively, may be individual circuits. Moreover, these circuits may be general-purpose circuits and, alternatively, may be dedicated circuits.

General or specific aspects of the present disclosure may be realized as a system, a device, a method, an integrated circuit, a computer program, a computer readable recording medium such as a CD-ROM, or any given combination thereof.

Various modifications of the embodiments as well as embodiments resulting from arbitrary combinations of elements of different embodiments that may be conceived by those skilled in the art are intended to be included within the scope of the present disclosure as long as these do not depart from the essence of the present disclosure.

INDUSTRIAL APPLICABILITY

The present disclosure is useful in applications where the appropriate video is displayed on a display device.

REFERENCE SIGNS LIST

100 display device
101 display unit
102 orientation detection unit
150 network
200 server device
201 reception unit
202 differential calculation unit
203 presentation unit
204 video generation unit
300 observation device
300a, 300b capturing device
301 capturing unit
302 input interface
303 position detection unit
304 data obtainment unit
305 metadata obtainment unit
306 transmission unit
500 video display system

The invention claimed is:

1. A video display system for displaying a display video via a display device, the video display system comprising:
a VR device including the display device that displays the display video;
an observation device provided in a mobile object to give the observation device mobility, the observation device including a capturing unit configured to capture video, a data obtaining unit configured to obtain data related to a movement speed of the capturing unit and a movement state of the mobile object and to obtain cue data indicating how the mobile object will move, and a transmission unit configured to transmit, together with the data and the cue data, the video captured; and
an information processing device connected to the observation device and the VR device over a network and including a reception unit, a video generation unit, a presentation unit, a movement state calculation unit, and a processing device transmission unit, wherein:
the reception unit is configured to receive, from the observation device, a wide-angle video as the video, the data and the cue data,
the movement state calculation unit is configured to calculate a movement state of the observation device based on the wide-angle video, the data and the cue data, the presentation unit is configured to cause the video generation unit to generate and output a graphic corresponding to the movement speed of the capturing unit and how the mobile object will move from the data and the cue data received, and before the mobile object starts moving, superimpose the graphic to present the movement speed and how the mobile object will move, the graphic indicates the movement state calculated, the graphic displays a guide indication via a figure on the display video in a manner assigned per movement state in the data received, the video generation unit is configured to generate the display video including the video received, and superimpose the graphic onto a portion of the wide-angle video based on the data and the movement state, and the processing device transmission unit is configured to transmit the wide-angle video together with other information, before the mobile object starts moving.

2. The video display system according to claim 1, wherein on the display video, the graphic displays an arrow indicating the movement state in a manner corresponding to the movement state.

3. The video display system according to claim 2, wherein the movement state is information indicating a change in movement speed of the observation device and a change and a continuance in movement direction of the observation device, and the movement speed is information including a status of change in speed of the observation device.

4. The video display system according to claim 1, wherein the graphic displays, as a mask, an image for covering at least part of the display video other than a part corresponding to a movement direction of the mobile object.

5. The video display system according to claim 1, wherein the mobile object is a flying object.

6. The video display system according to claim 5, wherein the graphic displays a mask for covering an area vertically below the flying object.

7. The video display system according to claim 1, wherein the data obtaining unit is configured to obtain the data related to the movement speed of the capturing unit and the cue data from an operation history of operations made via a control device for controlling movement of the mobile object.

8. The video display system according to claim 1, wherein the capturing unit is configured to capture virtual video by capturing video in a virtual image space constructed by computer graphics.

9. The video display system according to claim 1, wherein the information processing device is provided in a cloud connected to a wide-area network, and is connected to the observation device and the VR device over the wide-area network.

10. A video display system for displaying a display video via a display device, the video display system comprising:

a VR device including the display device that displays the display video;

an observation device provided in a mobile object to give the observation device mobility, the observation device including a capturing unit configured to capture video, a data obtaining unit configured to obtain data related to a movement speed of the capturing unit and a movement state of the mobile object and to obtain cue data indicating how the mobile object will move, and a transmission unit configured to transmit, together with the data and the cue data, the video captured;

a video generation unit configured to generate the display video including the video received; and an information processing device connected to the observation device and the VR device over a network, wherein:

the information processing device includes a reception unit, a presentation unit, a movement state calculation unit, a metadata composition unit, and a processing device transmission unit, the reception unit is configured to receive, from the observation device, a wide-angle video as the video, the data and the cue data, the movement state calculation unit is configured to calculate a movement state of the observation device based on the wide-angle video, the data and the cue data, the presentation unit is configured to cause the video generation unit to generate and output a graphic corresponding to the movement speed of the capturing unit and how the mobile object will move from the data and the cue data received, and before the mobile object starts moving, superimpose the graphic to present the movement speed and how the mobile object will move, the graphic is based on the movement state calculated by the movement state calculation unit, the graphic displays a guide indication via a figure on the display video in a manner assigned per movement state in the data received, the metadata composition unit is configured to generate metadata including the graphic, the data, and the movement state, and the processing device transmission unit is configured to transmit information including the wide-angle video and the metadata, before the mobile object starts moving.

11. A video display system for displaying a display video via a display device, the video display system comprising:

a VR device including the display device that displays the display video;

an observation device provided in a mobile object to give the observation device mobility, the observation device including a capturing unit configured to capture video, a data obtaining unit configured to obtain data related to a movement speed of the capturing unit and a movement state of the mobile object and to obtain cue data indicating how the mobile object will move, and a transmission unit configured to transmit, together with the data and the cue data, the video captured;

a video generation unit configured to generate the display video including the video received; and an information processing device connected to the observation device and the VR device over a network, wherein:

the information processing device includes:

a first reception unit configured to receive, from the observation device, a wide-angle video as the video, the data and the cue data;

a second reception unit configured to receive data related to an orientation of the VR device;

a movement state calculation unit configured to calculate a movement state of the observation device based on the wide-angle video, the data and the cue data;

a differential calculation unit configured to calculate a relative movement direction based on a difference between the orientation of the VR device and movement information related to movement of the capturing unit, the relative movement direction being a movement direction of the capturing unit relative to the orientation of the VR device;

a presentation unit configured to cause the video generation unit to generate and output a graphic corresponding to the movement speed of the capturing unit and how the mobile object will move from the data and the cue data received, and before the mobile object starts moving, superimpose the graphic to present the movement speed and how the mobile object will move, the graphic displaying a guide indication via a figure on the display video in a manner assigned per movement state in the data received, the graphic indicating the difference calculated and the movement state of the observation device;

a video compositing unit configured to composite the graphic onto the wide-angle video based on the difference and the movement state; and a transmission unit configured to transmit the video composited by the video compositing unit and other information, before the mobile object starts moving.

12. An information processing method for displaying a display video on a VR device, the method comprising:

receiving, by an information processing device connected to an observation device and the VR device over a network and provided in a mobile object to give the observation device mobility, data related to (i) a movement speed of a capturing unit provided in the observation device and configured to move with the mobile object and capture video and (ii) a movement state of the mobile object;

receiving cue data, by the information processing device, indicating how the mobile object will move;

receiving, by the information processing device, a wide-angle video, as the video, transmitted from the observation device;

calculating, by the information processing device, a movement state of the observation device based on the wide-angle video, the data and the cue data;

generating and outputting, by the information processing device, a graphic corresponding to the movement speed of the capturing unit and how the mobile object will move from the data and the cue data received, and before the mobile object starts moving, superimposing the graphic to present the movement speed of the capturing unit and how the mobile object will move, the graphic indicating the movement state calculated and displaying a guide indication via a figure on the display video in a manner assigned per movement state in the data received;

generating, by the information processing device, the display video including the video received, and superimposing the graphic onto a portion of the wide-angle video based on the data and the movement state; and transmitting, by the information processing device, the wide-angle video together with other information, before the mobile object starts moving.

13. A non-transitory computer-readable recording medium having recorded thereon a computer program for causing a computer to execute the information processing method according to claim 12.

*    *    *    *    *